United States Patent
Kurtz et al.

(10) Patent No.: US 12,518,013 B2
(45) Date of Patent: *Jan. 6, 2026

(54) ANALYSIS OF MALWARE

(71) Applicant: CrowdStrike, Inc., Sunnyvale, CA (US)

(72) Inventors: George Robert Kurtz, Ladera Ranch, CA (US); Dmitri Alperovitch, Gaithersburg, MD (US); Amol Kulkarni, Bothell, WA (US); Jan Miller, Hamburg (DE); Daniel Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,819

(22) Filed: May 17, 2024

(65) Prior Publication Data

US 2024/0386109 A1 Nov. 21, 2024

Related U.S. Application Data

(63) Continuation of application No. 17/255,958, filed as application No. PCT/US2019/039839 on Jun. 28, 2019, now Pat. No. 12,013,941.

(Continued)

(51) Int. Cl.
*G06F 21/56* (2013.01)
*G06F 21/00* (2013.01)
*G06F 21/57* (2013.01)

(52) U.S. Cl.
CPC .......... *G06F 21/566* (2013.01); *G06F 21/567* (2013.01); *G06F 21/577* (2013.01); *G06F 2221/034* (2013.01)

(58) Field of Classification Search
CPC ...... G06F 21/566; G06F 21/567; G06F 21/56; G06F 21/561; G06F 21/562; G06F 21/564; G06F 21/577
See application file for complete search history.

(56) References Cited

U.S. PATENT DOCUMENTS 10,482,239 B1 * 11/2019 Liu .................. G06F 21/563
2015/0186645 A1   7/2015 Aziz et al.
(Continued)

OTHER PUBLICATIONS

Cho et al, "Malware Similarity Analysis using API Sequence Alignments", retrieved on Oct. 2, 2019 at <<https:ffpdfs.semanticscholar.org/27b4/b35628cbc286af9c41fd7b51e9813ec409e4.pdf>>, Nov. 1, 2014, 12 pages.

(Continued)

*Primary Examiner* — Edward Zee
(74) *Attorney, Agent, or Firm* — Lee & Hayes, P.C.

(57) ABSTRACT

A security service can determine a synthetic context based at least in part on context data associated with a first malware sample, and detonate the first malware sample in the synthetic context to provide one or more first event records representing events performed by the first malware sample and detected during detonation. Additionally or alternatively, the security service can detonate the first malware sample and locate a second malware sample in a corpus based at least in part on the one or more first event records. Additionally or alternatively, the security service can receive event records representing events detected during a detonation of a first malware sample, the detonation based at least in part on context data, and locate a second malware sample in the corpus based at least in part on the one or more reference event records.

19 Claims, 14 Drawing Sheets

Related U.S. Application Data

(60) Provisional application No. 62/691,212, filed on Jun. 28, 2018.

(56) References Cited

U.S. PATENT DOCUMENTS

| | | |
|---|---|---|
| 2017/0249463 A1 | 8/2017 | Marsden et al. |
| 2018/0203998 A1 | 7/2018 | Maisel et al. |
| 2018/0276371 A1* | 9/2018 | Haukli .................. G06F 21/566 |
| 2021/0117544 A1 | 4/2021 | Kurtz et al. |

OTHER PUBLICATIONS

Office Action for U.S. Appl. No. 17/255,958, mailed on May 23, 2023, George Robert Kurtz, "Analysis of Malware", 10 pages.
Office Action for U.S. Appl. No. 17/255,958, mailed on Oct. 5, 2023, George Robert Kurtz, "Analysis of Malware", 12 pages.
PCT Search Report and Written Opinion mailed Oct. 11, 2019 for PCT Application No. PCT/US2019/039839, 12 pages.

* cited by examiner

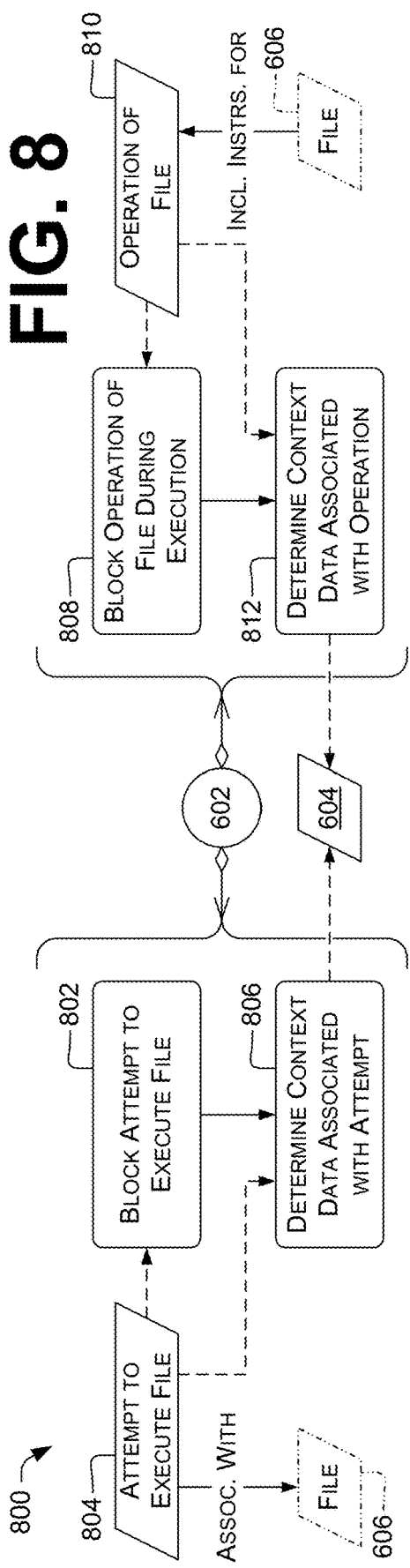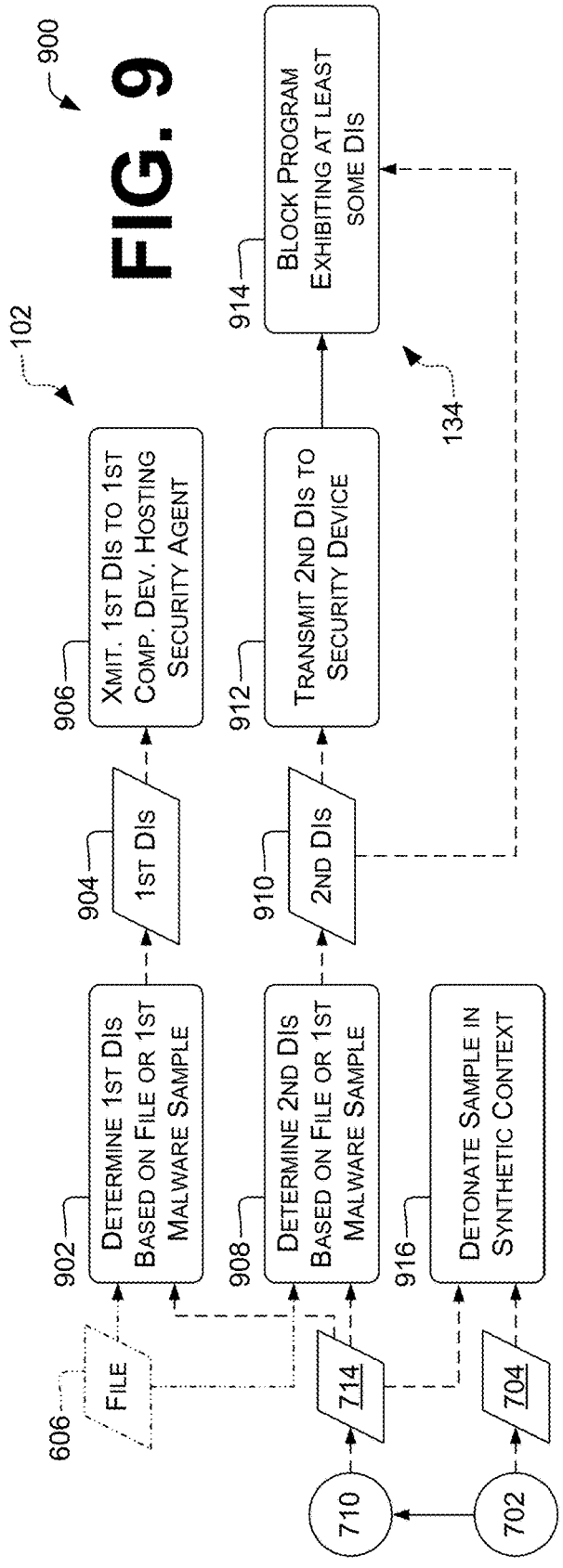

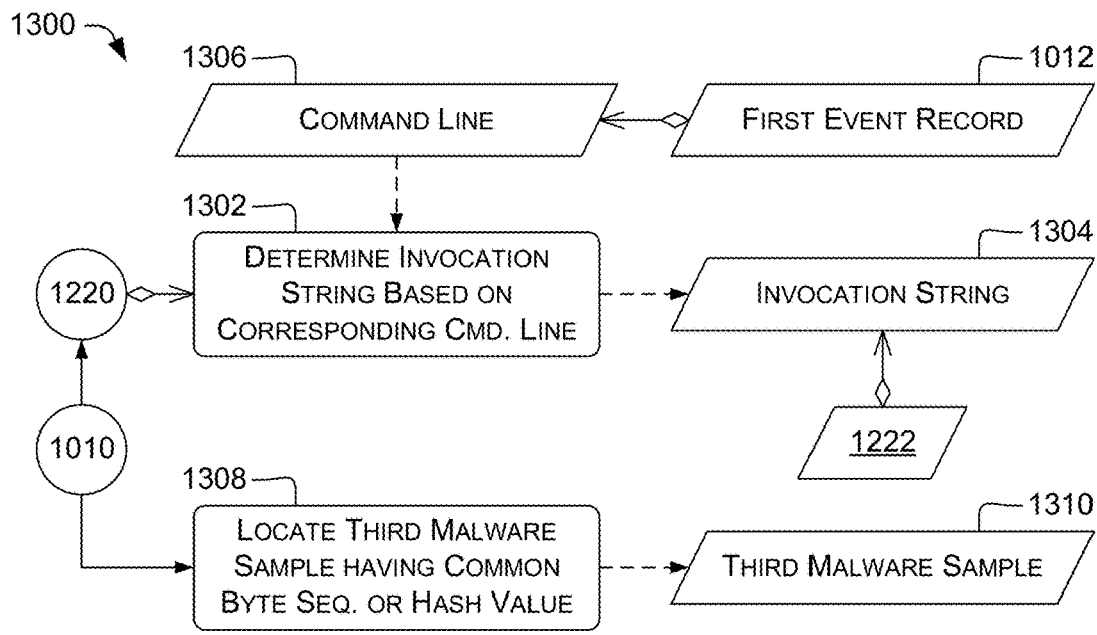
FIG. 13
FIG. 14
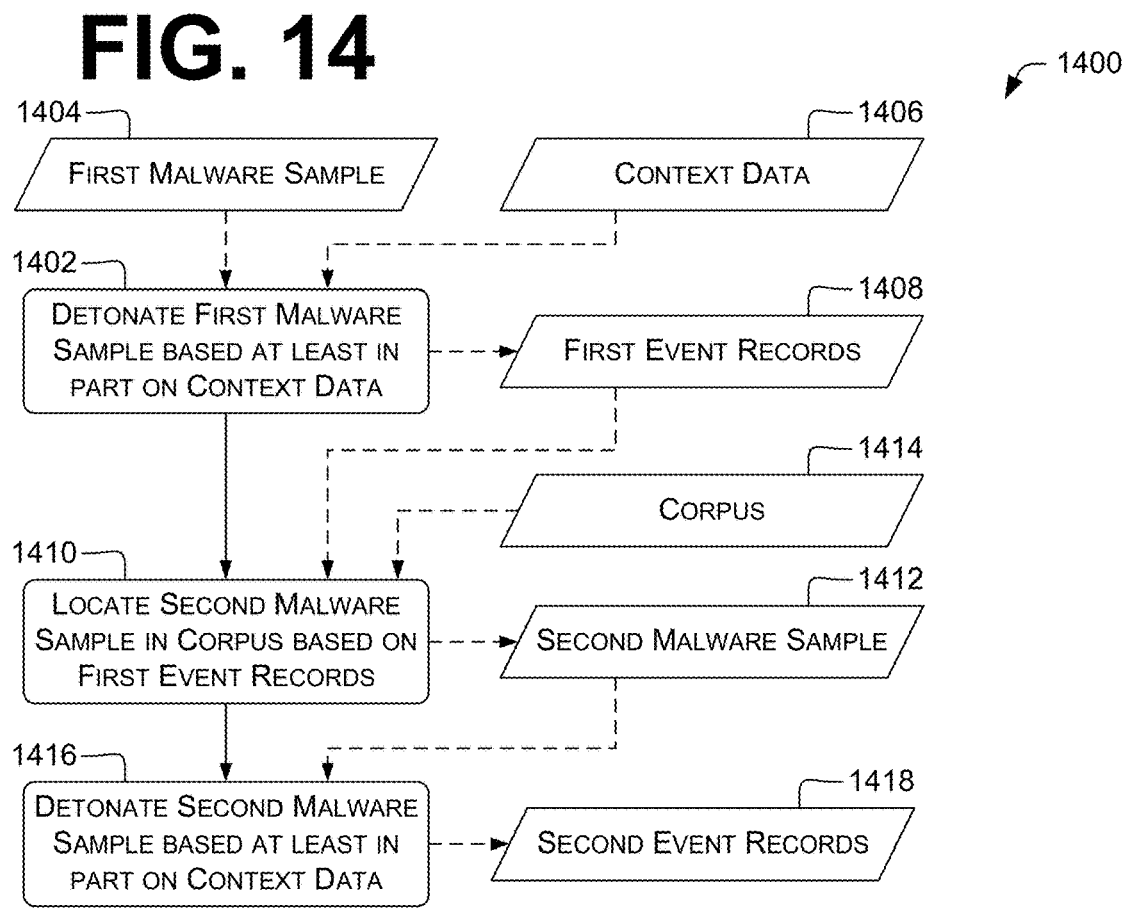

ANALYSIS OF MALWARE

CROSS-REFERENCE TO RELATED APPLICATIONS

This application is a continuation of and claims priority to U.S. patent application Ser. No. 17/255,958, filed on Dec. 23, 2020, which is a nonprovisional application of, and claims priority to and the benefit of, U.S. Patent Application Ser. No. 62/691,212, filed Jun. 28, 2018, and entitled "Malware Analysis," the entirety of which is incorporated herein by reference.

BACKGROUND

With computer and Internet use forming an ever-greater part of day-to-day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is described with reference to the accompanying figures, in which the use of the same reference numbers in different figures indicates similar or identical items or features. The attached drawings are for purposes of illustration and are not necessarily to scale. For brevity of illustration, an arrow beginning with a diamond connects a first component or operation (at the diamond end) to at least one second component or operation that is or can be included in the first component or operation in at least one example.

FIG. 8 illustrates example techniques for detecting and mitigating malicious activities.

FIG. 9 illustrates example techniques for analyzing samples or updating security subsystems.

FIG. 13 illustrates example techniques for analyzing malware samples.

FIG. 14 illustrates an example technique for analyzing a malware sample.

DETAILED DESCRIPTION

Overview

Figure 1:
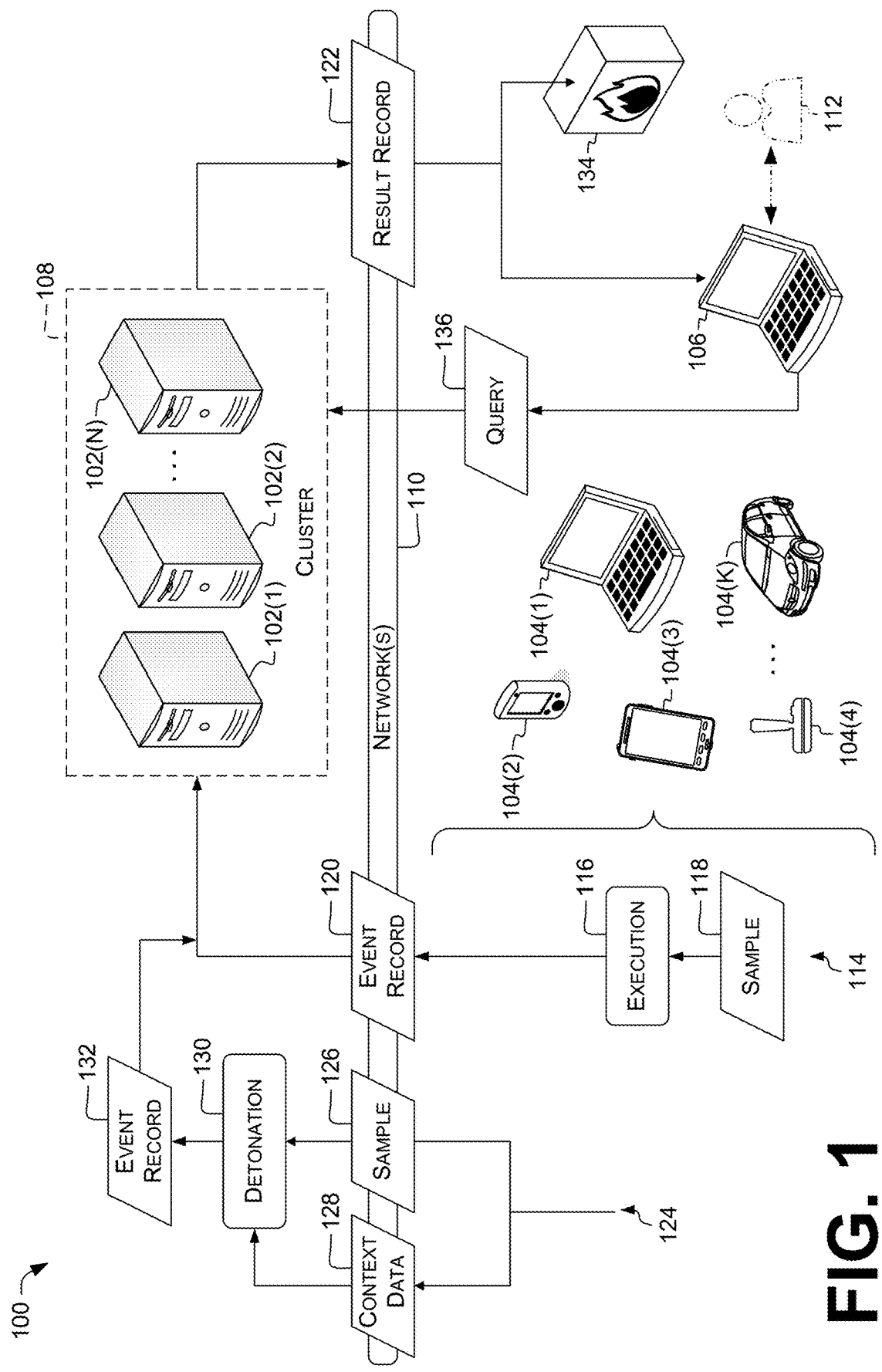
FIG. 1 is a block diagram depicting example scenarios for detecting malware and for collecting, processing, and reporting event data.

Some examples relate to receiving or processing event stream(s) or sequence(s) indicating activities of system components such as processes or threads. Many system components, including malicious system components, can be identified by the operations they perform. For example, a file-copy program repeatedly reads data from a source and writes data to a destination. Many system components can be identified by their relationships with other system components, e.g., in a process genealogy. For example, a ransomware program may repeatedly spawn a process to encrypt a file, and then spawn a process to delete the un-encrypted original. Some examples relate to detecting patterns of operations or process geneaologies, or otherwise characterizing malware samples. Some examples locate similar malware based on groups of operations determined from detected events, permitting detection of similar malware without requiring disassembly or other inspection of the code for that malware.

In some examples, each of one or more monitored computing devices is equipped with a security agent (e.g., a service or daemon) to monitor events on that device. Those monitored computing devices may be in communication with devices of a security service system, e.g., implemented using cloud technology. For clarity, processes executing on a computing system (e.g., a monitored device or a test system) are referred to herein as "tasks" to distinguish them from technique 500 and other sequences of operations described with reference to the flowcharts and dataflow diagrams herein. In some examples, events are collected from a running task during a "detonation" process in which software that directly or indirectly spawns the task is executed on an instrumented test system.

Detonation and analysis as described herein permit determining, e.g., what the effect of a blocked malware program would have been if it had not been blocked, or what detectable indicators (DIs), e.g., indicators of compromise (IOCs), may indicate the presence of the malware program or similar malware programs. This can increase the success rate of blocking malware, compared to some prior schemes that analyze only a single malware file. Various examples permit fully automated upload, detonation, analysis, and reporting, which can reduce the time required for reports compared with some prior schemes that require manual intervention in the analysis or reporting processes.

In an example, a malware campaign that targeted the Netherlands included sending ~100,000 Word files to different users. All 100 k of those files downloaded one of only 10 second-stage payloads. Techniques herein can be used to locate similar files, e.g., early in a malware campaign of that type (or of other types). This can permit more effectively blocking the malware campaign by reducing the probability that a slight variant (e.g., a differently-obfuscated Word file) will evade detection. For example, locating samples similar to one of the second-stage payloads can permit detecting additional DIs characteristic of the family of second-stage payloads, and blocking samples that exhibit those DIs.

Some examples herein relate to detecting or analyzing malware or malicious behavior, e.g., by recording events representing activities performed by programs (e.g., during detonation), and analyzing those events. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

Some examples herein relate to detection or classification of malware, e.g., newly-discovered malware. Some examples herein relate to classifying files (or other data streams, and likewise throughout this discussion). Classifications can include, e.g., malware vs. non-malware, type of malware (e.g., virus vs. Trojan), or family of malware (WannaCry, Cryptolocker, PoisonIvy, etc.). Some examples permit responding to detection of malware by blocking similar malware.

Example techniques described herein may refer to tasks and modules running on a computing device, e.g., in the context of detecting activities of malware or of attackers. However, the techniques may also apply to other non-malicious software, tasks, or other system components. For example, techniques described herein can be used in determining relationships or behavioral similarities between tasks. Accordingly, techniques discussed herein for filtering events may be used by, among others, anti-malware security researchers, white-hat vulnerability researchers, or other analysts of events. In some examples, events can associated with various system components, e.g., data streams; tasks; operating systems; operating-system instances under a hypervisor; files; memory regions; central processing units (CPUs) or cores thereof; network interfaces or other communications devices; peripherals; fixed or removable storage devices; or add-in cards.

Some examples herein permit analyzing a data stream including data stored in, e.g., a file, a disk boot sector or partition root sector, or a block of memory, or a portion thereof. For brevity, the term "sample" herein refers to a data stream, or a portion of a data stream being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample. A sample can be detonated on a detonation system providing sandboxed detonation features that can, e.g., prevent the software being detonated from accessing protected portions of the test system. In some examples, instead of or in addition to sandboxing, detonation can be performed on a system that is restored to a known, clean configuration before each detonation.

Various entities, configurations of electronic devices, and methods for detecting malware are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Throughout this document, "dirty" is used to refer to data streams associated with malware, feature vectors representing such data streams, or other values associated with, produced by, or indicative of malware or malicious behavior. For example, a host (e.g., a server) described as "dirty" may be known to host dirty samples. A domain name associated with a dirty host can itself be described as "dirty" By contrast, "clean" is used to refer to values not associated with, produced by, or indicative of malware or malicious behavior. A "false detection" or "false positive" is a determination that a data stream is associated with malware when, in fact, that data stream is not associated with malware. A "false miss" or "false negative" is a determination that a data stream is not associated with malware when, in fact, that data stream is indeed associated with malware.

For brevity and clarity herein, several Perl notations are used. "$name= . . . " defines an entity called "name" with the value " . . . ". "qr{ . . . }" represents the Perl (or Perl-compatible, PCRE) regular expression " . . . ". The closing brace may be followed by modifiers, e.g., x for insignificant whitespace in the pattern or i for case insensitivity. "q{ . . . }" represents the literal text " . . . ", except that "\{"is replaced with"{" in " . . . ", and likewise "\}" with "}" and "\\" with "\". "qw{ . . . }" represents the list of whitespace-delimited items in the string " . . . ". For example, qw{'hello 42' 1337} is the list with the three items "'hello", "42'", and "1337".

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people or other entities that are all part of an "adversary" group.

Example embodiments described or shown herein are provided for purposes of illustration. Statements made herein may be specific to a particular example embodiment, or a specific aspect of that example embodiment, and should not be construed as limiting other example embodiments described herein. Features described with regard to one type of example embodiment may be applicable to other types of example embodiments as well. The features discussed herein are not limited to the specific usage scenarios with respect to which they are discussed.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein. Section headers in this Detailed Description are solely for convenience in reading. Some examples include features from only one section. Some examples include features from more than one section. Use of the terms "first," "second," and similar in the Detailed Description does not imply or require chronological order unless expressly stated.

Illustrative Environments

FIG. 1 shows example scenarios 100 in which examples of malware-detection or -analysis systems can operate or in which malware-detection or -analysis methods such as those described herein can be performed. Scenarios 100 can be deployed, e.g., for responding to cyber-attacks, e.g., by detecting, analyzing, remediating, or mitigating the effects of, those attacks. Illustrated devices or components of scenarios 100 include computing device(s) 102(1)-102(N) (individually or collectively referred to herein with reference 102) (N≥1), computing devices 104(1)-104(K) (similarly referred to with reference 104) (K≥1), and computing device(s) 106 (for brevity, only one is shown). In some examples, N and K may be the same as, or different from, each other.

In the illustrated example, computing device(s) 102(1)-102(N) can be computing nodes in a cluster computing system 108 ("computing cluster" or "cluster") having several discrete computing nodes (device(s) 102) that work together to accomplish a computing task assigned to the cluster 108 as a whole. In some examples, computing device(s) 104 or 106 can be clients of cluster 108 and can submit computing tasks to cluster 108 or receive task results from cluster 108. Computing devices 102(1)-102(N) in cluster 108 can, e.g., share resources, balance load, increase performance, or provide fail-over support or redundancy.

Some cluster-based systems can have all or a portion of the cluster deployed in the cloud, e.g., using a cloud service such as GOOGLE CLOUD PLATFORM. Cloud computing allows for computing resources to be provided as services rather than a deliverable product. For example, in a cloud-computing environment, resources such as computing power, software, information, or network connectivity are provided (for example, through a rental agreement) over a network, such as the Internet. Cloud resources can be provided for internal use within an organization or for sale to outside customers. In some examples, computer security service providers can operate cluster 108, or can operate or subscribe to a cloud service providing computing resources.

In other examples, cluster 108 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

In some examples, computing devices 102, 104, and 106 can intercommunicate to participate in or carry out malware detection or analysis as described herein. For example, computing devices 104 can be monitored computing devices. Monitored computing devices 104 can include or run security agents (e.g., kernel-level security agents or other security agent software or firmware) that provide data of events to computing devices 102. Computing devices 102 can process the data of the events, and provide analysis results to computing device(s) 106.

Different devices or types of computing devices 102 and 104 can have different needs or ways of interacting with cluster 108. For example, cluster 108 can interact with discrete request/response communications to computing devices 104 to determine additional data. Additionally or alternatively, computing devices 104 can be data sources (e.g., running security agents) and can interact with cluster 108 with discrete or ongoing transmissions of event records to be handled. For example, a data source in a personal computing device 104(1) can provide to cluster 108 data of newly-installed executable files, e.g., after installation and before execution of those files; of newly-launched tasks; or of malware detected on computing device 104(1).

In some examples, computing devices 102, 104, or 106 can communicate with each other or with other computing devices via one or more network(s) 110. For example, network(s) 110 can include public networks such as the Internet, private networks such as an institutional or personal intranet, or combination(s) of private and public networks. Communications between computing devices 102, 104, or 106 via network(s) 110 can be structured, e.g., according to a defined application programming interfaces (API), or multiple APIs. For example, data can be retrieved via network(s) 110, e.g., using a Hypertext Transfer Protocol (HTTP) request such as a GET to a Web Services or Representational State Transfer (REST) API endpoint. Data can be returned in formats including, but not limited to, Extensible Markup Language (XML); JavaScript Object Notation (JSON); Hypertext Markup Language (HTML); spreadsheet formats such as Comma-Separated Value (CSV); archive formats such as gzip; or others. Remote Procedure Call (RPC) APIs such as OSF DCE RPC or D-Bus, or other types of APIs, can additionally or alternatively be used for network communications. In some examples, communications can be implemented using Web techniques such as AJAX, Comet, or WebSockets.

In some examples, computing device(s) 106 interact with entities 112 (for brevity, only one is shown; depicted in phantom). Entities 112 can be security analysts working for a security service, in some examples. Additionally or alternatively, entities 112 can include systems, devices, parties such as users, or other features with which computing devices 106 can interact. For brevity, examples of entity 112 are discussed herein with reference to users of a computing system; however, these examples are not limiting. In some examples, a computing device 106 is operated by an entity 112, e.g., a security analyst, who requests result records 122 from cluster 108 via computing device 106. Computing device 106 then receives the result records 122 and presents the result records 122 to entity 112 via a user interface.

In some examples, malware-detection or -analysis algorithms can be performed on a computing device 102. Search results can be presented on such computing devices or on other computing devices (e.g., computing devices 104 or 106) having one or more input devices, such as a physical keyboard, a soft keyboard, a touch screen, a touch pad, microphone(s), or camera(s). In some examples, functions described herein can be shared between one or more computing device(s) 102 and one or more computing device(s) 104 or 106. For example, events can be analyzed by computing device(s) 102 alone, or by any combination of at least two of a computing device 102, 104, 106 in a coordinated manner.

In illustrated scenario 114, computing devices 104 perform execution 116 of (e.g., execute) sample(s) 118, e.g., executables to be tested for the presence of malware. Execution 116 can include sandboxed execution. Examples are discussed herein, e.g., with reference to FIG. 4. Computing devices 104 can record event records 120 during execution 116 and transmit the event records 120 via network 110 to computing devices 102. Computing devices 102 can analyze the event records 120 to determine suspicious events. Computing devices 102 can provide result record(s) 122 to computing device(s) 106. The result record(s) 122 can include analysis results, e.g., as discussed herein with reference to FIGS. 4 and 5.

In illustrated scenario 124, a computing device 104 (or other system, and likewise throughout) can run a security agent (or other component, and likewise throughout) for detecting malware, e.g., malicious executables, libraries, documents, or other types of data streams. The security agent can detect or block a suspicious or malicious sample 126. Additionally or alternatively, the security agent can select sample 126 for analysis, e.g., because sample 126 has not previously been analyzed, or for other reasons. In some examples, sample 126 is known to be malicious; in other examples, sample 126 is not known to be malicious. After sample 126 is selected, computing device 104 can then (e.g., subsequent or in response to the selection) provide the sample 126 (or an indication or portion thereof) to computing devices 102 via network 110.

The computing device 104 can also provide context data 128 to computing devices 102 via network 110. Context data 128 can accompany or be associated with sample 126. Context data 128 can indicate runtime information such as a filename of sample 126, a file path of sample 126, or a command line with which the sample 126 was executed (e.g., for executable samples 126), or credentials or permissions under which the sample 126 was executed (or would have been executed if not blocked by the security agent). Context data 128 can additionally or alternatively indicate environment information such as a date, time, or timestamp of CPU architecture or bitness, an operating system (OS) type (e.g., WINDOWS or LINUX), an OS version or patch level, devices attached, or a username under which the sample 126 was created (e.g., extracted) or invoked. Context data 128 can additionally or alternatively indicate installation information such as OS patches installed (e.g., hotfixes or MSKB items), other software installed, drivers installed, or versions of any of those.

In some examples, computing device 104 can provide sample 126 to computing devices 102 via network 110, e.g., in response to identification of sample 126 as suspicious or otherwise pertinent. For example, computing device 104 can run anti-virus software or other software described herein or known in prior techniques to identify sample 126 as suspicious. Computing device 104 can, in response, provide sample 126 to computing devices 102. Additionally or alternatively, computing device 104 can provide sample 126 to computing devices 102 in response to an express user request (e.g., user selects the file and invokes a "Scan Now" function, or uploads the file to a security-testing Web site) or a request from computing devices 102.

In some examples, computing device 104 can detect creation of a newly observed sample 126. For example, computing device 104 can detect creation of a file, shared-memory region, or other data stream. Computing device 104 can analyze the name, contents, or other data or metadata (e.g., attributes) of that data stream and determine that the data stream has not previously been observed, e.g., by computing device 104 or by computing device(s) 102. For example, computing device 104 can determine a hash of the contents of the data stream and determine that the hash is missing from a database of previously seen hashes. In response to detection of a newly observed sample 126, computing device 104 can provide sample 126 to computing devices 102.

For brevity, "invoking" and forms thereof, used herein, refer to executing a program, or attempting to execute the program (in the case of blocked malware). Blocked malware may be invoked but not execute due to interdiction by a security agent, for example. A data item "tied to" a program is a data item that was present or used during the execution of the program, or that was present or available to the program when it was invoked. For example, the command line tied to a program is the command line that was used to invoke that program, e.g., the command line with which the program was started, or the command line with which a blocked program was attempted to be started. An event or action "tied to" a task, sample, or other system component is an event or action that was performed by that system component, or that would have been performed by the system component had the event not been blocked, e.g., by a security agent.

Computing devices 102 can then perform detonation 130 of sample 126, e.g., sandboxed detonation using CUCKOO, FALCON SANDBOX, or another detonation framework. Detonation 130 can include setting up the detonation environment, or executing the sample 126, based at least in part on the context data 128. For example, sample 126 can be detonated on a virtual machine (VM) having the same OS type and bitness, and in some examples also the same OS version or patch level, as does the monitored computing device 104. In some examples, sample 126 can be detonated using the command line tied to sample 126 on the monitored computing device 104 by which sample 126 was provided. Computing devices 102 can determine event records 132 (which can be of the same format as event records 120, in some examples) during or after detonation 130. In some examples, detonation 130 can include performing at least one operation described herein with reference to execution 116. Further examples are discussed herein, e.g., with reference to FIGS. 4 and 5.

Computing devices 102 can then analyze the event records 120, 132 and provide result records 122. Scenarios 114 and 124 can be used individually or together. For example, some samples 118 can be analyzed as in scenario 114, and other samples 126 can be analyzed as in scenario 124. In some examples, result records 122 can identify related malware or other likely targets. For example, result records 122 can include DIs, e.g., IOCs, that a security agent can deploy to proactively protect against the related malware. In some examples, computing devices 102 or other components, e.g., management servers, can provide result records 122 or portions thereof to other computing systems, depicted as network function 134 (e.g., a firewall or other security device, or a monitored computing device). The network functions 134 (e.g., firewalls, routers, Web proxies, Web gateways, email proxies, other proxies, packet-inspection devices, servers, or monitored computing devices 104) receiving the result records 122 (or portions thereof, and likewise throughout) can update their internal databases or otherwise configure themselves to reject attacks indicated by the result records 122. In some examples, security actions such as mitigation can include blocking execution of tasks, terminating tasks, blocking DNS lookups or network connections, terminating DNS lookups or network connections already in progress, or deleting, renaming, or quarantining files.

In some examples, computing device 106, e.g., in response to a request from entity 112, or computing device 104, e.g., in response to a user request or stored security rules or a detected event, can transmit a query 136 to computing device 102 or cluster 108. For example, query 136 can include a SHA256 or other unique ID of a file. The computing device 102 can lookup data associated with that SHA256. The data can include, e.g., one or more result records 122, or a report that presents results of detonation or other analyses in a standardized form. If a report or other data is found, the computing device 102 can retrieve one or more of the "imphash", "ssdeep" hash, "fuzzyhash" (tasktree hash), or other hashes from that report or other data. The computing device 102 can then search for other files or reports that have at least one of those hashes in common with the file identified in the query. The computing device 102 can then transmit result record(s) 122 indicating those other files or reports, or properties thereof (e.g., DIs observed while detonating the other files). In some examples, other hashes, fuzzy hashes, or similarity measures described below can be used to determine query results, in addition to or instead of the examples noted above.

A sample 118 or 126, e.g., an executable file or other data stream, can be associated with malware if, e.g., the data stream is itself, or includes, malicious code; the data stream is (or is likely) at least a portion of a grouping of malicious code (e.g., a formerly-benign file that has been modified by a file infector virus); the data stream is, or is output by, a generator commonly used for generating malware (e.g., a packer or installer); or the data stream is an input file relied on by malware (e.g., a large sequence of data designed to trigger a buffer overflow that will permit remote code execution, or shellcode embedded in a document file). In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with malware. Some generators are used for malware, and are also used for legitimate software. A determination that a data stream is associated with malware does not necessarily require or guarantee that the data stream in fact be malware. In some examples, determinations herein (e.g., result records 122 or outputs from operations shown in FIGS. 3-19) can be used by a security analyst in triaging data streams, and can permit the security analyst to readily separate data streams based on a likelihood they are in fact malware. In some examples, a computer-security system (e.g., a security agent running on computing device 104) can delete or quarantine files associated with malware, or terminate tasks launched from data streams associated with malware.

In some examples, malware comprises malicious data instead of or in addition to malicious code. Such data is also considered to be associated with malware. For example, some programs may have bugs that prevent them from correctly processing certain inputs. Examples include Structured Query Language (SQL) injection attacks, in which a benign program populates a query with unescaped external data. For example, the query template "SELECT cost from Products WHERE name LIKE '%{$name}%';" can be abused by providing malicious data to be populated in place of the placeholder "{$name}". When the malicious data $name="foo'; DROP TABLE Products;--" is substituted into the query template, for example, the resulting query will cause the "Products" table of the database to be deleted ("dropped"), causing unexpected loss of data. In another example, malicious data can include malformed UTF-8 (Unicode Transformation Format—8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

Except as expressly indicated otherwise, a determination of whether a data stream is associated with malware is carried out programmatically by or using catalogs or other techniques herein. Various examples herein can be performed without human judgment of whether a program or data block is in fact malicious. Techniques herein can permit more readily identifying potential computational threats, e.g., in the context of an antivirus program, cloud security service, or on-premises security appliance.

In some examples, any of computing device(s) 102, 104, or 106 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out malware detection or analysis, or other operations described herein, e.g., for event-analysis purposes, e.g., in support of malware or attack detection.

In some examples, any of computing device(s) 102, 104, or 106 can include, but are not limited to, Internet of Things (IoT) devices, e.g., devices that detect malware or malicious activity; devices that process information or files; or devices that store, maintain, or search distributed databases. Additionally or alternatively, IoT devices can include sensors, switches, controllers, appliances, luminaires, lamps, media-streaming devices such as radios, TVs, Internet media players (e.g., ROKU), home routers (e.g., WIFI routers), DSL modems, cable modems, or network bridges, remote controls, smart door locks, home-control systems, physical-security systems (e.g., sensors to detect the opening of windows or doors), or other devices that measure a physical quantity or property and transmit an indication thereof via a network, or that receive data via a network and cause a corresponding physical action to take place. Attackers have recently targeted such devices, e.g., as members of botnets or as participants in DDOS attacks. In some examples, IoT devices can upload malware samples or context data, or can retrieve DIs and block malware exhibiting those DIs. This can reduce the occurrence, e.g., of IoT DDOS botnets.

Network(s) 110 can include any type of wired or wireless network, including but not limited to personal area networks (PANs) such as BLUETOOTH and ZIGBEE, local area networks (LANs) such as Ethernet and WI-FI, wide area networks (WANs), satellite networks, cable networks, WiMAX networks, cellular mobile communications networks (e.g., 3G, 4G, and so forth) or any combination thereof. Network(s) 110 can utilize communications protocols, such as, for example, packet-based or datagram-based protocols such as Internet Protocol (IP), Transmission Control Protocol (TCP), User Datagram Protocol (UDP), other types of protocols, or combinations or IP-based evolutions thereof. Moreover, network(s) 110 can also include a number of devices that facilitate network communications or form a hardware infrastructure for the networks, such as switches, routers, gateways, access points, firewalls, base stations, wireless access points (WAPs), repeaters, backbone devices, and the like. Network(s) 110 can also include devices that facilitate communications between computing devices 102 or 104 using bus protocols of various topologies, e.g., crossbar switches, INFINIBAND switches, or FIBRE CHANNEL switches or hubs.

As noted above, network(s) 110 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Illustrative Configurations and Data Structures

Figure 2:
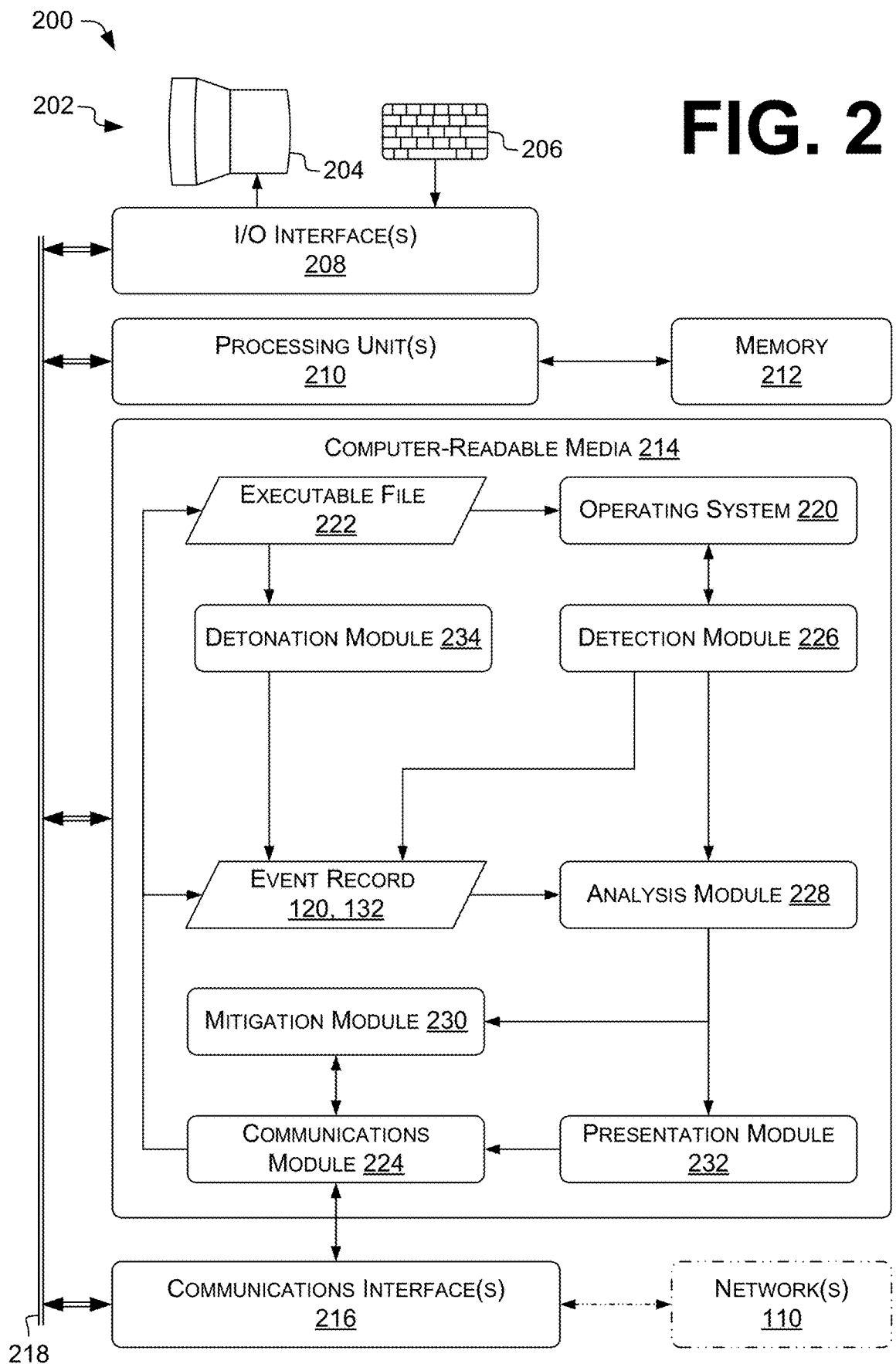
FIG. 2 is a block diagram depicting an example computing device configured to participate in malware detection or analysis.

FIG. 2 is an illustrative diagram that shows example components of a computing device 200, which can represent computing device(s) 102, 104, or 106. Computing device 200 can be, implement, include, or be included in, a system, device, or apparatus, or portion thereof, for detecting malware, analyzing malware, or performing detonation as described herein.

Computing device 200 can include or be connected to a user interface (UI) 202. In some examples, UI 202 can be configured to permit a user, e.g., entity 112, to retrieve result records 122 or other information about suspicious events, or to control or otherwise interact with cluster 108 or computing devices 102 therein. Accordingly, actions such as presenting information of or corresponding to a result record 122 to entity 112 can be taken via UI 202.

In some examples, UI 202 can include one or more output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display. Display 204 can be a component of a touchscreen, or can include a touchscreen.

UI 202 can include one or more input devices, which can be integral or peripheral to computing device 200. The input devices can include user-operable input device 206 (depicted as a keyboard), or device(s) configured for input from other computing device(s) 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 112, via UI 202.

Computing device 200 can further include one or more input/output (I/O) interface(s) 208 to allow computing device 200 to communicate with input, output, or I/O devices. Examples of such devices can include components of UI 202 such as described above. Other examples of such devices can include power meters, accelerometers, and other devices for measuring properties of entity 112, computing device 200, or another computing device 102, 104, or 106. Input data, e.g., of user inputs on user-operable input device 206, can be received via I/O interface(s) 208. Output data, e.g., of UI screens, can be provided via I/O interface(s) 208 to display 204, e.g., for viewing by entity 112.

The computing device 200 can include a processing unit 210. In some examples, processing unit 210 can include or be connected to a memory 212, e.g., a main RAM or a cache. Processing unit 210 can be operably coupled to the I/O interface 208 and to at least one computer-readable media 214 (CRM), e.g., at least one tangible non-transitory computer-readable medium or other computer storage medium. In some examples, CRM 214 can store instructions executable by the processing unit 210, or instructions executable by external processing units such as by an external CPU or other processor. Any of these instructions are referred to herein as computer-executable instructions or processor-executable instructions.

Processing unit 210 can be or include one or more single-core processors, multi-core processors, CPUs, graphics processing units (GPUs), general-purpose GPUs (GPGPUs), or hardware logic components configured, e.g., via specialized programming from modules or APIs, to perform functions described herein. Accordingly, although processing unit 210 is described in singular terms for brevity, computing device 200 can include any number of processors or other components described above. For example, processing units 210 can be or include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit 210 can represent a hybrid device, such as a device from ALTERA or XILINX that includes a CPU core embedded in an FPGA fabric. These or other hardware logic components can operate independently or, in some instances, can be driven by a CPU.

In some examples, at least one computing device 102, 104, or 106, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for GPUs and CPUs. In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media and communication media. Computer storage media includes tangible, non-transitory storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by processing unit 210 or other components of computing device 200.

In contrast to computer storage media, communication media can embody computer-readable instructions, data structures, program modules, or other data in a modulated data signal, such as a carrier wave, or other transmission mechanism. As defined herein, computer storage media does not include communication media.

The computing device 200 can also include a communications interface 216, which can include a transceiver device such as a network interface controller (NIC) to send and receive communications over a network 110 (shown in phantom), e.g., as discussed above. Communications interface 216 can include any number of network, bus, or memory interfaces, in any combination, whether packaged together or separately. In some examples, communications interface 216 can include a memory bus internal to a particular computing device 200, transmitting or providing data via communications interface 216 can include storing the data in memory 212 or CRM 214, and receiving via communications interface 216 can include retrieving data from memory 212 or CRM 214.

In some examples, the communications interface 216 can include, but is not limited to, a transceiver for any wired or wireless network, such as those described herein with reference to FIG. 1. The communications interface 216 can include a wired I/O interface, such as a serial interface, a Universal Serial Bus (USB) interface, or other wired interfaces. The communications interface 216 can additionally or alternatively include at least one user-interface device or UI 202, at least one bus such as a memory bus or local bus, at least one memory interface, or at least one hardwired interface such as a 0-20 mA control line. Communications interface(s) 216 can include any of the components described in this paragraph.

In some examples, the processing unit 210 can access data on the CRM 214 via a bus 218. I/O interface 208 and communications interface 216 can also communicate with processing unit 210 via bus 218. For example, communications interface 216 can exchange data with UI 202 via bus 218 and I/O interface(s) 208. Bus 218 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

In some examples, CRM 214 can store instructions of an operating system (OS) 220. CRM 214 can additionally or alternatively store at least one executable file 222, which can be an example of a system component, a data stream, or a sample 118 or 126. In some examples, OS 220 can cause processing unit 210 to load computer-executable instructions from executable file 222 into a RAM or other high-speed memory, e.g., memory 212, or to otherwise prepare computer-executable instructions from executable file 222 for execution by processing unit 210. Some examples, e.g., bare-metal embedded-systems configurations, can include a loader but not an OS 220. OS 220 can additionally or alternatively load other types of files, e.g., data files.

In some examples, computing device 200 operates a hypervisor, virtualization environment, sandbox, or other software or firmware layer in addition to executable file 222, OS 220, and the hardware shown as components 210-218. In some of those examples, CRM 214 can represent a CRM or portion of a CRM accessible to a virtualization guest, and OS 220 can represent the virtualization guest OS. In some examples, OS 220 can represent a sandboxed environment in which executable file 222 is executed. In other examples, executable file 222 can execute directly on a non-virtualized OS 220 that accesses non-virtualized components 210-218.

In some examples, a "control unit" as described herein includes processing unit 210. A control unit can also include, if required, memory 212, CRM 214, or portions of either or both of those. For example, a control unit can include a CPU or DSP and a computer storage medium or other tangible, non-transitory CRM storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing executable instructions. Accordingly, references herein to computer-executable instructions also refer to wiring or configuration to cause control units that do not use computer-executable instructions to perform the described functions.

Computer-executable instructions or other data stored on CRM 214 can include a communications module 224, a detection module 226, an analysis module 228, a mitigation module 230, a presentation module 232, a detonation module 234, or other modules, programs, or applications that are loadable and executable by processing unit 210. Processing unit 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the OS 220 or the above-listed modules 224-232. In some examples, computer-executable instructions on CRM 214 can additionally or alternatively include instructions of a Web browser, smartphone app or desktop application, background service conducting or monitoring network communications, or instant-messaging client, or can include components of any of those configured to perform functions described herein (e.g., of detection module 226). Such programs or components can direct execution of, or include, functions of any of the listed modules.

In some examples not shown, one or more of the processing unit 210 in one of the computing device(s) 102 or 104 can be operably connected to CRM 214 in a different one of the computing device(s) 102 or 104, e.g., via communications interface 216 (discussed below) and network 110. For example, program code to perform steps of flow diagrams herein, e.g., as described herein with reference to modules 226 or 232, can be downloaded from a server, e.g., a computing device 102, to a client, e.g., a computing device 104 or 106 respectively, e.g., via the network 110, and executed by one or more processing units 210 in that computing device 104 or 106.

In some examples, the OS 220 can include components that enable or direct the computing device 200 to receive data via various inputs (e.g., user controls such as user-operable input device 206, network or communications interfaces such as communications interface 216, devices implementing memory 212, or sensors), and process the data using the processing unit 210 to generate output. The OS 220 can further include one or more components that present the output (e.g., display an image on an electronic display 204, store data in memory 212, or transmit data to another computing device 102, 104, or 106. The OS 220 can enable a user (e.g., entity 112) to interact with the computing device 200 using a UI 202. Additionally, the OS 220 can include components that perform various functions generally associated with an operating system, e.g., storage management and internal-device management. In some examples, the OS 220 or other modules stored in the CRM 214 can be configured to load security information, e.g., detection rules, from CRM 214 into memory 212 or other relatively higher-speed storage for access by processing unit 210.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the detection module 226 and the analysis module 228 can be combined in a single module that performs at least some of the example functions described below of those modules, as likewise the communications module 224 and the detection module 226 (e.g., on a monitored computing device 104), or the analysis module 228 and the mitigation module 230. In some examples, CRM 214 can include a subset of the above-described modules.

In the illustrated example, detection module 226 can detect events and provide corresponding event records 120. Additionally or alternatively, detonation module 234 can produce event records 132 describing events observed during detonation. Additionally or alternatively, communications module 224 can receive event records 120, 132 describing events. Analysis module 228 can locate related malware modules or determine DIs or confidence levels, as discussed herein with reference to at least FIGS. 3-19. Communications module 224 can provide the result records 122 indicating the sequences of events or modules that are associated with malware, e.g., to a computing device 106 or a UI 202.

In some examples, the communications module 224 or another module stored in CRM 214, executing at a computing device 104, can be configured to receive event records 120, 132, e.g., via user-operable input device 206, communications interface(s) 216, or a filesystem, and to provide the event records 120, 132 to a computing device 102. In some examples, communications module 224 or presentation module 232, running at a computing device 104 or 106 (e.g., executable instructions of one of those modules being executed by processor(s) of one of those computing devices), can be configured to transmit queries to a computing device 102, receive responses from computing device 102, and present the responses, e.g., via display 204. In some examples, analysis of events is carried out on computing device(s) 102. In some examples, analysis of events is carried out partly on computing device(s) 102, and partly on at least one of a computing device 104 or a computing device 106. In some examples, event records 120, 132, result records 122, or other transmissions described herein can be conducted, e.g., in the form of HTTP requests transmitted via TCP connections. For example, an HTTP request conveying a record, e.g., in a body of the request, can also include a URL parameter, HTTP cookie, or other data carrying identifying information or credentials associated with the record. Result records 122 and other transmissions herein can be conducted in an HTTP response header or body, or other response to a request or unprompted transmission.

In some examples, detection module 226 can include a hypervisor-level, kernel-level, or user-level security agent. In various embodiments, the kernel-level security agent can be installed on the host computing device in the form of a driver. For example, a driver or other implementation of detection module 226 can use hooks or filter drivers, or monitor memory (e.g., using OS- or CPU-supplied interfaces) or log files (e.g., using tail(1).

In some examples, the kernel-level security agent can operate on computing device 104 as a virtual machine/shadow operating system. The kernel-level security agent loads before the operating system of the host computing device, e.g., very early in the boot-time of the host computing device, by some of the first few dozen instructions in some examples. Pre-boot components of detection module 226 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 226 can be received from or operable with a security service. Such a security service may be implemented as a cloud of security service devices (referred to herein as a "security service cloud" or a "remote security system"). The security service cloud can, e.g., install the detection module 226 on the computing device 104, receive event records 120, 132 or other notifications of observed events from the detection module 226, perform analysis of data associated with those events, perform healing of the host computing device, or generate configuration updates and provide those updates to the detection module 226. These or other interactions between the kernel-level security agent and the security service cloud can enable a detection loop that defeats the malware update loop of adversaries.

In some examples, detection module 226 can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record 120, 132 including the forensic data.

In various embodiments, a collector may register with a hook or filter driver offered by the operating system to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 226. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 226 may include user-mode collectors to observe events that may not be visible to kernel-mode tasks. Such events could include, for example, rendering of display graphics for display on a display screen of the computing device 104. To observe these events, the detection module 226 can be configured to load user-mode collectors as user-mode modules of the computing device 104. Like the kernel-mode collectors described above, user-mode collectors may observe multiple kinds of events or activities, or each kind may be associated with a different user-mode collector. The events observed by the user-mode collectors may be specified by a configuration of the detection module 226. In some embodiments, the user-mode collectors observe all user mode events on the computing device 104 and the configuration specifies configurable filters for filtering and dispatching the events. In other embodiments, the configuration specifies which user-mode collectors should be loaded to observe specific types of events. In yet other embodiments, the configuration both specifies which user-mode collectors should be loaded and configurable filters for filtering and dispatching those events.

In some examples, the detection module 226 can build and maintain a model representing chains of execution activities and genealogies of tasks. This model can be used to track attributes, behaviors, or patterns of tasks executing on the computing device 104 and can enable an event consumer to determine when an event should be reported to the analysis module 228. Upon determining an occurrence of an event, the event consumer can perform any or all of: determining whether or not to ignore the event based at least in part on information stored in the situational model; updating the situational model and performing further observation, generating an event record 120, 132 to represent the determination that an event has occurred, notifying the security service cloud of the event (e.g., by transmitting event record 120, 132 to the security service cloud, e.g., in cluster 108), or healing the host computing device by halting execution of a task associated with malicious code or deceiving an adversary associated with the malicious code. In various embodiments, any or all of the observing, filtering, routing/dispatching, and/or utilizing of event consumers may occur in parallel with respect to multiple events.

For example, a ransomware sample 126 may include a WINDOWS batch file or UNIX shell script that repeatedly spawns GPG or another encryption program to encrypt the files in each of multiple directories. During real-time operation on a computing device 104, or during detonation, the genealogy of GPG tasks can be traced back to the batch file or shell script in an execution-chain model. An event consumer can determine that a "file open" event should be reported, e.g., if the event comes from a GPG task launched by a batch file, as determined via inspection of the execution chains represented in the situational model.

By detecting events based on chains of execution activities of the host computing device and other data described above, rather than on fixed signatures, the kernel-level security agent is able to better detect tasks associated with malicious code. While adversaries can easily change malware to avoid signature-based detection, it is significantly more difficult to avoid detection by an agent that monitors and analyzes events. Cluster 108 or other implementations of analysis module 228 can then process events from multiple computing devices 104 to detect more complex patterns of malicious activity.

Various examples described above, e.g., collectors, filters, routers/dispatchers, event consumers, models of execution chains, or other security-relevant operations or data, can additionally or alternatively be implemented as part of a detonation environment. This can permit evaluating the behavior of the sample 126 equally effectively either in production or in a research environment. In some examples, detonation can be carried out on a computing device 102 or a computing device 104.

In some examples, detection module 226, mitigation module 230, and communications module 224 run on a computing device 104. Analysis module 228, detonation module 234, and communications module 224 run on a computing device 102 or cluster 108. Presentation module 232 and communications module 224 run on a computing device 106. Mitigation module 230 and communications module 224 run on a network function 134 or other computing device, as discussed herein with reference to FIG. 1. In some examples, a single module performs the functions described with reference to computing device(s) 102 of both detonation module 234 and detection module 226.

Figure 3:
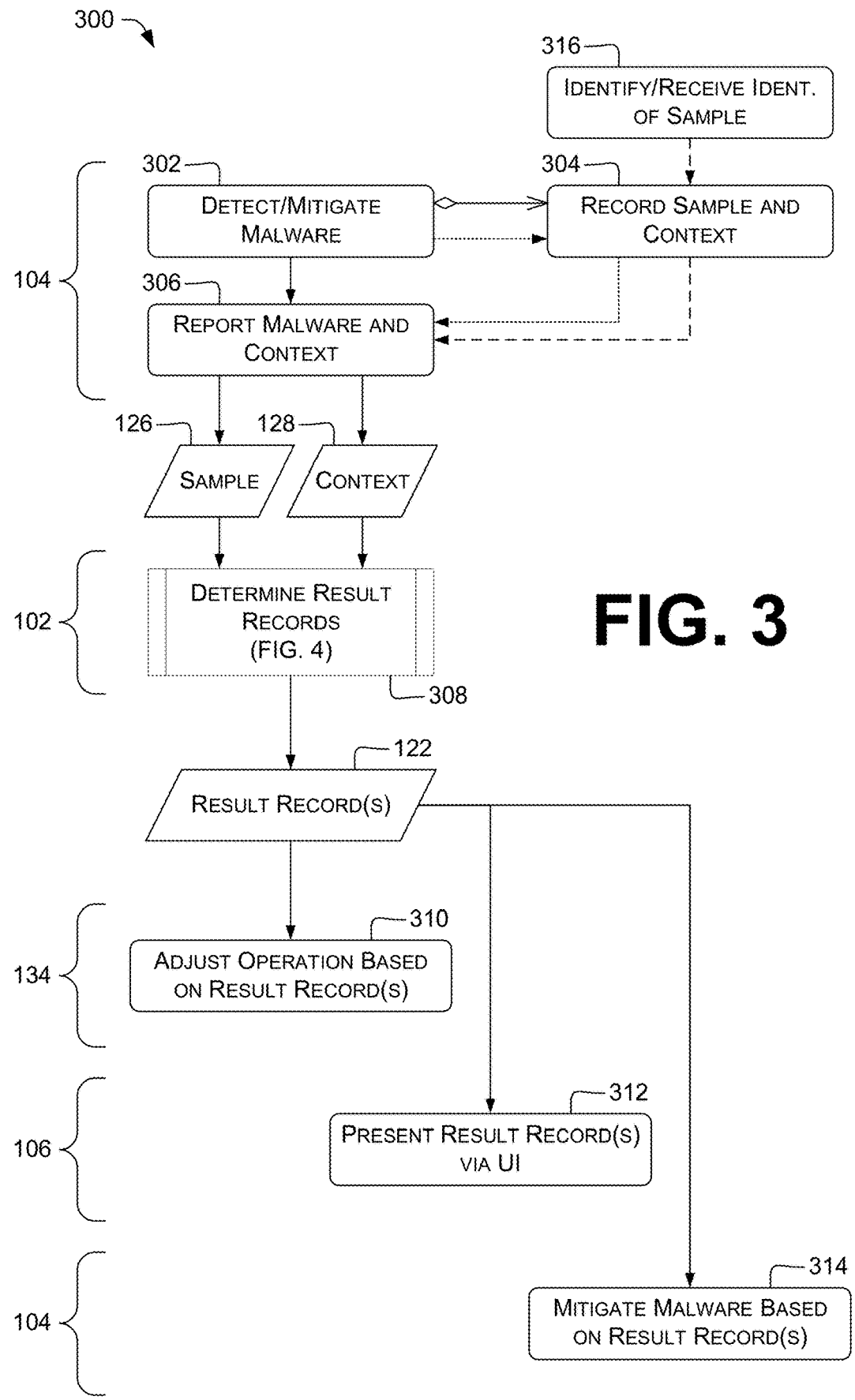
FIG. 3 illustrates components and dataflow involved in an example malware-detection or—analysis system.

FIG. 3 is a diagram 300 illustrating components and dataflow in an example malware-detection or -mitigation system. Illustrated data items can be stored in CRM 214, and illustrated operations can be carried out by control unit(s) of computing device(s) 200 (e.g., under control of modules stored in CRM 214) or by a control unit of another device. Portions of FIG. 3 are described with respect to a single event; however, the described operations can be carried out with respect to any number of events. Details of each of these operations are described herein with reference to FIGS. 4 and 5. The left side of the figure illustrates a division of functions between devices in FIG. 1 according to scenario 124. This is not limiting; scenario 114 can additionally or alternatively be used to implement operations described herein. The depicted operations can be used for one sample 126 or can be used repeatedly for more than one sample 126.

At 302, detection module 226 or mitigation module 230 running on a computing device 104 detects, or blocks or otherwise mitigates the effects of, known or suspected malware. Any known detection or mitigation technique can be used to detect the malware or mitigate its effects. Detection can include, e.g., checking file hashes or observing sequences of events. Mitigation can include, e.g., preventing tasks from executing, terminating tasks that have begun executing, deleting files or registry entries, or quarantining files. In some examples, operation 302 includes operation 304.

At 304, detection module 226 (or mitigation module 230, and likewise throughout the discussion of operation 304) running on computing device 104 records the sample 126 and context data 128. Operation 304 can follow or be included in operation 302. For example, mitigation module 230, when moving a malicious file into quarantine, can record (as part of context data 128) the old location of the file, the new location of the file, or the contents of the file, for later use. Additionally or alternatively, detection module 226 or mitigation module 230 can record (as part of context data 128) task ID(s) (e.g., process—"task" herein—ID(s), PID(s), group ID(s) (GID(s)), command line, environment-variable (e.g., PATH), task permissions, effective UID or GID, or other information about a malicious task before terminating that task.

In some examples, sample 126 is not part of the initial installation image on computing device 104, but instead is transmitted to, or loaded onto, computing device 104 at a time after initial installation. For example, sample 126 can be sent to a user of computing device 104 as an attachment to an email. In some examples, detection module 226 can determine, as part of the context data 128, information accompanying sample 126 upon its arrival at computing device 104. In some examples, sample 126 is sent as an encrypted attachment to an email, and the password to the attachment is included in the body of the email. Operation 304 can include extracting the password from the body of the email, e.g., by applying a regex such as qr{(?: password|pw)\b[\s:-]*(\S+)}xi, which will leave the password in the first captured group (or, in place of (\S*), qr{ . . . (['"]) (['^$1]+) $1}xi to support delimiters).

In some examples, detection module 226 can access the text of the emails, e.g., by reading the email files off disk (or other CRM 214); by integrating with the email client running on computing device 104 (e.g., as an add-in); or by requesting or receiving the text from an email proxy or bridge, e.g., an IMAP server. Similarly, detection module 226 can apply pattern-matching or other techniques to the text of Web pages from which a sample 126 is downloaded to provide context data 128. Detection module 226 can receive the text, e.g., by integrating with the browser (e.g., as an extension or content-script) or by receiving the text from a proxy server through which the page was requested.

At 306, communications module 224 running on computing device 104 can report the sample 126 and the context data 128 to a computing device 102 (or cluster 108, and likewise throughout), e.g., via a network. Operation 306 may take place immediately upon detection of sample 126 or mitigation of its effects, or may take place at a later time. In some examples, samples 126 and corresponding context data 128 are batched for transmission during periods of low network activity.

In some examples, cluster 108 can provide computing device 104 an indication of samples 126 already stored by cluster 108. Operation 306 can include, if sample 126 is indicted as being stored by cluster 108, transmitting the context data 128 and an indication of the sample 126 (e.g., a unique ID thereof or other indication described herein with reference to operation 316), but not sample 126 itself. This can reduce bandwidth consumption compared to always transmitting the full contents of sample 126 (although the latter option can be used, in other examples).

At 308, computing device 102 can determine result record (s) 122. For example, computing device 102 can carry out operations shown in diagram 400, FIG. 4. Result record(s) 122 can include, e.g., identification information of malware related to sample(s) or classification(s) of sample(s).

In some examples, at operation 310, network function 134 (e.g., mitigation module 230 running thereon) can adjust the operation of network function 134 based at least in part on the result record(s) 122. For example, network function 134 can adjust its configuration based at least in part on the result record(s) 122. Additionally or alternatively, network function 134 can take a specific action, e.g., with respect to an established communication session, based at least in part on the result record(s) 122, e.g., terminate network connections to a malicious host. Examples are discussed herein, e.g., with reference to operation 512.

In some examples, at operation 312, presentation module 232 or another module running on a computing device 106 can present the result records 122, e.g., via the UI 202. For example, the presentation module 232 can present the result records 122 in a list in descending order of severity, indicated by tag data associated with a "Severity" tag; in time order; or in another order. The presentation module 232 can present the results in graphical, textual, or other forms, e.g., using list controls, tree controls, audio outputs, or other types of output such as those discussed above with reference to display 204 and other output devices of UI 202. For example, the presentation module 232 can transmit HTML or JAVASCRIPT code representing the result record 122 for presentation by a Web browser of UI 202. In some examples, a security analyst (or other entity) 112 using a computing device 106 can search events and view search results corresponding to suspicious events; operation 312 can include presenting the search results.

In some examples, at operation 314, mitigation module 230 (or another module running on a computing device 104) can mitigate the effects of malware based at least in part on the result record(s) 122. Operation 314 can be performed on the computing device 104 that performed operation 302, or on a different computing device 104. Examples are discussed herein, e.g., with reference to operations 302 or 512.

In some examples, mitigation module 230 can perform remediation or mitigation actions, such as quarantining or terminating a malware module, at operations 302 or 314. Mitigation module 230 can perform remediation or mitigation operations at computing device 104, as a result of local decision or in response to a command from a computing device 102 or 106.

In some examples, mitigation module 230 (or another module running on a computing device 104) can receive, via the network, a DI, e.g., an IOC or other DI described herein. In some examples, DI(s) can be associated with detection rule(s) stored in detection rule set(s) to be used for future malware detection. For example, a hash H of a malware file (corresponding to a detection rule "matches hash H") can be added to a blacklist (an example of a detection rule set) so that the malware file will be prevented from executing. Examples of DIs are described herein, e.g., with reference to Tables 4-12.

The DI can be expressed as or associated with a detection rule. A detection rule can include, e.g., a regex, a YARA or SURICATA rule, a string or numeric literal, a glob pattern, or data in another format. For brevity, a "content-based detection rule" as used herein is a detection rule that is applied to the contents of samples on disk, samples loaded into memory, or the memory images of running samples. Examples include YARA and SURICATA rules. Some static analyses described herein can use content-based detection rules.

DIs can be detected or otherwise determined based at least in part on event records 120, 132, samples 118, 126, or other data. For example, a DI expressed as a regex can be detected or otherwise determined by locating a portion of a sample 118, 126 or event record 120, 132 that matches that regex. In some examples, an event record 120, 132 includes at least part of a sample 118, 126, and the DI can be detected by analyzing (e.g., applying a detection rule to) the at least part of the sample 118, 126.

In some examples, at least one result record 122 can include a classification. The classification can include, e.g., a bitmask, attribute list, or other representation of categories to which a particular event or related system component belongs, or tags with which the particular event or system component is associated. For example, a classification can include a Boolean value indicating whether or not the event or system component is suspicious (e.g., associated with malware), or an enumerated value indicating with which of several categories the event or system component is associated (e.g., "benign," "virus," or "spyware"). The classification can additionally or alternatively include one or more confidence values or other values indicating the likelihood of a classification, e.g., a "spyware" value of 0.42 indicating a 42% likelihood that a particular newly created task is spyware. In an example, the classification can include multiple confidence values for respective categories of malware or other fields (e.g., "spyware=0.42; worm=0.05"). In some examples, result records 122 and data therein can be used by a security analyst or other entity 112 in triaging or analyzing events.

At 316, detection module 226 (or another module on computing device 104) can receive a sample 126 to be analyzed, or an indication of such a sample. For example, if a user considers a file to be suspicious, even if that file was not detected by a security agent or other security software, the user can use a user interface to specify that that file should be analyzed. As indicated by the dashed arrows, operation 316 can be followed by operation 304 of recording that file and context data 128. The context data 128 may not include task identifiers (PIDs) or other runtime information, since the file to be analyzed may not have been executed. However, other context data 128, such as platform information or text extracted from email bodies or Web pages, can still be included. Operation 304 can in turn be followed by operation 306. An "indication," as used herein, e.g., indications of samples, DIs, or other data, can include the data being indicated, a portion of that data, a hash of at least part of that data, or a key referencing at least a portion of that data in a datastore shared between a sender of the indication and a receiver of the indication. For example, a SHA-256 hash or other cryptographic hash can serve as an indication of a sample when transmitted from a computing device 104 to a computing device 102, provided that, for example, computing device 102 has a copy of the sample or can retrieve one (e.g., from the computing device 104) in response to receipt of a SHA-256 hash not known to computing device 102.

Additionally or alternatively, at 316, detection module 226 can identify a file to be analyzed, e.g., because the file meets predetermined criteria at computing device 104. For example, detection module 226 can upload any executable file the first time that file is executed on that computing device 104, or in response to an indication from cluster 108 that that file is not known to cluster 108. In some examples, detection module 226 can receive a list of unique identifiers (e.g., SHA-256 file hashes) of interest, e.g., from cluster 108. Whenever one of those files is detected on computing device 104, operation 316 can detect that file based on its unique identifier and can trigger operations 304 and 306. For example, cluster 108 can provide computing device 104 the unique ID of a newly-discovered file that has been seen executing on at least a predetermined number (≥1) of computing devices 104 (e.g., a possible worm). The context data 128 can then be uploaded if that file is noted on a particular computing device 104.

Illustrative Techniques

Figure 4:
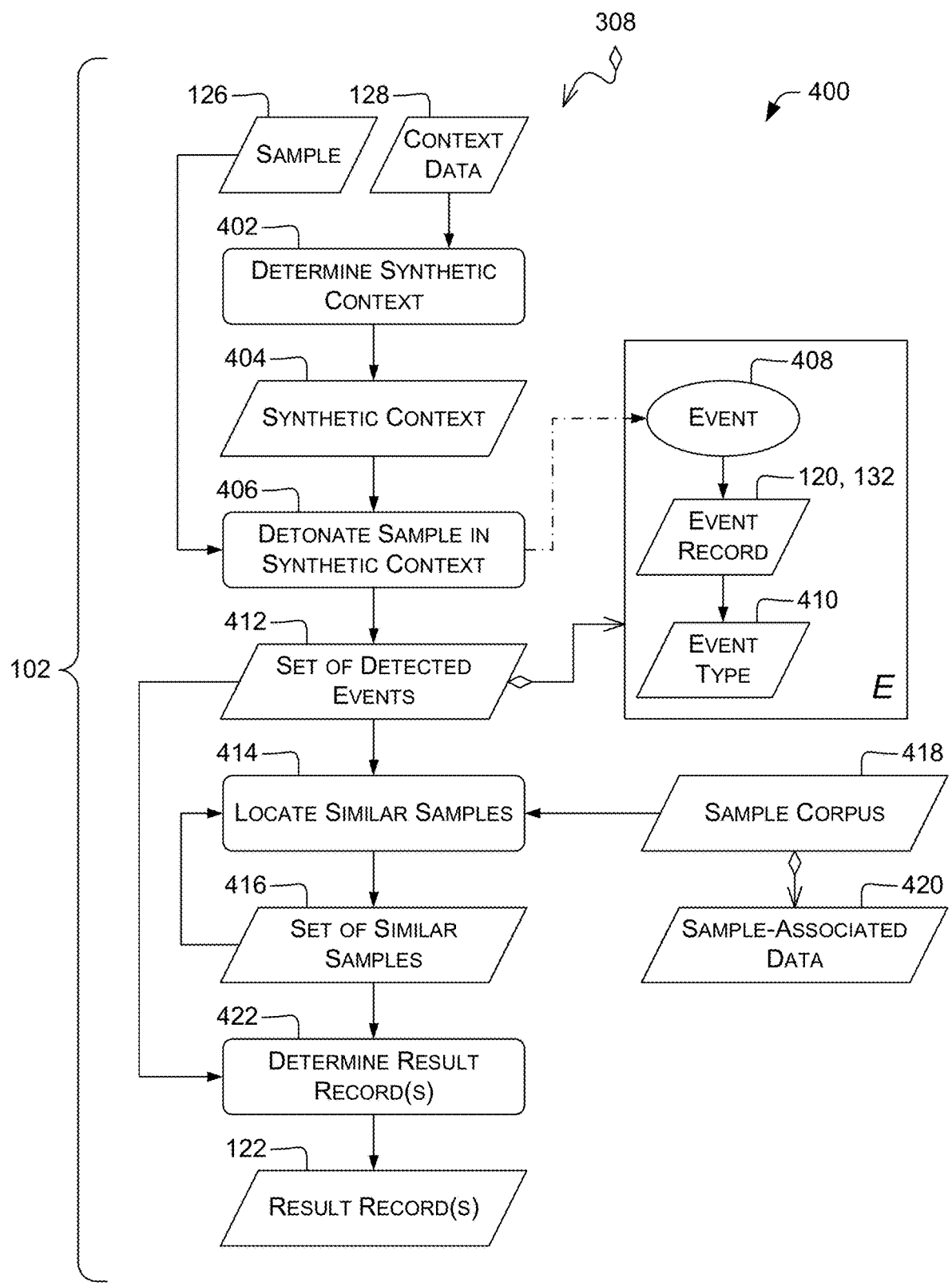
FIG. 4 illustrates components, operations, and dataflow involved in an example malware-analysis system.

FIG. 4 is a diagram 400 illustrating components and dataflow in an example malware-detection or -analysis system. Diagram 400 can represent operation 308, FIG. 3. Operations of diagram 400 can receive sample 126 and context data 128 from operation 306, and can provide result record(s) 122 to operations 310 or 312. The depicted operations can be used for one sample 126 or can be used repeatedly for more than one sample 126.

In some examples, operations shown in diagram 400 can be performed, e.g., in response to requests via an API, e.g., offered via HTTPS. For example, an email client or other program can send suspicious files to computing device 102 for analysis even before those files are executed. This can trigger the operations of diagram 400 to be performed to produce result record(s) 122 associated with that file. Communications module 224 can then transmit the result record(s) 122 to the API consumer. In response to result record(s) 122 indicating a file is or may be malicious, the program using the API, a related program, or a security agent can present the results of the analysis to the user, delete/quarantine/block the file, or take another security-improving or -preserving action.

In some examples, the API can provide rapid (e.g., synchronous or near real-time) response for queries relating to already-analyzed files that are represented in a corpus of known samples 118, 126. The API can provide batch or delayed (e.g., asynchronous) responses when a new file is uploaded to be analyzed. In some examples, computing device 104 or another API consumer can batch asynchronous requests when not communicatively connected with computing device 102 (e.g., when running offline). Computing device 104 can then transmit the batch of requests when network connectivity is restored.

At 402, detection module 226 running on computing device 102 determines a synthetic context 404 based at least in part on context data 128. Synthetic context 404 can include, e.g., a set of parameters controlling operation of a sandbox or other detonation system. Examples of such parameters can include which OS image to use (e.g., determined based on the OS type, bitness, version, or patch level indicated in context data 128), or which users to populate in the sandbox (e.g., based on the UIDs or GIDs indicated in context data 128). Additionally or alternatively, synthetic context 404 can include a VM or container image to host the sample 126 during detonation. Examples are discussed herein, e.g., with reference to operation 504. In some examples, determining synthetic context 404 can include selecting or loading a particular disk image. In some examples, determining synthetic context 404 can include patching an image or components thereof based on context data 128.

At 406, detonation module 234 running on computing device 102 detonates sample 126 in the synthetic context 404. For example, detonation module 234 can initialize (or initialize and patch) a VM image indicated by synthetic context 404 and execute sample 126 in the resulting running VM. During or after detonation 406, as indicated by the dash-dot line, detection module 226 detects an event 408, or multiple events. For example, the events can be tied to (e.g., performed or triggered during detonation 406 by) sample 126. In some examples, events not known to be tied to sample 126 can additionally be recorded. This can permit, e.g., detecting or analyzing malware based on unsolicited transmissions from a malware command-and-control server received at the VM or other detonation environment on computing device 102.

In some examples, the detection module 226 can interrupt execution or otherwise gain control or execute when an event 408 is detected, e.g., by hooking an interrupt associated with that event 408. Detection module 226 produces event record(s) 120 (or 132, and likewise throughout the discussion of FIG. 4) including data describing respective event(s) 408. For example, the event record 120 can include an event type 410 of the event 408. Nonlimiting example event types 410 can include, e.g., "task created," "file opened," "network connection established," or "DNS request made." In some examples, the respective event types 410 can be any of, or can be selected from the group consisting of, a system-call type, an API-call type, an I/O request packet (IRP) type, or an IPC-message type.

In some examples, operation 406 can include executing sample 126 in an environment, such as a chroot jail or a VM, that prevents sample 126 from accessing protected portions of computing device 102, or that otherwise isolates sample 126 during its execution. In some examples, operation 406 can include permitting sample 126 to access specific resources, e.g., Internet connectivity, during detonation.

In some examples, operation 406 includes more than one execution of sample 126. For example, sample 126 can be executed within a VM or other virtual environment. Based on event records 120, detonation module 234 can determine whether sample 126 is suspected to be malware (e.g., because sample 126 shows signs of evasion of, or attempts to evade detection by, anti-malware mechanisms running in the virtual environment). If sample 126 is suspected to be malware, operation 406 can include, in response, executing sample 126 on a physical machine or other less-isolated machine. For example, detonation module 234 can load a hard drive (rotational or solid-state) with a known image. This can replace the full contents of the drive, including any traces of previous detonations. Detonation module 234 can then cause that drive to be used to boot a physical machine and execute sample 126. After sample 126 executes, the contents of the hard drive can be compared with the known image to determine effects of executing sample 126. The hard drive can then be wiped or re-imaged.

In some examples, operation 406 can include, e.g., at the conclusion of detonation, terminating a VM or sandbox in which the detonation was performed, re-imaging a hard disk used for the detonation, or otherwise restoring the detonation environment to a known state. In some examples, e.g., using sandboxed detonation, the sandbox code can perform this cleanup, e.g., by deallocating memory that was used to store tasks or other components or data of sample 126 during detonation.

In some examples, an event type 410 can indicate at least one of the following event types 410 of events 408: a user logging on or off, detection module 226 starting up or shutting down, a task being created, a network name being looked up (e.g., via DNS), a network connection being initiated or established (e.g., IPv4 or IPv6), a value in an auto-start entry point (ASEP) being created or modified, an executable being created, modified, or deleted, a critical system file being modified, a file of a specific type or extension being created or updated (e.g., based on a database listing the specific type(s) or extension(s) to be monitored), a new scheduled task or daemon being registered or otherwise set up to execute at a future time or on a schedule, or a task making or attempting an access to a portion of a disk, memory, or other system resource not allocated to that task.

Individual events 408 can be associated with software in an execution set, e.g., as described above. For example, an event 408 can be performed by or at the request of software in the execution set. In some examples, the execution set comprises at least a task or a thread. In some examples, the execution set comprises at least one thread. In some examples, the execution set consists of one or more threads, e.g., one thread or two threads. The execution set can include at least one task, thread, or other unit of execution. For example, an execution set can include a task and its children, or a chain of execution leading to a task. In some examples, the execution set includes at least some system components that are being monitored for events.

In some examples, detection module 226 can include or communicate with a "sensor" or "security agent," e.g., a software program, or firmware or hardware subsystem, that collects information of the events 408. In some examples, the sensor can be implemented using a kernel-mode component, e.g., a device driver or other module that hooks file- and task-related system calls and records information regarding those calls (e.g., parameters or results thereof).

Examples of security agents are described herein with reference to FIG. 2. In some examples, detection module 226 can execute during detonation, e.g., sandboxed detonation.

In some examples, cluster 108 can receive event records 120 from monitored computing devices 104. Each event record 120 can be associated with a particular monitored computing device 104 and an event type 410. For example, detection modules 226 at respective monitored computing devices 104 can provide the event records 120 to computing device(s) 102 via communications modules 224. Analysis module 228 can then execute at the computing device(s) 102 to carry out functions described herein, e.g., with reference to FIGS. 4 and 5.

In some examples, detection module 226 produces a set 412 of E event records 120, represented by the plate marked "E" in FIG. 3. Each event 408 has a respective event record 120 in set 412, and each event record 120 has a respective event type 410. Example events 408 can include, e.g., files created, files deleted, domains and IP addresses (or other network addresses) connected to, tasks created, or registry keys written. The E events can be stored in an ordered or unordered collection. In some examples using ordered collections, cache-coherency limitations or other timing factors in, e.g., a multiprocessing system may cause some events to be recorded slightly out of their order of detection or occurrence.

Throughout this document, an event record 120, 132, or any other record described herein, can include one or more fields, each of which can have a name or other identifier, and each of which can include or be associated with one or more values. For example, event record 120, 132 or other records herein can be represented as ASN.1-defined data structures, GOOGLE protobufs, JSON records, XML documents or subtrees, associative arrays, or other forms of tagged or key-value storage. In some examples, the event type 410 can represent a change in one or more data value(s), e.g., of the types listed below. For example, the launch of a task or modification of a file can trigger an event of a corresponding event type 410.

Examples of fields can include, but are not limited to, event timestamps or sequence numbers, filenames, inode numbers, file timestamps, filehandles, hashes of files (e.g., SHA-256 hashes), registry-key names or values, userids or other user identifiers (UIDs, e.g., WINDOWS SIDs), GIDs, PIDs, e.g., a PID of a task or a parent task ID (PPID) of that task's parent, task group IDs (e.g., process-group IDs, PGIDs, identifying groups of tasks), task output (e.g., to stdout or stderr), task exit codes, filenames of executables' primary modules, session identifiers, task command lines, raw or decoded, command-line histories, universally unique identifiers (UUIDs), operating-system identifiers, e.g., from uname(1), permissions, access-control lists (ACLs), security-event indications (e.g., "logon," "logoff"), security credentials, logon times, subsystem identifiers (e.g., console vs. graphical), virtual host identifiers (e.g., in a hypervisor-managed system), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 226 (e.g., a version number), values from the registry, dotfiles, or other configuration data (e.g., crontab entries), call-stack entries, domain names (e.g., relative or full-qualified, FQDN), hostnames being resolved (e.g., using DNS), identifiers of the corresponding monitored computing devices 104 or the organizations to which they belong, names or other identifiers of mutexes, named pipes, or other inter-thread communication or inter-task communication (IPC) mechanisms, a bus path, vendor/product ID pair, or other identifier of an accessory (e.g., an add-in card, USB device, or other connectible device) or other system component, counts (e.g., of VIRUSTOTAL dirty indications), or other data items tied to sample 126. Field names or values can be conveyed in structured-text forms, e.g., JSON, XML, YAML, INI, or TOML.

In some examples, field values associated with an event 408 indicating an action tied to a task can report the corresponding values before the action, after the action (or that would have been had the action not been blocked), or both (e.g., filename before or after a rename, or both). In some examples, field values can include the results of applying transform(s) to any of the above, e.g., to smash case or otherwise filter or preprocess the data. In some examples, an event record 120 can include information about a task that is currently running on the computing device 104, or that has previously run on the computing device 104. In some examples, an event record 120 can include information about at least one currently-running task and at least one related task (e.g., still running or already terminated), e.g., a parent task of the currently-running task.

In some examples, at operation 414, analysis module 228 running on a computing device 102 can locate a set 416 of similar samples in a corpus 418 based at least in part on the set 412 of event records 120. For example, previously-detonated samples can be determined to be similar if the events 408 they generated during detonation are similar to the events 408 generated by sample 126 during detonation. Examples are discussed herein, e.g., with reference to FIG. 5. Operation 414 can be executed iteratively to find samples similar to samples already in set 416, e.g., until reaching a fixed point of set 416, or for a predetermined number of iterations. In some examples, operation 414 is only performed once per pass through diagram 300.

In some examples, corpus 418 includes copies or unique identifiers (e.g., cryptographic hashes) of malware samples. In some examples, corpus 418 includes sample-associated data 420 associated with the respective malware samples (or with at least some of the malware samples). The sample-associated data 420 for a particular malware sample can include at least one of, or any of, the following: event record(s) 120 describing event(s) 408 detected during detonation of that malware sample; behavior indicators determined based on those event(s) 408 (discussed in more detail with reference to operation 512); byte sequences, hash values (e.g., SHA, SSDEEP, or IMPHASH), a filetype (e.g., PEID, TrID, file(1) output, or other types described below), a file size, a filename, or other extracted features describing that malware sample; a task tree detected during detonation of that malware sample (described below) or a representation thereof, such as a task-tree hash value (described below); or DIs (described below).

For example, if sample 126 connected to a particular domain, previous detonations can be searched to see if that domain is known. Relevant indicators from the search results can then be provided, e.g., which files are associated with that domain. Information of those indicators can be distributed (operation 512), e.g., hashes of the files associated with the domain.

In some examples, at operation 422, analysis module 228 or presentation module 232 can determine result record(s) 122. Operation 422 can include transmitting the result records 122 via network 110. The result records 122 can include information usable by a security analyst or other user to assess the level of threat posed by sample 126 and to determine a course of action. Additionally or alternatively, as noted above with reference to operations 310 and 314, result records 122 can provide information usable by automated security systems to more effectively block malware or mitigate its effects.

Operation 422 can include determining result record(s) 122 indicating actions taken by a sample 126 that was blocked at the monitored computing device 104. This can provide information about what would have been the effects if the sample 126 had not been blocked.

Additionally or alternatively, operation 422 can include determining result record(s) 122 indicating similar or related samples(s) 126 or files. This can provide information about other files and threats that shared similar patterns with the analyzed sample 126. For example, operation 422 can include removing duplicate information; removing information that has low confidence or does not meet a notability criterion; or aggregating information (e.g., counting the number of detected occurrences of DIs or other indicators across the population of related samples).

Figure 5:
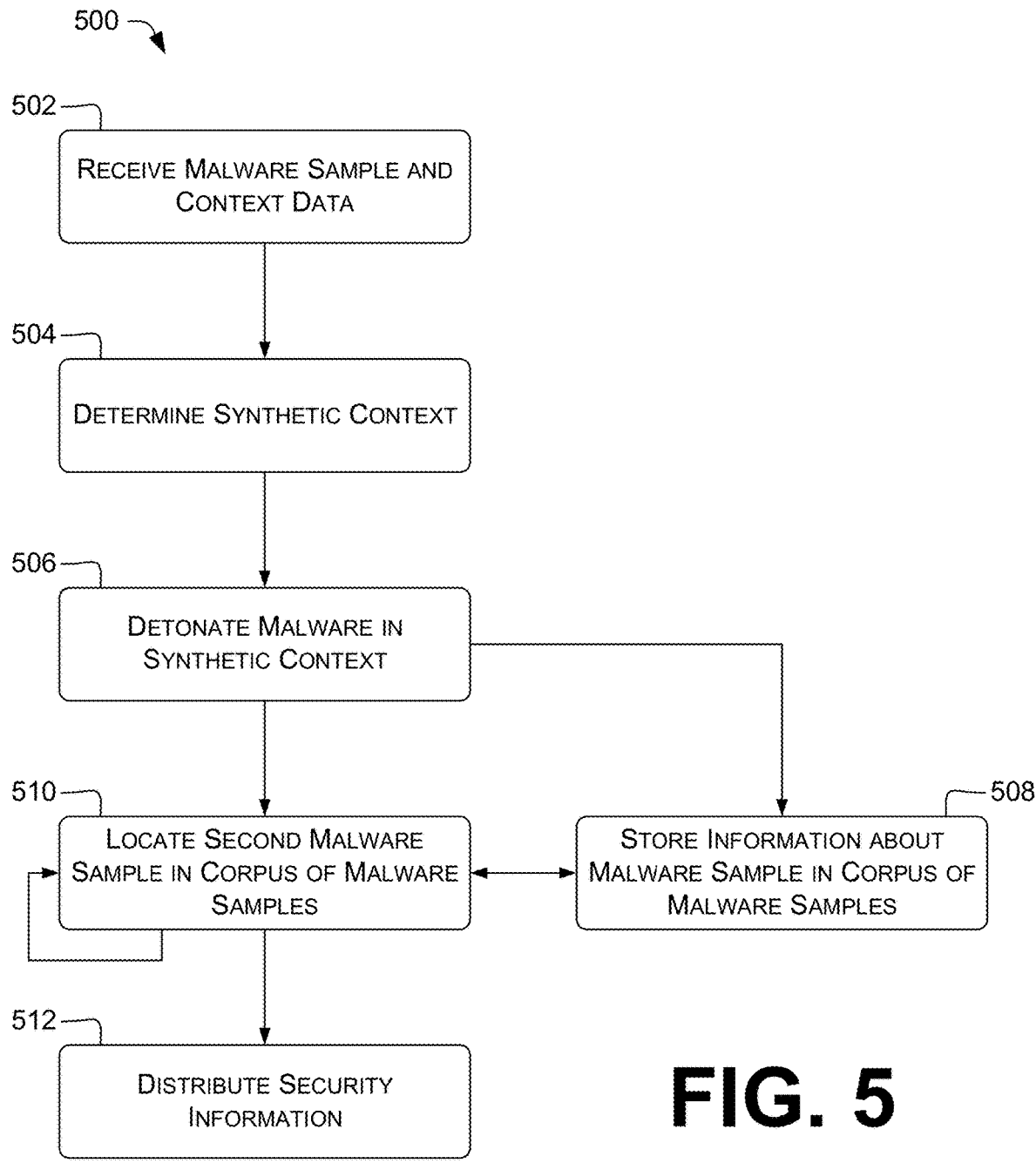
FIG. 5 illustrates an example technique for detecting or analyzing malware.

FIG. 5 is a flowchart of an example technique 500 for analyzing malware. Example functions shown in FIG. 5 can be implemented on or otherwise embodied in one or more computing device(s) 102, 104, or 106, e.g., a computing device 200, e.g., using software running on such device(s), e.g., software executed by processing unit 210. For the sake of illustration, the example technique 500 is described below with reference to processing unit 210 and other components discussed with reference to FIGS. 1 and 2 (e.g., a control unit), and with respect to data items and operations shown in FIGS. 3 and 4, that can carry out, participate in, or be processed by the steps of the example technique 500. However, other control unit(s) or components of computing device(s) 102, 104, or 106 can carry out step(s) of described example techniques such as technique 500. Similarly, other example method(s) or technique(s) described herein also can be, but are not limited to being, carried out by any specifically-identified components.

In some embodiments of the techniques illustrated in FIG. 5, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram or technique is not intended to be construed as a limitation, and any number of the described operations can be combined in any order or in parallel to implement each technique. In each flow diagram, fewer than all of the depicted operations can be performed, except as expressly noted. Moreover, the operations in FIG. 5 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

In various examples, a security agent (e.g., as discussed herein with reference to FIG. 2) running on computing device 104 autonomously uploads sample 126 to cluster 108, or is polled by cluster 108 for sample 126. Technique 500 can be triggered at computing device 102 or cluster 108 in response to the upload of sample 126, e.g., in realtime or as part of a batch. This can permit malware upload, detonation, and analysis without requiring manual direction or intervention.

At 502, the control unit can receive the malware sample and the context data via a network. For example, a security agent at computing device 104 can upload the sample and the context data to cluster 108, e.g., via HTTPS or other protocols.

At 504, the control unit can determine a synthetic context 404 based at least in part on context data 128 associated with the first malware sample. This can include, e.g., creating/altering a VM image on disk, booting a VM, or altering a running VM. Context data 128 can include platform information, filenames, command lines, or other data described herein with reference to FIG. 1, to operation 304, or to operation 402. In some examples, operation 504 can include instantiating a VM image indicated in context data 128, e.g., the image with which the computing device 104 was initially provisioned. In some examples, the control unit can perform at least one of the following, as specified by context data 128:

A: copy or load a VM image indicated by the context data 128 (e.g., of an OS type, bitness, version, or patch level indicated by context data 128). The image can be, e.g., a copy of an image provided by a customer, or another image.

B: instantiate virtual devices in the VM (e.g., printers or network adapters)

C: apply patches, drivers, or updates to the VM

D: spawn tasks noted in context data 128 as running. E.g., sample 126 may only exhibit malicious behavior if outlook.exe or another particular task is running, so spawning those tasks in the synthetic context 404 may improve the accuracy of the detonation results E: load sample 126 into a (virtual) disk of a VM at a location, and with a filename, specified by context data 128.

F: decrypt sample 126 using a password given in context data 128

G: set a real-time clock or other time base of the VM to a time, date, or timestamp (date+time) indicated in the context data 128. For example, detonation can be performed on a VM showing the same time or date at which sample 126 was detected on the endpoint.

H: set internationalization parameters of the VM to values matching the computing device 104, as indicated by the context data 128. Such parameters can include language, input method, keyboard layout, date/time/currency formats, time zone, or common-control text (e.g., "Cancel" in English vs. "Abbrechen" in German).

I: set the value of, or clear, system or per-user environment variable(s) based on value(s) given in the context data 128.

J: instantiate drivers, or spawn tasks, to emulate shared storage volumes or other logical or physical devices accessible from within the VM via network (e.g., a printer service).

K: Add, delete, or modify (e.g., update or downgrade) files, registry entries, accounts, desktop files, taskbar shortcuts, run-on-startup programs, or other system data based on context data 128. This can permit, e.g., analyzing malware that exhibits its malicious behavior only if, e.g., a certain email or system-account profile is present.

At 506, the control unit can detonate the first malware sample in the synthetic context to provide one or more first event records 120 (or 132, and likewise throughout the discussion of FIG. 5) representing events performed by the first malware sample 126 and detected during detonation (e.g., performed during detonation, detected during detonation, or both). Some prior schemes do not receive context data, so are not able to use that context data when detonating. As a result, the detonation in such schemes may not succeed in bypassing anti-detection techniques employed by malware, and may not collect accurate information about the malware. By contrast, operation 506 includes detonating in the synthetic context, reducing the probability of triggering anti-detection techniques in sample 126 and increasing the probability of collecting accurate information about sample 126. Operation 506 can be followed by operation 508 or operation 510.

In some examples, operation 506 can include scanning popups or other windows created by sample 126 or other code running during detonation (e.g., using EnumWindows( ) or the CBT API on WINDOWS). Scanning can include enumerating buttons (or other controls) in those windows and determining the text or other properties of those controls. Operation 506 can then include dispatching events (e.g., mouse clicks) to buttons or others of the detected controls. For example, sample 126 may prompt the user for information, or simulate an installer, in an attempt to appear legitimate. Operation 506 can include dispatching events to make it appear to task(s) associated with sample 126 that a human operator is interacting with those task(s).

In some examples, operation 504 or 506 can include randomizing or adjusting predetermined properties of the VM before detonation. This can make it more difficult for sample 126 to determine that it is running in an instrumented environment such as a sandbox. For example, the hostname, domain name, hard-disk volume label, network-adapter physical address, hard-disk size, or number of CPUs or cores can be randomized. Additionally or alternatively, registry entries or other data associated with the identity of a system, the number or types of running tasks, or the number or types of open windows can be randomized or adjusted.

In some examples, operation 504 or 506 can include instantiating a VM image selected based on a first portion of the context data 128, e.g., the OS and bitness. Operation 504 or 506 can also include modifying the instantiated image based on a second, different portion of the context data. This can permit detonating sample 126 in substantially the same context as that in which sample 126 was quarantined on the computing device 104. This can also permit using a relatively smaller number of images to detonate samples in a relatively larger number of synthetic contexts 404, which can reduce the storage requirements of computing device 102 or cluster 108.

Some malware inspects its own filename and adjusts its behavior, e.g., based on file extension (such as "docm" vs "docx"). Similarly, some malware may adjust its behavior depending on configuration settings or other installed programs. For example, suppose a single sample 126, having SHA256 $S_1$, is quarantined both on computing device 104 $E_1$ under filename "ubs.docm" and on computing device 104 $E_2$ under filename "checkthisout.bin". Suppose further that both $E_1$ and $E_2$ are running the same OS at the same bitness, e.g., WINDOWS 8 64-bit (x64). Sample 126, despite having the same file contents (as indicated by the matching SHA256 values), may behave differently in those two contexts. Therefore, in some examples, a single image (e.g., an OEM or other image of WINDOWS 8 x64) can be used to detonate sample 126 in two different synthetic contexts 404, each including the respective filename. Before executing sample 126, environment variables, system time, default locale, or other parameters can be set (e.g., as A-K, above). This can permit each detonation operation 506 to more closely match the environment at computing device 104 at the time of quarantine.

In some examples, the malware sample comprises processor-executable instructions (e.g., of an executable or shared library/dynamic-link library) and the detonation comprises executing the processor-executable instructions. In some examples, the malware sample is a document file having a file type (e.g., WORD document or ADOBE PDF), and the detonation comprises executing processor-executable instructions of a launcher application associated with the file type. For example, "winword.exe" can be used as the launcher for WORD DOC/DOCM/DOCX files. Launchers can be determined using registry settings, e.g., as part of a VM image under which sample 126 is detonated. Additionally or alternatively, launchers can be determined using a predetermined mapping from file types to launchers, e.g., stored in a database. In some examples, operation 506 includes providing a password indicated in context data 128, e.g., using SendKeys( ) to put a document password into the "Document password?" dialog when opening a password-protected MICROSOFT WORD document.

Example file types can include: .NET EXE, 64-BIT.NET EXE, 64-BIT DLL, 64-BIT ELF, 64-BIT EXE, 64-BIT SERVICE, 7z archive, ACE, APK, BASH, BAT, bzip2 archive, CHM, CMD, DLL, DOC, DOCX (which can include DOCM/DOTX/DOTM, or any or all of those can be separate file types), DOS, ELF, EXE, FILE LINK (e.g., Windows shortcut, *.lnk, or Unix symlink), gzip (e.g., gzip2) archive, HTA, HTML, HWP, HWPX (HWP/HWPX are HANGUL OFFICE formats), ISO, JAVA JAR, JS, JSE (encoded JAVASCRIPT, e.g., from JScript. Encode), LIB, MSG, MSI, PDF, PERL, PPT, PPTX, PS1, PSD1, PSM1, PUB, PYTHON, rar archive, rev archive, RTF, SCT, SERVICE, SVG, SWF, tar archive, URL, VBE, VBS, wim archive, WSF (WINDOWS script file), XLS, XLSX, xzip archive, or ZIP. Example file types can include an archive-type indicator, e.g., "+RAR": for example, "DLL+RAR" for a DLL extracted from a RAR archive. E.g., Office (.doc, .docx, .ppt, .pps, .pptx, .ppsx, .xls, .xlsx, .rtf, .pub), PDF, APK, executable JAR, Windows Script Component (.sct), Windows Shortcut (.lnk), Windows Help (.chm), HTML Application (.hta), Windows Script File (*.wsf), JavaScript (.js), Visual Basic (*.vbs, *.vbe), Shockwave Flash (.swf), PowerShell (.ps1, .psd1, .psm1), Scalable Vector Graphics (.svg), Python (.py) and Perl (.pl, .pm, or .pmc) scripts, Linux ELF executables, MIME RFC 822 (*.eml) and Outlook *.msg files. Other filetypes can include any of EXE/DLL/ELF/LIB/SERVICE with a different bitness indicator, e.g., 16-bit, 32-bit, 128-bit, or other.

File types can be identified by extension or by contents, in some examples. Techniques for determining filetype by content can include those used by LINUX file (1)+magic (5), TrID, PEID, or pefile. Other techniques can include applying YARA rules to the content of a file to determine its type.

Detonation can be performed, e.g., in a sandbox such as FALCON SANDBOX, CUCKOO, SANDBOXIE, SHADE, or other sandboxes. The sandbox can provide a virtual machine, chroot jail, or other limited environment in which sample 126 (or a corresponding launcher) is executed. The sandbox can hook system calls, virtualize and instrument devices such as disks or network interfaces, probe memory during detonation, or otherwise read information from or about sample 126 during detonation to detect events 408 and provide event records 120. Examples are discussed herein, e.g., with reference to detonation 130.

At 508, the control unit can store information about sample 126 into a corpus 418 of malware samples (e.g., a database). The information can include at least, e.g., a copy of sample 126; static information such as hashes; or dynamic information such as indicated in event records 120. The static or dynamic information can be examples of sample-associated data 420. Storing the information can permit determining that sample 126 is similar to another malware sample encountered later, as discussed herein with reference to operations 414 or 510. The corpus 418 can be indexed by cryptographic hash or other unique identifier of sample 126. This can remove the need to repeat the detonation of sample 126 when, at a later time, sample 126 is seen again, or is located as a similar sample. Operation 508 can be performed before, after, or at least partly concurrently with operation 510. In some examples, each sample is detonated individually.

In some examples, storing copies of samples 126 in corpus 418 can permit re-detonating samples 126 to compare their behavior in particular environments, e.g., represented by context data 128. For example, operation 414 can include re-detonating samples in the set 416 of similar samples using synthetic context 404. This can permit determining the likely effects of those related samples with respect to a particular user's environment, or a particular security domain.

In some examples, two different samples (e.g., two different PDF files or other document files) can be detonated in synthetic context 404. This can permit analyzing differences between two samples. For example, two different PDFs can be successively (or in parallel, on different VMs) detonated with, e.g., the same filename, the same file path (if possible/available), the same OS/bitness/patch level, the same locale settings and execution date/time, or other elements of synthetic context 404 (e.g., network shares or print services) in common.

In some examples, a single sample can be detonated in multiple synthetic contexts 404 that differ from each other in substantially only one respect, or in the same synthetic context 404 but using different launchers or launcher versions. For example, a particular PDF file (or other document) can be detonated successively (or in parallel on different VMs) using two different PDF-reader/-viewer programs (or other launchers), or two different versions of the same program. This can permit analyzing specific aspects of the behavior of sample, e.g., determining that the sample is targeted to a particular launcher or version of that launcher.

At 510, the control unit can locate a second malware sample, in the corpus of malware samples based on at least: the first malware sample; or at least one of the first event records 120. Various embodiments described below can be used to locate the second malware sample. The listed embodiments can be used in combination. For example, the second malware sample can be considered to be similar to sample 126 if it is considered similar by at least one of the techniques below that are used in a particular embodiment; by all of such techniques; by a majority of such techniques; or by at least a predetermined number of such techniques. In some examples, the corpus includes indexes based on the ones of the techniques below that are used in a particular embodiment, so that similar samples can be located quickly. In some examples, operation 510 can be performed multiple times (or a single parallel/batch operation 510 can be performed) to determine multiple second malware samples.

In some examples, DIs can be determined for sample 126 or for the second malware sample. Example DIs can include file hashes or other unique IDs; network addresses communicated with; or other indications of the presence of malware that can be detected, e.g., by a security agent.

At 512, the DIs for sample 126 and any second malware sample(s) can be de-duplicated and propagated throughout a security domain (e.g., an organization) to permit more effectively detecting and blocking sample 126 or similar attacks. The DIs can be sent to network functions 134, such as security devices (e.g., firewalls, routers, switches, load-balancers configured for DDOS mitigation, or traffic-inspection or—analysis devices). For example, suspicious file hashes or other unique IDs can be sent to security agents running on computing devices 104 to block execution of files matching those IDs. Suspicious domain names or network addresses can be sent to firewalls to block or modify attempts to resolve those domains or communicate with those addresses. Operation 512 and other operations herein can permit sharing security information so that the response to an attack on one node is to strengthen the resistance of many nodes to not only that attack, but similar attacks. For example, network functions 134 not running a security agent can benefit from detections performed by the security agent on a computing device 104.

Various examples use "dynamic similarity" techniques. The corpus 418 of malware samples can include second event records 120 (or 132, and likewise throughout) associated with malware samples in the corpus of malware samples. The second malware sample can be located by finding a malware sample associated with one or more second event records 120 similar to the one or more first event records 120. There are various ways of determining similarity of event records 120. For example, the second malware sample can be considered similar if it has event records 120 of the same event types 410 as the event records 120 associated with sample 126.

Some examples use tuples (or other groupings or sets, e.g., lists) of behavior indicators in determining similarity. Behavior indicators can be examples of DIs (discussed below), can contain DIs, or both, in various examples. One or more first behavior indicators can be determined based at least in part on the first event records 120. The behavior indicators can represent general patterns of behavior or statically-analyzed potential behavior, e.g. (without limitation): #1 "Connects to a host without prior DNS lookup"; #2 "Reads the active computer name"; #3 "Writes data to a remote task"; #4 "Contains ability to download files from the internet"; #5 "Loads the task scheduler COM API"; #6 "Modifies proxy settings"; #7 "Sample shows a combination of malicious behavior" (e.g., sample exhibits more than one other DI); #8 "Reads the cryptographic machine GUID"; #9 "Drops executable files"; #10 "Makes script calls" #11 "Writes to stdout" (e.g., from cmd.exe or another shell or console task); #12 "Writes to stderr"; #13 "Performs network activity"; #14 "Triggers a network error" (e.g., receives an HTTP 4xx response to an HTTP request, or similar for other protocols); #15 "Is marked malicious by at least one scanner" (e.g., VIRUSTOTAL or METADE- FENDER); #16 "Overwrites desktop background image"; #17 "Evasion against VM"; #18 "Kills antivirus (AV) tasks"; #19 "Reads WMI information"; #20 "Copies Java image" (e.g., characteristic of a JRAT); #20 "Writes PE header magic to ADO Stream Object".

In at least one example, on a DOS or WINDOWS OS, behavior indicator #9 can be associated with sample 126 in response to an event record 120 indicating that sample 126 created a file beginning with "MZ" or having the extension ".COM" or ".EXE." In another example, a WINDOWS program including an import record for SHDOCVW.DLL, or that dynamically loads SHDOCVW.DLL, can be associated with behavior indicator #4. In still another example, a WINDOWS program that includes executable code referencing a function that can download a file can be associated with behavior indicator #4. Other examples of behavior indicators are listed below with reference to Tables 4-12.

Respective sets of second behavior indicators can be determined (and, e.g., stored in a database) for the malware samples in the corpus of malware samples based at least in part on the event records 120 associated with those malware samples. Each set of second behavior indicators can include all the behavior indicators associated with the respective sample, or fewer than all. In some examples, multiple sets of second behavior indicators can be determined for a particular sample, e.g., all three-element subsets of the full set of second behavior indicators associated with that sample. Those subsets can be referenced as tuples. Similarly, multiple tuples can be determined for sample 126. Some examples calculate all combinations of n-tuples, e.g., n=3 or 4. Some examples pull all n-element subsets of behavior indicators in a group of k>n behavior indicators from a detonation.

The second malware sample can be determined based on the first behavior indicators occurring in the set of behavior indicators associated with the second malware sample. The order of occurrence does not matter. For example, if any tuple associated with the second malware sample matches a tuple associated with sample 126, second malware sample is considered similar to sample 126. In some examples, only tuples having a minimum length (e.g., 3 or 4) are used, which can reduce false detections. The tuples can be of any length in some examples. In some examples, the longer the tuple length, the more similar to sample 126 the second malware sample is considered to be. In some examples, the length of tuples being used for similar-sample location is increased if, e.g., the number of similar samples exceeds a predetermined threshold or some of the located similar samples are classified as clean, or are otherwise not classified as dirty.

In some examples, in order to reduce false detections, the tested tuples are limited to those that did not occur on any report that has a suspicious/clean verdict. For example, the set of first behavior indicators can be determined so that the set of first behavior indicators does not match a set of behavior indicators associated with a third sample, wherein the third sample is not known to be malware. In an example, a Web browser (third sample) implemented using multiple tasks (e.g., CHROMIUM) may have indicators #3, #4 and #9 due to its normal operation at the direction of the user. Therefore, in some examples, the tuple (#3, #4, #9) is not used to find samples similar to sample 126.

In some examples, behavior indicators are used in ranking samples for inclusion in result records 122. For example, a sample exhibiting a behavior indicator also found in a clean sample, or a sample not known to be dirty, can be demoted in the ranking. A sample exhibiting a behavior indicator also found in a dirty sample can be promoted in the ranking (e.g., transmitted before a lower-ranking sample in result record(s) 122).

In some examples, tuples can reduce false misses. For example, #13, #19, and #20 can occur together in JRAT droppers. There are a large number of JRAT droppers, and a JRAT dropper can download an arbitrary payload from a command-and-control server. Using behavior tuples to locate similar samples can permit detecting JRAT droppers not previously seen, detecting other malware that has a JRAT component, or detecting previously-detonated payloads of those droppers.

Various examples use "static similarity" techniques, e.g., based on characteristics of sample 126 itself rather than on characteristics of its behavior during detonation. In some examples, the second malware sample is located by virtue of having at least one byte sequence or hash value in common with the first malware sample. For example, hashes such as SSDEEP or IMPHASH, or cryptographic hashes such as MD5, SHA-256, SHA-3, or Skein, can be tested. Additionally or alternatively, multiple hashes can be used. E.g., two samples can be determined to be similar if their SSDEEP hashes match, or if their IMPHASH hashes match, or if other hashes match (or, alternatively, if all/a majority/a predetermined number of the hashes match). Additionally or alternatively, overlapping byte sequences, e.g., of code or data, can be located. Various examples of static similarity determination are given in commonly-assigned U.S. application Ser. No. 15/400,561, filed 2017 Jan. 6, and Ser. No. 15/858, 497 ("'497"), filed 2017 Dec. 29, each of which is incorporated herein by reference. For example, searches for byte sequences occurring in a sample 126 can be performed over files in corpus 418 using techniques described in '497 with reference to FIG. 3-6 or 8-10 thereof. Samples can be considered to be similar if they include at least one common binary subsequence, or at least a predetermined number of common subsequences or bytes.

In some examples, byte sequences or hash values can be looked up in an associative array, database, or other datastore mapping from byte sequences or hash values to samples containing those byte sequences or associated with (e.g., represented by) those hash values. In some examples, byte sequences can be located via Boyer-Moore, Knuth-Morris-Pratt, Rabin-Karp, or other string-searching algorithms; sequence-alignment algorithms; or other searching algorithms. Throughout this document, searches for sequences of characters (e.g., encoded in UTF-16 or UTF-8) can be performed using techniques described herein with reference to byte sequences, unless otherwise indicated.

In some examples, byte sequences can located by searching an inverted index associating byte sequences of a fixed length L and files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. In some examples, byte sequences extracted from a file are searched in the inverted index and results of the search are used to generate fuzzy hashes.

In various implementations, one or more computing devices may generate the inverted index from a corpus of files, such as a corpus of malware files, binary files, executable files, etc. The generating may include storing at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams (L-grams) with a length of four bytes. The generating can include extracting each consecutive group of L bytes from a file. E.g., with L=4, sequences [0,3], [1,4], [2,5], [3,6], [4,7], [5,8], . . . . In some examples, a first portion of the inverted index may be distributed on a first computing device, and a second portion of the inverted index may be distributed on a second computing device. Searches can be run in parallel on the first and second computing devices.

In some implementations, the search query may include an expression, such as an expression including at least two search terms and at least one logical operator. In response to receiving an expression, the computing device(s) may search in the inverted index for each byte sequence of a fixed length that comprises each of the search terms. The computing device(s) then evaluate the results using a syntax tree constructed from the at least one logical operator and return a search result to the search query based on the evaluating.

Various examples relate to generating (e.g., by a computing device 102) an inverted index from a corpus of files, such as a corpus of malware files. The files may be binary files or executable files. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes.

To search, the system can determine a plurality of byte sequences of a fixed length L that correspond to the search query. The fixed length can be the fixed length used when generating the inverted index. For example, the system can divide the string into adjacent portions of ≤L bytes (e.g., with L=4, [0,3], [4,7], . . . ), or can extract each L-byte portion (e.g., [0,3], [1,4], . . . ).

The system may search for each of the byte sequences in the inverted index. The inverted index can provide, for each indexed byte sequence of the fixed length, sample identifiers of samples that include the specified byte sequence. The system can then determine the intersection of the sets of sample identifier(s) containing each sequence, and select the second malware sample as one of the sample identifier(s) (if any) in that intersection. In some examples, the system can validate that the search query indeed occurs in a sample before selecting that sample as the second malware sample.

In some examples, the system can filter the byte sequences sought based on whether those sequences occur in dirty samples. In some examples, byte sequences occurring in samples not known to be dirty are not sought in the inverted index.

In some examples of multi-term queries (e.g., Boolean-logic queries), the query is converted to a syntax tree, e.g., using recursive-descent, shift-reduce, or other parsing techniques, or is received in the form of a syntax tree. Each leaf of the tree specifies a search term of one or more byte sequences. Each leaf is sought as described above. Logical operators at the interior nodes of the syntax tree are then applied to the leaves' search results to produce the search results. For example, logical operators can include AND, OR, and NOT. AND and OR operators can take any number ≥1 of inputs. In some examples, regular expressions are taken as input, and are converted to syntax trees, e.g., by expanding disjunctions and repetitions, and adding nodes to combine expanded results. For example, the query qr{hello (the|one) world} can be processed into the syntax tree [["hello the world" OR "hello one world"]]. In some examples, YARA or other rules are taken as input and are similarly parsed and converted to syntax trees.

Various examples use behavioral similarity techniques based on task trees or other execution chains of tasks. For example, based at least in part on at least one of the first event records 120, a first task tree can be determined associated with the first malware sample, the first task tree indicating one or more first tasks. The term "tree" is used for generality; a straight sequence of tasks is also considered a "tree." Some examples include locating the second malware sample associated with a second task tree matching the first task tree. A match between the first and second task trees indicates that sample 126 and the second malware sample exhibited similar behavior during detonation. In some example, task trees can be used, e.g., to locate similar samples to malicious documents or remote-access Trojans (RATs). A nonlimiting example task tree is shown in Table 1.

TABLE 1

Task tree

862dab76bfd04688f947f27e73713e79.exe (PID: 5684) 38/68
  server.exe (PID: 5916) 38/68
    netsh.exe (command line: netsh firewall add allowedprogram
    "%TEMP%\server.exe"
      "server.exe" ENABLE) (PID: 5972)

As shown in Table 3, during detonation of "862dab76bfd04688f947f27e73713e79.exe" (for brevity, "862dab"), 862dab dropped or spawned (or both) "server.exe". The program server.exe, in turn, ran the WINDOWS command "netsh.exe" with the command line q{netsh firewall add allowedprogram "%TEMP%\\server.exe" "server.exe" ENABLE}, which is an attempt to modify firewall settings, in this example. The first task tree for this example is therefore 862dab→server.exe→netsh.exe, and the three first tasks are 862dab, server.exe, and netsh.exe.

In some examples, the corpus of malware samples comprises task-tree hash values (as sample-associated data 420) associated with malware samples in the corpus of malware samples. A first hash value is determined based at least in part on the first task tree (and possibly other data). Similar malware sample(s) are those having respective associated task-tree hash value(s) equal to the first hash value. In some examples, input file and execution characteristics are transformed with a normalized task-tree string (including an order-normalized command line) into a hash-input string, whose SHA256 digest is a fuzzy hash that allows finding similar malware, e.g., other reports of the same malware family, for a targeted collection of DIs. In some examples, task-tree hash values are used with first task trees having at least n tasks for predetermined n, e.g., n=2 or n≥3.

In some examples, the task-tree hash value can be determined based on invocation strings. One or more invocation strings can be determined, each representing an invocation of a respective one of the one or more first tasks in a first task tree. For example, the invocation string can be or include a pathname or normalized path of the file that was executed.

A hash-input string can be determined comprising the plurality of invocation strings. For example, the invocation strings can be concatenated using predetermined separators. The invocation strings can be arranged in order, e.g., in collation order, in execution order, or in order of the event timestamp of the first event detected when or after a task is spawned or injected into by the sample or a task spawned/injected into thereby (and likewise down the task tree). For example, the timestamp of task "A" can be when the task A was spawned, or when a task "B" already in the task tree injects code into the task A, e.g., by writing into the memory of task A (even if task A has been running for some time). The invocation strings can be separated by markers or identifiers of the tree level, in some examples. The first hash value can then be determine as a hash (e.g., SHA256) of the hash-input string. Example collation orders include ASCII order, UNICODE code-point order, UTF16 code-unit order (e.g., including surrogate pairs for characters outside the BMP), lexicographic order of bytes of binary data, lexicographic order of bytes in a particular character set or encoding (e.g., CP1252, Latin-1, UTF-16, or UTF-8).

The first task in the task tree can be represented as "%INPUT%" instead of as a specific filename. This can obviate false misses based on filename changes, e.g., in phishing emails sent to different targets. For samples 126 that are not executable, %INPUT% can represent both sample 126 itself (e.g., *.doc) and the launcher executable that runs it (e.g., winword.exe). This also obviates false misses based on differences in the launcher executable between different platforms (e.g., "acroread.exe" vs. "acrord32.exe"). In some examples, filetypes are included in the hash-input string, as described below, to reduce the probability of falsely detecting, e.g., a DOC file as being similar to a self-extracting executable. In other examples, filetypes are not used in the hash-input string, permitting similarity to be evaluated across filetypes.

In some examples, for a particular task in the task tree other than the first task, the invocation string can be determined using one or more of the following. In some examples, case is insignificant in the below, or in any combination of fewer than all of the below. In some examples, case is smashed before processing. Some examples use none of, exactly one of, or both of operations A and B listed below.

- A: (optional) smash case: uppercase or lowercase the full command line (if any) and filename.
- B: (optional) deobfuscate Base64, rot13, PowerShell, or other obfuscations applied to the command line. This can reduce the number of polymorphic variants.
- C: Perform MISP normalization of the file path to a task's primary module or other on-disk representation (e.g. "C:\Users\MO\AppData\Local\Temp" can be changed to "%TEMP%" to avoid including a specific username). Examples of MISP Examples normalization are shown at https://github.com/MISP/MISP/blob/cc9b182a87318b1ac7978e480b2398563ecee49a/INSTALL/MYSQL.sql #L1155-L1183, incorporated herein by reference. For example, the "ProgramData" directory on any drive can be normalized to "%PROGRAMDATA%", and likewise for %APPDATA%, %LOCALAPPDATA%, %WINDIR%, and other Windows-defined directories. MISP normalization can additionally or alternatively be applied to registry-key paths, e.g., by normalizing a registry key under "USER" with any SID to "HKCU." Additionally or alternatively, MISP normalization can include removing path components corresponding to browser-cache or other temporary directories. MISP normalization can include or be followed by uppercasing the result, in some examples.
- D: Abstract away specific app versions. In some examples, paths starting with "%WINDIR%\MICROSOFT.NET FRAMEWORK" are converted by replacing that path with "%MSDOTNET%". In some examples, paths starting with "%PROGRAMFILES%\INTERNET EXPLORER" are converted by replacing that path with "%MSIE%") (case-insensitive, in some examples). Some examples normalize filenames, which might change due to obfuscation. The result of normalizing the filenames can be specific enough to still be meaningful, while defeating that particular type of obfuscation. Some examples normalize usernames to "%username%". Some examples normalize paths so that a user's home directory or well-known paths therein are expressed as "~", "%userprofile%", "%appdata%", and the like, instead of, e.g., "C:\Users\JSB" or "C:\Users\JSB\AppData\Roaming".
- E: The command line is translated to an ARGV format. This can include splitting the command line string into an array of individual arguments, e.g., per bash(1) or MSVCRT rules.
- F: For each command line argument, discard, e.g., short arguments (less than 3 characters), if they are not flags (e.g., do not begin with a slash or hyphen).
- G: If an argument is an IP address (qr{^(\\d{1,3})\\.(\\d{1,3})\\.(\\d{1,3})\\.(\\d{1,3})(:\\d+)?$}) (anchors to the beginning and end of the argument, after trimming leading/trailing whitespace) (an example pattern) translate it to "%IP%" (an example marker string)
- H: If an argument contains artifacts indicating it may be an URL (e.g., contains "HTTP://", "HTTPS://", or "WWW.", case-insensitive, all of which are patterns), translate it to %URL% (marker string)
- I: If an argument contains "%TEMP%\\" (pattern), transform it to "%TEMP%\\*<stringAfterLastDot>" (marker string)
- J: If an argument contains "$ENV:" transform it to "$ENV: %VAR%"
- K: If an argument starts with "4D5A" and is larger than 256 bytes, transform it to "%PEMAGIC%"
- L: Strip some characters: [ ]"'^. In some examples, the characters stripped are selected based on the platform on which sample 126 was executed. In other examples, the same characters are stripped regardless of platform.
- M: Detect embedded script code in the command line (e.g., JS, VBScript, or PowerShell) (e.g., as an argument to a "-e" switch, or by keyword matching or other text-searching or pattern-matching techniques), then replace the code with a marker string such as "[JS]".
- N: After all of (or a set of one or more of) the arguments are processed, e.g., using any of A-M above, sort the resulting arguments by their natural order (e.g., lexicographical order of a UTF-8representation of the command line, after trimming leading whitespace) or by another collation order. Assemble the sorted arguments together into a string: "[<argument1InOrder>, <argument2InOrder>, . . . ]". This reduces the probability of false misses due to variation in argument positions, which attackers may use as a form of obfuscation.

For example, at least one invocation string of the plurality of invocation strings can be determined based at least in part on a corresponding command line by at least: replacing a pattern (E.g., a regex or fixed string) occurring in the command line with a corresponding marker string (e.g., "%URL%"), e.g., as C, D, or G-K above; removing characters in a predetermined set of characters (e.g., [ ]"'^) from the command line, e.g., L above; splitting arguments out of the command line (e.g., per bash, csh, cmd, ShellExecute, or other shell-based word-splitting rules), e.g., E above; or sorting the arguments (e.g., per a predetermined collation order, which can be specified as part of context data 128 or which can be a single collation order used for all invocation-string determination), e.g., M above. Replacing a pattern can include performing a full regex substitution, possibly including backreferences. For example, item I above can be performed as the Perl regex replacement s{%TEMP% \\(.*)\.([^.]+)} {%TEMP%\\\*$2}.

For the 862dab example, strings at an intermediate stage of normalization can be, in order, as listed in Table 2, row 1. In some examples, each string has the form "<normalizedPath><normalizedArgumentList>". In some examples, the normalized path is all uppercased. The corresponding invocation strings for 862dab are as listed in Table 2, row 2. In Tables 2 and 3, "¬" marks a wrap in a single line; whitespace after a "¬", including line breaks and leading whitespace on the following line, is ignored.

TABLE 2

| Row | Strings |
|---|---|
| 1 | %INPUT% <br> %TEMP%\*.EXE <br> %SYS32%\NETSH.EXE[ADD,ALLOWEDPROGRAM,ENABLE,FIREWALL] |
| 2 | {0}%INPUT% <br> {1}>%TEMP%\*.EXE <br> {2}>%SYS32%\NETSH.EXE[ADD,ALLOWEDPROGRAM,ENABLE,FIREWALL] |

The first hash value can be determined further based at least in part on at least: a file type of the first malware sample; a file size of the first malware sample; or a first event record 120 representing network traffic initiated by the malware sample during detonation. For example, the hash-input string can be determined to include a filetype string representing a file type of the first sample, a string representing a filesize, e.g., in MB (decimal or binary), or one or more flags or "key=value" pairs indicating network traffic or other behavior.

For example, more characteristics can be added to the invocation strings to form the hash-input string, which is a "fingerprint" of the first task tree during detonation. The SHA256 (or other) digest of the "fingerprint" can be used as a fuzzy hash (task-tree hash value) to find similar samples. Examples of the "fingerprint" are shown in Table 3. Table 3 shows values related to the 862dab example and values related to another example, referred to as the "ltr642" example.

In some examples, invocation strings can further be determined by stripping or abbreviating arguments. For example, an argument (e.g., the first argument, or any argument) can be skipped if it starts with a double quote or a single quote, if it equals or contains the program name itself (e.g., matching case-insensitively), or if it includes the string "==". This can permit skipping arguments that repeat information (e.g., the executable path) already represented elsewhere in the invocation string, which can in turn increase the ability of a hash over that invocation string to effectively identify similar samples.

In some examples, static and dynamic similarity techniques are used together. For example, a second sample (or a third or other sample) can be determined to be similar to a first sample 126 if at least one of the following holds: task-tree hash values of the first and second samples match; SSDEEP hash values of the first and second samples match; or IMPHASH values of the first and second samples match. Some examples use similarity-search techniques that take into consideration a variety of different hashes and characteristics (such as shared behavior tuples, as described above) to more effectively collect relevant DIs that have a relationship to sample 126 (or a related artifact, such as a specific file or URL) or to determine a confidence level of a determination of whether or not sample 126 is malware.

TABLE 3

| Item | Value |
|---|---|
| Fingerprint format | <inputFiletype>;<fileSizeInMB>;<showedNetworkTraffic=1\|0>;<invocation string(s)> |
| 862dab hash-input string (fingerprint) | .NET EXE;0MB;NET=1;{0}%INPUT%{1}>%TEMP%\*.EXE{2}> %SYS32%\NETSH.EXE[ADD,ALLOWEDPROGRAM,ENABLE,FIREWALL] |
| 862dab task-tree hash | 58cf763f79ab61dd96d1ee6786fa8825fe19e135c03838dbc4e145f0f7120cce |
| | Note: there is no trailing newline included in the hash computation in this example, and that the space in ".NET EXE" is U+0020, although neither of those is limiting |
| ltr642 task tree | WINWORD.EXE /n "C:\IRS-Letters-062018-642.doc" (PID: 2292) <br>    powershell.exe PowersHeLL -e <encoded string> <br>        141388.exe (PID: 2712) 14/68 Hash Seen Before <br>        141388.exe (PID: 4020) 14/68 Hash Seen Before |

TABLE 3-continued

| Item | Value |
| --- | --- |
| ltr642 invocation strings | {0}%INPUT% <br> {1}>%SYS32%\POWERSHELL.EXE <br> {2}>%TEMP%\*.EXE <br> {3}>%TEMP%\*.EXE |
| ltr642 hash-input string (fingerprint) | DOC;0MB;NET=1;{0}%INPUT% <br> {1}>%SYS32%\POWERSHELL.EXE <br> {2}>%TEMP%\*.EXE{3}>%TEMP%\*.EXE |
| ltr642 task-tree hash | c24db40ec78dec858f58ee18adcae456166e188213b6392ff29167ef34c6aa1e |

Various examples relate to determining confidence levels (CLs) in DIs that can be used to locate malware. DIs can be related to files or to non-file items such as network addresses. Determining CLs can permit deploying higher-confidence DIs to intrusion-detection systems (e.g., SURICATA) to proactively reduce the probability of a malware incursion into a system (e.g., by updating firewall rules). In some examples, higher CLs indicate higher confidence that the DI indicates malware, and lower CLs indicate lower confidence that the DI indicates malware. In some examples, higher CLs indicate higher confidence that the DI indicates malware, and lower CLs indicate higher confidence that the DI does not indicate malware. For brevity, the former is used in various examples herein, without limitation.

As discussed above, various examples permit locating similar malware samples, e.g., variants of a malware sample 126 or other members of the same malware family as sample 126. Upon detection, therefore, of an attack using sample 126, other samples related to sample 126 can be proactively blocked. This can reduce the probability of success of a malware campaign. Various examples determine confidence levels ("CLs") for DIs and use those CLs to determine which DIs are most likely to effectively block or indicate the presence of the related malware. In some examples, a CL for a DI is determined based on the occurrence of that DI across a corpus 418. In some example, the CL is determined based on the occurrence of that DI across the set 416 of related samples.

The first malware sample can be detonated, e.g., as described above, to provide one or more first event records 120 representing events performed by the first malware sample and detected during detonation.

A first DI of a set of DIs is determined based at least in part on the first event records 120. Example DIs are noted in Table 4-12 and are described herein with reference to behavior indicators. Example DIs can include URLs, domain names, IP addresses, file hashes, file signatures, strings occurring in files, patterns of behavior, or other characteristics that can be used by a security agent to detect malware. For brevity, various examples are described with reference to a small number of DIs. However, any number of DIs can be analyzed, assigned CLs, filtered based on CL, or transmitted. In some examples, the number of DIs is much smaller than the number of malware samples in corpus 418. For example, DIs can be drawn from a finite set of predetermined DIs, e.g., provided by security analysts and stored in a database. For clarity of illustration, each of Tables 4-12 represents a particular category of DIs. The categories are not limiting, and other categorizations can additionally or alternatively be used. A match of a listed detection rule does not require or necessarily imply 100% certainty that the DI is actually present. Moreover, a match of a single listed detection rule does not require that the same be dirty. DIs can be used in combinations, as described herein, to detect dirty samples and to analyze task behavior.

Throughout Tables 4-12, DIs described in the form of actions can apply to a sample as present on disk, a sample as loaded into memory, contents of the memory image of a sample while that sample running, a dropped file as present on disk, a dropped file as loaded into memory, contents of the memory image of a dropped file while that dropped file is running, or any combination thereof. For example, a DI can be detected based on a content-based detection rule matching in any of the disk image of a sample or the memory image of that sample after loading. In another example, a DI can be detected if the content-based detection rule matches both the disk image of the sample and the memory image of that sample after loading.

Some items in Table 3 are drawn from an analysis of a file named 862dab76bfd046881947f27e73713e79.exe (the "sample"). The sample was analyzed on 2018 Jun. 12, on a system running Windows 7 32 bit, Professional, 6.1 (build 7601), Service Pack 1. Characteristics of the sample are given in Table 13.

TABLE 4

Category: Activity

| DI | Example detection rule(s) | Notes |
| --- | --- | --- |
| Creates dirty file | { Hook on CreateFile or creat(2) triggered, or hook on fopen(3) with non-existent file as argument triggered } plus { resulting file is dirty } | E.g., extracts a compressed file classified as dirty, or writes a dirty file to disk |
| Spawns dirty task | { Hook on CreateProcess or fork(2) triggered } plus { resulting task is dirty } | |
| Marks file or registry key for deletion | Hook on MoveFileEx with MOVEFILE_DELAY_UNTIL_REBOOT flag triggered, or creation of PendingFileRenameOperations registry entry | |

TABLE 4-continued

| | Category: Activity | |
|---|---|---|
| DI | Example detection rule(s) | Notes |
| Opens file or registry key with deletion access rights | RegOpenKeyEx hook with deletion in the samDesired parameter triggered, or CreateFile hook with the FILE_SHARE_DELETE sharing mode triggered | |
| Installs hooks in, or patches, a running task | Hook on memory-mapping or-writing function triggered, or memory-access trap triggered | |
| Touches OS system file(s) or registry key(s) | Hook triggered on file-or registry-key-opening API | E.g., files in the Windows directory or registry keys in HKLM |
| Opens the Kernel Security Device Driver (KsecDD) of Windows | Hook on CreateFile to open "\Device\KsecDD" triggered | |
| Loads the scheduled-task scheduler COM API | | |

TABLE 5

| | Category: Evasive behavior | |
|---|---|---|
| DI | Example detection rule(s) | Notes |
| Checks for the presence of a forensics/monitoring tool | Content-based detection rule matching name(s) of tool(s) | E.g., "processhacker.exe" |
| Tries to evade analysis by sleeping many times | Hook on sleep API routine triggered more than a predetermined number of times | |
| Tries to sleep for a long time | Hook on sleep API routine triggered one or more times, and total requested sleep time exceeds a predetermined threshold (e.g., 2 min.) | |
| Queries kernel debugger information | | |
| Queries task information | Hook triggered on NtQuerySystemInformation, ZwQuerySystemInformation, EnumProcesses, CreateToolhelp32Snapshot, or similar function, or on a read of/proc or other task-information store | |
| Creates guarded memory regions | Hook on memory-allocation function with PAGE_GUARD access rights triggered | anti-debugging trick to avoid memory dumping |
| Tries to implement anti-virtualization techniques | Content-based detection rule matching name(s) of virtualization software program(s) | E.g., "sandboxie" |

TABLE 6

| | Category: Fingerprinting/Information access | |
|---|---|---|
| DI | Example detection rule(s) | Notes |
| Reads the active computer name | Hook triggered on GetComputerName or gethostname(2) | |
| Reads the cryptographic machine GUID | Hook triggered on registry read for key holding GUID, or hook triggered on WMI request for class Win32_ComputerSystemProduct | |
| Reads information about supported languages | Hook triggered on registry read for keys holding languages, or hook triggered on GetSystemDefaultUILanguage, GetSystemPreferredUILanguages, GetUserDefaultUILanguage, or GetUserPreferredUILanguages. | |
| Reads the registry for installed applications | Hook triggered on registry read for keys holding app paths or file-extension associations | |

TABLE 7

Category: Network behavior

| DI | Example detection rule(s) | Notes |
|---|---|---|
| Looks up dirty domain names | Hook triggered on DNS request or DNS-packet transmission carrying a domain name classified as dirty | Domain names can be determined to be dirty, e.g., by virtue of being referenced by dirty samples |
| Communicates with dirty hosts | Hook triggered on WriteFile, write(2), send(2), or other network-writing function, or on network-packet transmission, to network host classified as dirty. | Hosts can be determined to be dirty, e.g., by virtue of having been the source of dirty files. |
| Downloads dirty artifacts | | |
| Queries sensitive IE security settings | Hook triggered on registry read for keys holding IE security settings | |
| Connects to a host without prior DNS lookup | | |

TABLE 8

Category: Pattern matching

| DI | Example detection rule(s) | Notes |
|---|---|---|
| Sample or dropped file matches a detection rule (e.g., a YARA signature) | Content-based detection rules, e.g., as described with reference to FIG. 3 | E.g., in a string extracted from a sample |
| Contains a dirty IP address or URL | Content-based detection rule, or pattern-based extraction (e.g., regex matches) plus database lookups | Found an IP/URL artifact that was identified as malicious by at least one reputation engine |
| Contains an IP address | Content-based detection rule, e.g., qr{(\d{1,3}\.){3}\d{1,3}} | Many benign samples contain URLs; fewer contain IP addresses |
| Contains a URL in memory | Content-based detection rule applied to in-memory contents | URLs may be encrypted or obfuscated in the sample on disk |
| Matches a dirty compiler/packer signature | Content-based detection rule, TrID rule, PEiD rule | |
| Task-tree signature matches detection rule | Fuzzy hash, e.g., FIGS. 5, 11, and 12 | |

TABLE 9

Category: Persistence

| DI | Example detection rule(s) | Notes |
|---|---|---|
| Modifies firewall settings | Spawns netsh task with "firewall" argument | |
| Modifies proxy settings | Hook triggered on registry write or delete of keys holding proxy settings (e.g., ZoneMap) | |
| Disables Windows Task Manager | Hook triggered on registry write of DisableTaskMgr key | |
| Writes data to a remote task | Hook on memory-mapping or-writing function (e.g., WriteProcessMemory) triggered, or memory-access trap triggered, on task other than that doing the writing | |
| Allocates virtual memory in a remote task | Hook triggered on VirtualAllocEx writing to a task other than that doing the writing | |
| Connects to LPC ports | Hook triggered on connection to connection port object, or on call to NtConnectPort | |
| Creates or modifies daemons (e.g., Windows services) | Hook triggered on registry write for keys governing service startup (e.g., in CurrentControlSet) | |

TABLE 10

Category: Remote access

| DI | Example detection rule(s) | Notes |
|---|---|---|
| Uses network protocols on unusual ports | Hook triggered on WriteFile or other network-writing function, or on network-packet transmission, to a port not commonly used, or to a port not negotiated via an open connection (e.g., an FTP data port); network traffic in a particular protocol to a port other than a well-known (e.g., IANA-defined) port for that protocol. | |

TABLE 11

Category: Sample

| DI | Example detection rule(s) | Notes |
|---|---|---|
| Sample was identified as dirty by a large number of Antivirus engines | Sample detected as dirty by at least a predetermined percentage of antivirus scanners, e.g., at least 50%. | |

TABLE 11-continued

Category: Sample

| DI | Example detection rule(s) | Notes |
|---|---|---|
| Sample was identified as dirty by at least one Antivirus engine | Sample detected as dirty by at least one antivirus scanner | |
| Sample includes dirty file (e.g., compressed in an archive) | Proper subset of the contents of a sample, either as-is or decompressed, identified as dirty | |
| Contains ability to enumerate tasks/modules/threads | Sample includes a string or numeric reference to Module32First, EnumProcesses, or another function used for enumerating; or sample includes a string referencing the/proc file system | |
| Contains ability to retrieve keyboard strokes | Sample includes a string or numeric reference to GetAsyncKeyState or other low-level keyboard-reading function; or sample includes a string referencing/ dev/tty or another low-level keyboard interface. | |
| Contains ability to download files, e.g., from the Internet | | |

TABLE 12

Category: Other

| DI | Example detection rule(s) | Notes |
|---|---|---|
| Reads configuration files | Hook triggered for reading a configuration file with respect to at least a predetermined number of different configuration file names (e.g., one or >1) | E.g., "%USER-PROFILE%\Desktop\desktop.ini" |
| Looks up a domain name | Hook triggered on gethostbyname or other DNS-request function, or on DNS request-packet transmission | |
| Communicates with a host via the network | Hook triggered on read/write or send/recv operations on a network socket | |
| Creates a writable file in a temporary directory | Hook triggered on GetTempPath, GetTempFileName, tmpfile, mktemp(1), or tmpnam(3) | |
| Creates a mutex | Hook triggered on CreateMutex, pthread_mutex_init, or other mutex-creation function | Mutexes can be, e.g., POSIX mutexes or Win32 mutants |
| Loads the .NET runtime environment | Hook on Load Library, dlopen, or other module-loading function with a .NET module to be loaded (e.g., mscorlib.ni) | |
| Spawns new tasks | Hook on CreateProcess or fork(2) triggered | |
| Creates/extracts files | Hook on CreateFile, creat(2), fopen(3), or other file-creation function triggered | |

TABLE 13

| Item | Value |
|---|---|
| Size | 109056 bytes |
| Type | peexe assembly |
| Description | PE32 executable (GUI) Intel 80386 Mono/.Net assembly, for MS Windows |
| SHA256 | 649d1b023df1153bb8006f8b945766b8f4bfb414eea4d63e216944428cdc149a |
| ssdeep | 1536:7T29cGuHaKFKFaXgmGNWT1250PP1aed/y4w+v:/2OaKFi84SnAed/nw |
| imphash | f34d5f2d4577ed6d9ceec516c1f5a744 |
| authentihash | 4ad4b5c8eb48089388ba8f867c0fdd24b942a730377e76dbdefc812e678316db |
| TrID | 56.7% (.EXE) Generic CIL Executable (.NET, Mono, etc.)<br>21.4% (.EXE) Win64 Executable (generic)<br>10.1% (.SCR) Windows Screen Saver<br>5.0% (.DLL) Win32 Dynamic Link Library (generic)<br>3.4% (.EXE) Win32 Executable (generic) |
| Task chain | 862dab76bfd04688f947f27e73713e79.exe (PID: 5684)<br>→ Dropped server.exe (PID: 5916)<br>→→ Ran netsh.exe netsh firewall add allowedprogram "%TEMP%\server.exe" "server.exe" ENABLE (PID: 5972)<br>Note: the information in the task chain can be used in producing a hash-input string, as described here. |
| Packer | Microsoft visual C# v7.0/Basic .NET |

A first confidence level associated with the first DI is determined based at least in part on a degree of occurrence of the first DI in a corpus 418 of malware samples. The degree of occurrence can indicate or include how much malware is associated with this DI, e.g., a rate, rank, count, level, or probability of that DI being associated with a malware sample. For example, if a particular DI is exhibited by 42% of the malware samples in the corpus, and is the most common DI in the corpus, the degree of occurrence can be 0.42 (rate or percentage) or 1 (rank or level).

Additionally or alternatively, the first CL associated with the first DI can be determined based at least in part on a degree of occurrence of the first DI in a set of DIs associated with malware samples in the set 416 of related samples. For example, if a particular DI is exhibited by 42% of the malware samples in the corpus, but only 3% of the samples in the set 416, the degree of occurrence can be 0.03.

Additionally or alternatively, the first CL associated with the first DI can be determined based at least in part on occurrence of behavior indicators or tuples (described herein with reference to operation 512) in the corpus 418 or set 416 of related samples. For example, occurrence of a behavior indicator in association with a sample determined using other data to be malware can increase the CL. Occurrence of the behavior indicator in association with a sample not determined using other data to be malware can decrease the CL. For example, occurrence of a behavior indicator or tuple can be used in determining CLs based on the unique occurrences in existing malicious reports of those indicators or tuples, provided they did not occur on any report (sample or its data) that has a "suspicious" (but not malicious) or "clean" classification.

In some examples, behavior indicators or tuples can be recorded in a list ordered by frequency of occurrence in that subset of the corpus 418 or set 416 of related samples that describes malicious samples. The list can include tuples observed, e.g., over a predetermined time period or since inception of the corpus 418 or set 416 of related samples. A higher ranking in the list (more frequent) can increase the CL; a lower ranking can decrease the CL. The closer a tuple is to a tuple based on detonations of a large number of malicious samples, the higher the CL can be.

Some examples can include generating a detection rule (e.g., a YARA or SURICATA rule) representing the first DI (or another DI). Other example forms of detection rules are described herein with reference to mitigation module 230 and operation 314.

In some examples, a second malware sample in the set 416 can be located (e.g., a related, previously-detonated sample). A second DI can be determined based at least in part on one or more stored second event records 120 associated with the second malware sample. A second CL can be determined for the second DI as noted above with reference to the first CL.

Some examples, as noted above, filter the DIs, e.g., to report only DIs with sufficiently high confidence. Some examples report DIs together with the associated CLs. Some examples group DIs based on CLs, and use the DIs based on their groupings. For example, the DIs having the top n (e.g., ten) CLs, or CLs matching another high-confidence criterion, can be sent to network functions 134 or computing devices 104 for use in blocking malware. DIs having a middle range of CLs can be included as warnings in a report, e.g., to a security analyst or other entity 112. DIs having a lower range of CLs can be disregarded, or reported as informational rather than actionable. Any number ≥2 of ranges can be used, and each range can have a respective disposition or action, e.g., taken by any device receiving the DIs. Sending only higher-CL DIs to computing devices 102, 104, 106, or 200, or network functions 134, can permit blocking malware with reduced storage and computational load (and therefore higher throughput or lower latency) than some prior schemes that transmit all DIs. Sending only higher-CL DIs can also reduce the probability of false detections.

In some examples, accordingly, an indication of the first DI, the second DI, the first confidence level, and the second confidence level can be transmitted via a network, e.g., in or accompanying one or more result records 122. The DIs and CLs can be sent to a computing device 104 or 106, or to a network function 134, in some examples. In some examples, only the first DI and CL, or only the second DI and CL, can be sent. In some examples, based at least in part on the first and second confidence levels, either the first DI or the second DI can be selected as a higher-confidence DI. The higher-confidence DI can be transmitted via a network.

In some examples, DIs and CLs can be sent as push notifications (e.g., via RSS, COMET, or WebSockets), or as pull responses, e.g., to API calls requesting DIs and CLs. The API can permit the caller to configure the CLs or CL ranges to be reported, the recency of the DIs, or other parameters. In some examples, the API can provide a SQL, GraphQL, or other query-language interface permitting API clients to submit flexible queries for DIs of interest. The API can also expose information about whether a particular DI is or is not associated with malware, and a confidence level associated with that determination. This can permit network functions 134 or other API clients to adjust operation accordingly in order to block malware without exceeding processing resources or storage allocate to DIs (e.g., a firewall can block an IP address indicated in an DI). Additionally or alternatively, a user interface to the API can be provided for use, e.g., by administrators or other entities 112. This can permit administrators to more effectively secure their systems without being overloaded by data.

In some examples, network functions 134 or other API clients can select the DIs they will use based on the CLs associated with those DIs. In some examples, network functions 134 or other API clients, upon detecting malware based on a DI, can determine remediation action(s) based on the CL associated with that DI. For example, a high-confidence DI can trigger blocking and quarantine. Additionally or alternatively, a medium-confidence DI can trigger a warning prompt to the user (similar to, e.g., a UAC prompt) of a computing device 104 requiring that the user approve the program for execution. Warning rather than blocking on medium-confidence-DI-based detections can also reduce the negative effects of false detections on the user.

In some examples, the query API, or another API, can additionally or alternatively receive telemetry data from, e.g., computing devices 104 or network functions 134. The telemetry data can indicate, e.g., recently-detected malware, or sources of attack. Telemetry data can be added to corpus 418 for use in future analysis or in locating related samples.

Figure 6:
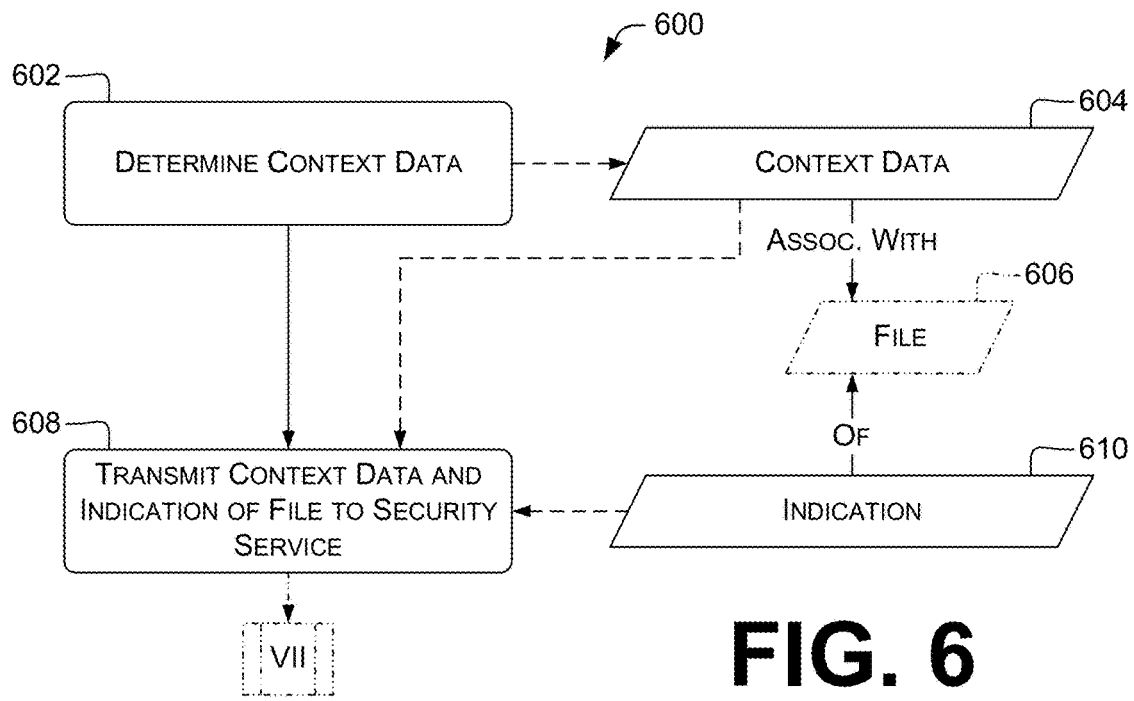
FIG. 6 illustrates an example technique for reporting security-relevant information.

FIG. 6 is a dataflow diagram illustrating an example technique 600 performed by a security agent (e.g., detection module 226) running at a first computing device (e.g., a computing device 104) for reporting security-relevant data, and related data items. In some examples, a computing device 104, 200 includes control unit(s) configured to perform operations described below, e.g., processing unit(s) 210. For clarity in this and subsequent figures, dataflow is shown with dashed arrows unless otherwise indicated.

Figure 7:
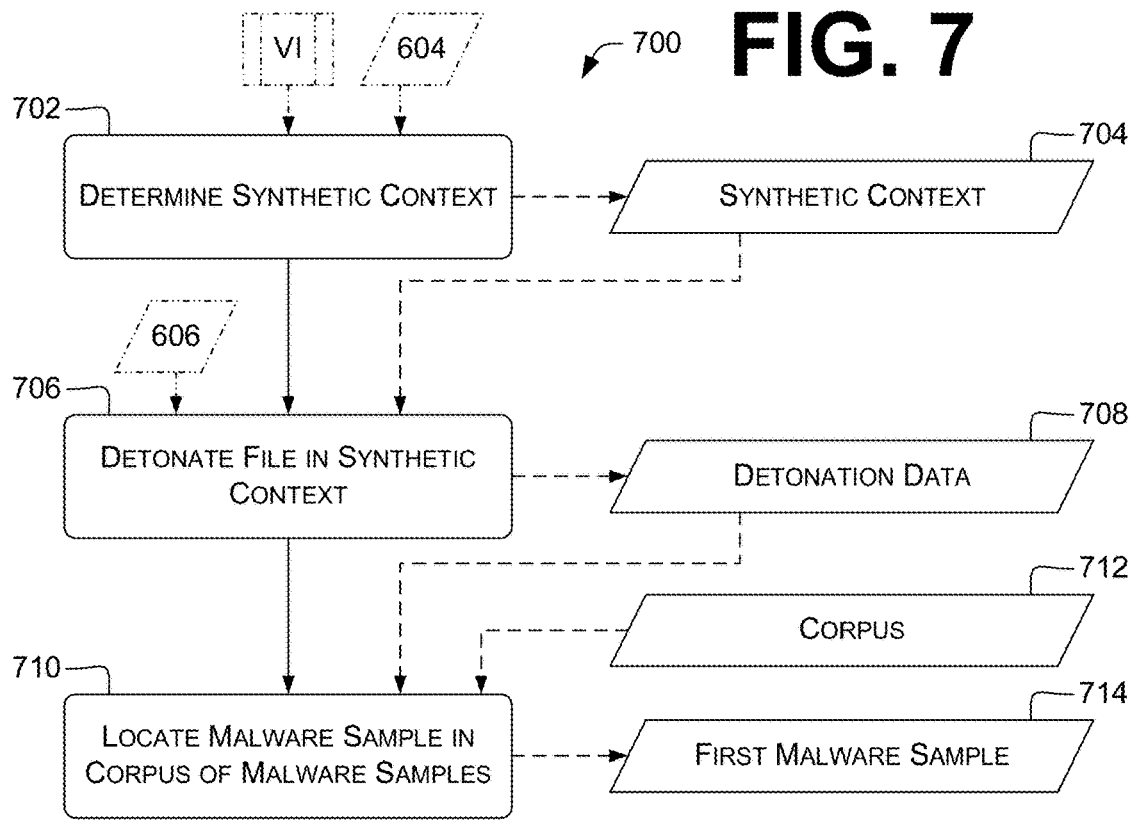
FIG. 7 illustrates an example technique for analyzing security-relevant information, e.g., to locate similar malware samples.

In some examples, technique 600 can be used together with technique 700, FIG. 7. For example, a system can include a first computing device 104 running the security agent and a second computing device 102 running a security service. The security agent can be configured to (e.g., the computing device 104 can include a control unit or otherwise be configured to) perform operations of technique 600. The security service can be configured to (e.g., the computing device 102 can include a control unit or otherwise be configured to) perform operations of technique 700. In other examples, techniques 600, 700 are used independently (e.g., only one is used, or the two are used without direct coordination).

At 602, the detection module 226 can determine context data 604 (which can represent context data 128) associated with a file 606 (which can represent sample 118, 126; shown here in phantom) present at the first computing device. Examples are discussed herein, e.g., with reference to context data 128, operation 304, or FIGS. 3-5.

At 608, the communications module 224 can transmit the context data 604 and an indication 610 (which can represent sample 118, 126) of the file 606 to the security service. Examples are discussed herein, e.g., with reference to FIG. 1, communications module 224, or operations 306, 316. In some examples, processing of technique 700 takes place subsequent to operation 608.

FIG. 7 is a dataflow diagram illustrating an example technique 700 performed by a security service (e.g., detonation module 234) running at a second computing device (e.g., a computing device 102) for analyzing security-relevant data, and related data items. In some examples, a computing device 102, 200 includes control unit(s) configured to perform operations described below, e.g., processing unit(s) 210. In some examples, At 702, the detection module 226 can determine a synthetic context 704 (which can represent synthetic context 404) based on the context data 604. Examples are discussed herein, e.g., with reference to analysis module 228, detonation module 234, or operations 308, 402, or 504.

At 706, the detonation module 234 can detonate the file 606 in the synthetic context 704 to provide detonation data 708. Examples are discussed herein, e.g., with reference to detonation module 234 or operations 308, 406, or 506.

At 710, the analysis module 228 can locate, in a corpus 712 of malware samples, a first malware sample 714 that is similar to the file 606 based on the detonation data 708. Some examples include detecting a plurality of malware samples, of which first malware sample 714 is one. Examples are discussed herein, e.g., with reference to operations 414, 510.

In some examples, the security service us further configured to locate, in the corpus 712 of malware samples, a second malware sample (omitted for brevity) having at least one byte sequence or hash value in common with the file. For example, the analysis module 228 can use static-similarity techniques. Examples are discussed herein, e.g., with reference to FIG. 3 (detection rules), operation 510. This can permit using static-similarity techniques in addition to behavioral-similarity techniques to locate related malware samples.

FIG. 8 is a dataflow diagram illustrating example techniques 800 for detecting and mitigating malicious activities, and related data items. In some examples, a computing device 104 includes control unit(s) (e.g., processing unit(s) 210) configured to perform operations 802-812 described below. In some examples, at least: operation 602 is preceded by operation 802; operation 602 is preceded by operation 808; operation 602 includes operation 802, operation 602 includes operation 808, operation 602 includes operation 806, or operation 602 includes operation 812.

In some examples, the security agent running at computing device 104 is configured to detect potentially malicious activity. Some of these examples use one or both of first operations 802-806 and second operations 808-812.

At 802, the detection module 226 or mitigation module 230 can block an attempt 804 to execute the file 606. For example, a hook set by detection module 226 or mitigation module 230 on CreateProcess, exec(2), or similar execution routine can abort rather than executing file 606. Attempt 804 can include, e.g., data of which system service was invoked, by which process, or with which parameters. Further examples of blocking are discussed herein, e.g., with reference to operation 302. Other examples of techniques for detecting attempt 804 are described in the "Example detection rule(s)" columns of Tables 4-12.

At 806, the detection module 226 or mitigation module 230 can determine the context data 604 comprising at least some data associated with the attempt 804. Examples are discussed herein, e.g., with reference to operations 304 and 306. For example, the determined context data 604 can include information of an OS or OS version on which attempt 804 was carried out, timestamps, indications of running processes at the time of attempt 804, identification of file 606, command-line parameters with which file 606 was attempted to be executed, or other context data described herein.

At 808, the detection module 226 or mitigation module 230 can block an operation 810 of the file 606 during execution of the file 606. The file 606 can include processor-executable instructions to carry out the operation 810 of the file 606. For example, a hook on a library or kernel routine can abort rather than performing operation 810.

At 812, the detection module 226 or mitigation module 230 can determine the context data 604 comprising at least some data associated with the operation 810 of the file 606. For example, the determined context data 604 can include data identifying the routine(s) invoked (or otherwise identifying the operation 810), parameters passed to the routine(s), OS or OS version information, or other context data described herein.

FIG. 9 is a dataflow diagram illustrating example techniques 900 for analyzing samples or updating security subsystems, and related data items. In some examples, a computing device 102, e.g., hosting a security service, includes control unit(s) (e.g., processing unit(s) 210) configured to perform operations 902-912 or 916 described below. In some examples, a security device (such as network function 134) includes control unit(s) (e.g., processing unit(s) 210) configured to perform operation 914 described below. In some examples, operation 710 precedes at least one of operations 902, 908, and 916. In some examples, operation 702 precedes operation 916.

At 902, the analysis module 228 or presentation module 232 can determine one or more first DIs 904 based at least in part on at least the file 606 or the first malware sample 714. Examples are discussed herein, e.g., with reference to FIG. 4, operation 510, Tables 4-12.

At 906, the communications module 224 can transmit the one or more first DIs 904 (e.g., data indicating DIs 904) to the first computing device. In some examples, omitted for brevity, the communications module 224 can transmit DIs 904 to the security device, and operation 906 can be followed by operation 914. Examples are discussed herein, e.g., with reference to result record 122, operations 308-314, operation 422, or operation 512.

In some examples, a security service is configured to perform operations 908-912 and a security device is configured to perform operation 914, as indicated graphically by the stippled arrows.

At 908, the analysis module 228 or presentation module 232 can determine one or more second DIs 910 based at least in part on at least the file 606 or the first malware sample 714. Second DIs 910 can be the same as first DIs 904, or can be different. Examples are discussed herein, e.g., with reference to FIG. 4, operation 510, Tables 4-12.

At 912, the communications module 224 can transmit the one or more second DIs 910 (e.g., data indicating the second DIs 910) to the security device. Examples are discussed herein, e.g., with reference to result record 122, operations 308-314, operation 422, or operation 512.

At 914, the detection module 226 or mitigation module 230 running at the security device (e.g., network function 134) can block a program that exhibits at least one of the one or more second DIs 910. Examples are discussed herein, e.g., with reference to operation 314.

In some examples, the security service is configured to process the first malware sample 714. Some of these examples include operation 916.

At 916, the detonation module 234 can detonate the first malware sample 714 in the synthetic context 704. The detonation module 234 can additionally or alternatively detonate the first malware sample 714 in a different detected or synthetic context. Examples are discussed herein, e.g., with reference to operations 406 and 506.

Figure 10:
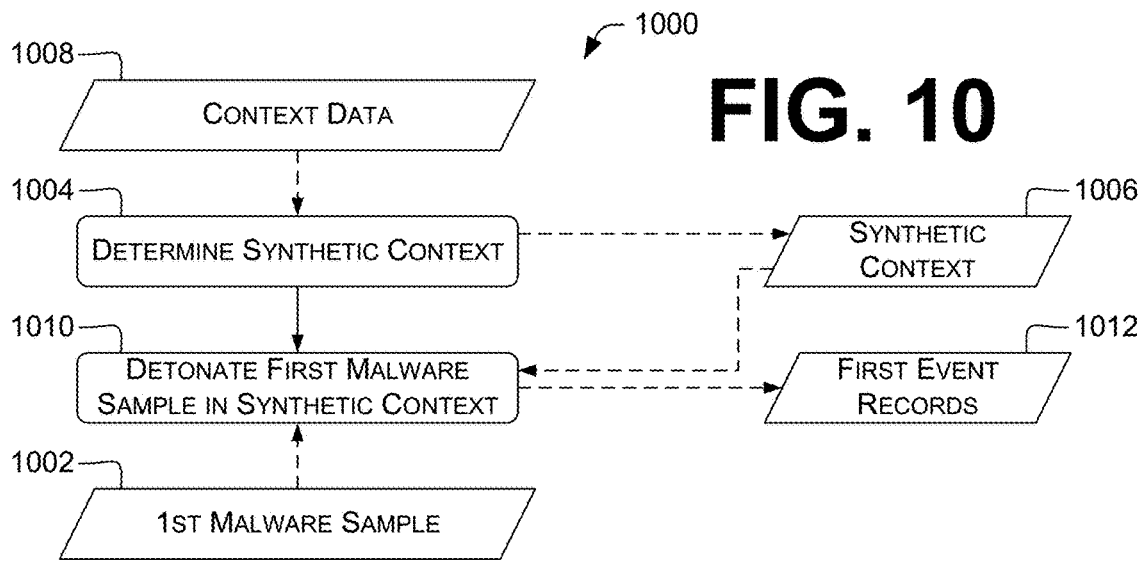
FIG. 10 illustrates an example technique for analyzing a malware sample.

FIG. 10 is a dataflow diagram illustrating an example technique 1000 performed by a security service for analyzing a first malware sample 1002 (which can represent file 606 or another sample), and related data items. In some examples, a computing device 102 includes control unit(s) (e.g., processing unit(s) 210) configured to perform operations described below.

At 1004, the detection module 226 can determine a synthetic context 1006 (which can represent synthetic context 704) based at least in part on context data 1008 (which can represent context data 128, 604) associated with the first malware sample 1002. Examples are discussed herein, e.g., with reference to operation 702.

At 1010, the detonation module 234 can detonate the first malware sample 1002 in the synthetic context 1006 to provide one or more first event records 1012 (which can represent event records 120, 132) representing events 408 performed by the first malware sample 1002 and detected during detonation. The one or more first event records 1012 can represent events in a set 412 of detected events. Examples are discussed herein, e.g., with reference to operation 706.

Figure 11:
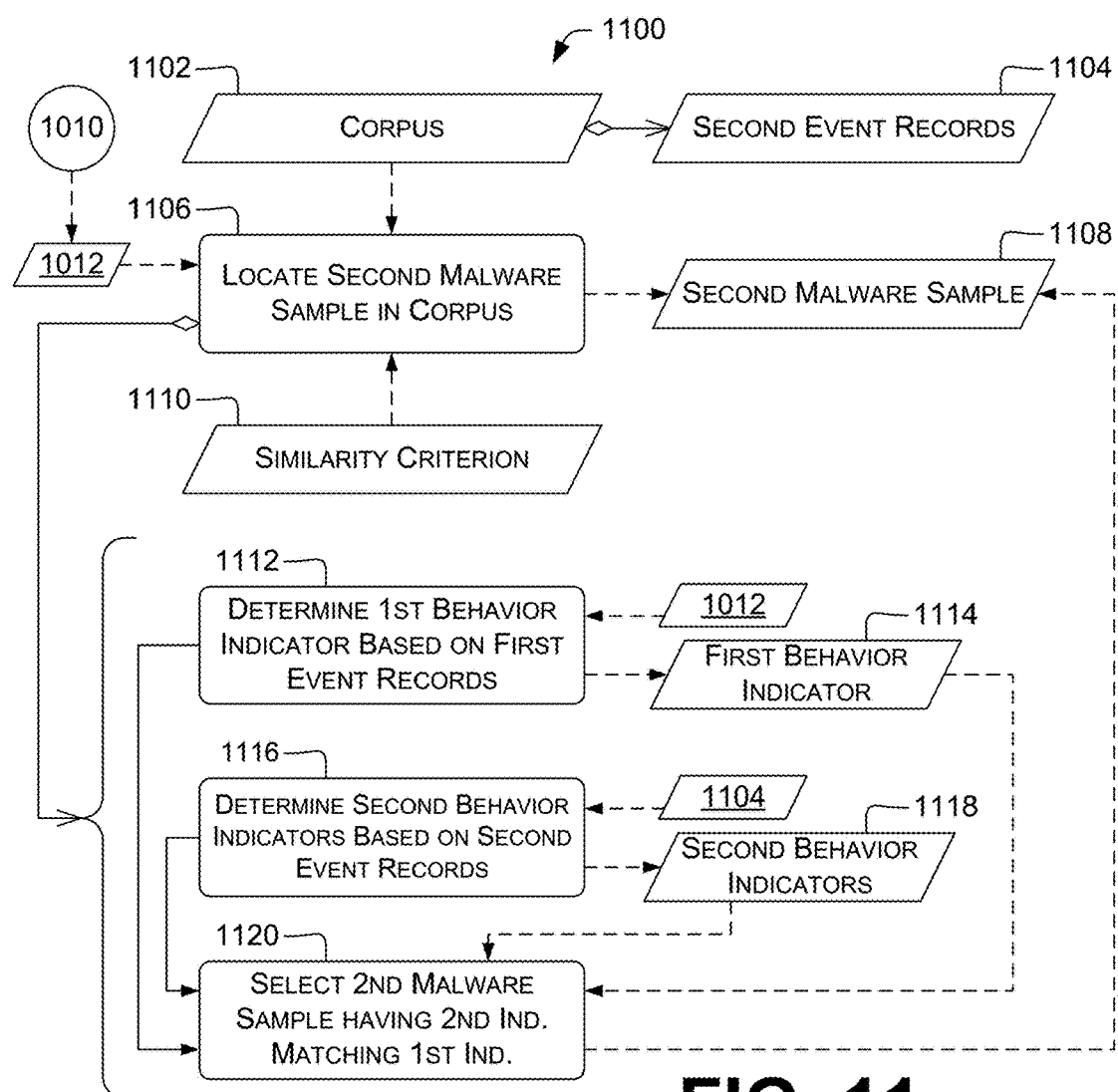
FIG. 11 illustrates example techniques for locating malware samples, e.g., using behavior indicators.

FIG. 11 is a dataflow diagram illustrating example techniques 1100 for locating malware samples, and related data items. In some examples, a computing device 102 includes control unit(s) (e.g., processing unit(s) 210) configured to perform operations described below. In some examples, a corpus 1102 of malware samples (which can represent corpus 418) can include the malware samples and second event records 1104 associated with the malware samples. In some examples, operation 1106 can follow operation 1010.

At 1106, the analysis module 228 can locate a second malware sample 1108 in corpus 1102. Operation 1106 can include selecting, from the malware samples in corpus 1102, a second malware sample 1108 that is associated with one or more second event records 1104 that satisfy a predetermined similarity criterion 1110 with respect to the one or more first event records 1012. Some examples are discussed herein, e.g., with reference to operations 414 and 510; other examples are discussed below. In some examples, operation 1106 includes operations 1112-1120 or operations shown in FIG. 12 or 13. Additionally or alternatively, operation 1010 can include operations 1112-1120.

At 1112, the analysis module 228 can determine a first behavior indicator 1114 based at least in part on the first event records 1012. Examples are discussed herein, e.g., with reference to operation 512. For example, first behavior indicator 1114 can indicate that one or more DIs, e.g., one or more of the DIs listed in Tables 4-12, occurs in the first event records 1012.

In some examples, first behavior indicator 1114 can include a tuple or other collection of data indicating, for a DI or for each of multiple DIs, whether that DI occurs in the first event records 1012. For example, first behavior indicator 1114 can be or include a 20-element tuple with each element i indicating whether #i in occurs in the first event records 1012. In some examples, first behavior indicator 1114 indicates particular DI(s) occurred without regard to the order in which they occurred. This can permit locating similar malware even if, e.g., different members of a polymorphic malware family perform operations in different orders.

In some examples, operation 1112 includes determining the first behavior indicator 1114 so that the first behavior indicator 1114 is not associated with a third sample, wherein the third sample is not known to be associated with malware (e.g., is known to be clean, or has an unknown clean/dirty status). For example, the first behavior indicator 1114 can be an indicator that is not associated with unknown or clean samples. This can reduce the chance of false detections.

In some of these examples, the analysis module 228 determines one or more behavior indicators, e.g., one or more tuples. Operation 1112 includes selecting one of those behavior indicators as the first behavior indicator 1114. Behavior indicators associated with third sample(s) can be filtered out of the one or more behavior indicators or otherwise excluded from consideration during the selection of the first behavior indicator 1114.

The one or more behavior indicators can include, e.g., respective indicators for each combination of DIs occurring in first event records 1012; respective indicators for each such combination including at least N DIs, e.g., N≥23; or respective indicators for each such combination including DIs from a particular category. Example behavior indicators, expressed as tuples, can include, e.g., (#1, #2, #3); (#4, #5, #6), or (#7, #8, #9).

At 1116, the analysis module 228 can determine, for individual malware samples in the corpus 1102, respective second behavior indicators 1118 based at least in part on the second event records associated with the individual malware samples. In some examples, operation 1116 is performed before operation 1112. For example, the second behavior indicators 1118 can be determined and stored in corpus 1102 before performing operation 1112, or before performing operation 1010 or 1004. In some of these examples, operation 1112 is followed by operation 1120. Operation 1116 can include determining at most one second behavior indicator 1118 per malware sample in corpus 1102. Additionally or alternatively, operation 1116 can include determining two or more second behavior indicators 1118 for at least one of the malware samples in corpus 1102. As discussed above with reference to operation 1112, the two or more second behavior indicators 1118 can include indicators expressing various combinations of DIs, e.g., fixed-length combinations or other combinations.

At 1120, the analysis module 228 can select from the malware samples the second malware sample 1108 having the respective second behavior indicator of the second behavior indicators 1118 matching the first behavior indicator 1114. In some examples, the predetermined similarity criterion 1110 can include code to test for this match. As discussed above with reference to operation 1112, second behavior indicators 1118 that match indicators associated with a third sample not known to be malware can be filtered out or otherwise disregarded in selecting the second malware sample 1108. In some examples in which multiple malware samples in corpus 1102 have second behavior indicator(s) 1118 matching first behavior indicator 1114, the analysis module 228 can select any of those multiple malware samples as the second malware sample 1108, can select all of those samples, or can select each in turn, for example.

In some examples, the analysis module 228 can determine that a second behavior indicator 1118 matches the first behavior indicator 1114 if, e.g., the first behavior indicator 1114 and the second behavior indicator 1118 list the same DIs; the second behavior indicator 1118 lists a subset of the DIs listed in the first behavior indicator 1114; the behavior indicators 1114, 1118 have at least C DIs in common, e.g., C≥3; or the behavior indicators 1114, 1118 have at least D % DIs in common, e.g., D≥50%. In some examples, the predetermined similarity criterion 1110 can indicate (e.g., store data of) the length of tuples or other amount of information in a behavior indicator 1114, 1118; the value of N (operation 1112), C, D, or other parameters; or other data used in determining or comparing behavior indicators 1114, 1118 (operations 1112-1120).

Figure 12:
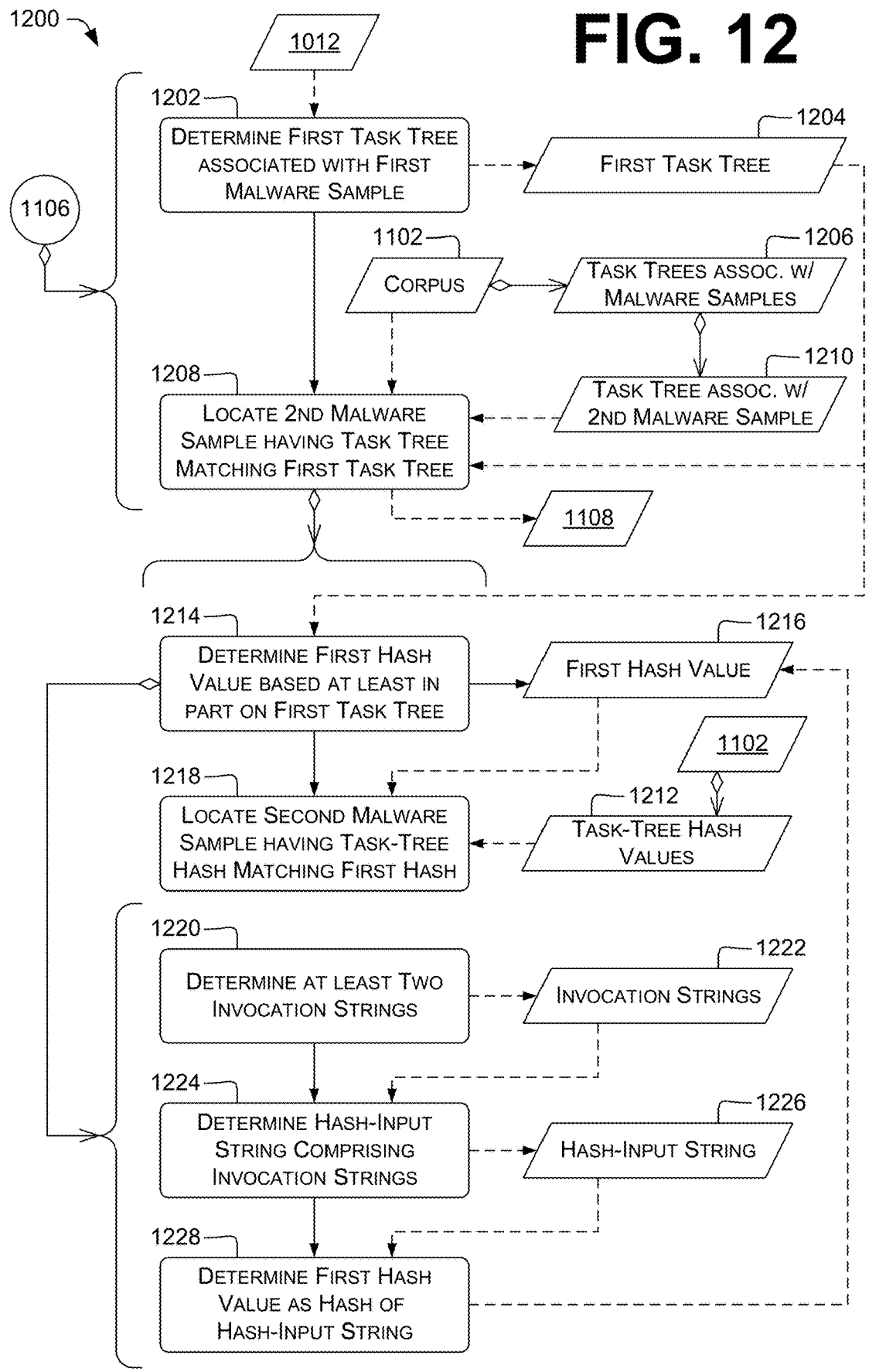
FIG. 12 illustrates an example technique for locating malware samples, e.g., using task trees.

FIG. 12 is a dataflow diagram illustrating example techniques 1200 for locating malware samples, and related data items. In some examples, computing device 102 includes control unit(s) (e.g., processing unit(s) 210) configured to perform operations described below. In some examples, at least: operation 1010 can precede operation 1202, or operation 1106 can include operations 1202 and 1208.

At 1202, the analysis module 228 can determine, based at least in part on at least one of the first event records 1012, a first task tree 1204 associated with the first malware sample 1002. The first task tree 1204 can indicate one or more first tasks, e.g., a sequence or branching tree of tasks that executed or otherwise invoked other tasks. Examples are discussed herein, e.g., with reference to operation 414, FIG. 5, and Tables 1-3. In some examples, a task tree is generated for one task executed during detonation, more than one of a plurality of tasks executed during detonation, or all of the tasks executed during detonation.

In some examples, the first event records 1012 can include PIDs and respective PPIDs of tasks executed during detonation (operation 1010). The analysis module 228 can produce task trees by linking a first task indicated in the first event records 1012 with at least one second task indicated in the first event records 1012 whose PPID matches the first task's PID. Any number of tasks can be linked in this way.

In some examples, corpus 1102 can include a plurality of task trees 1206 associated with the malware samples. Some of these examples include operations 1202 and 1208. The task trees 1206 can include command lines or other information about tasks executed during detonation or other analysis of the malware samples in corpus 1102. Examples of task trees 1206 are described herein with reference to operation 414, FIG. 5, and Tables 1-3. Task trees 1206 can be used to locate similar malware samples based on the behavior of those samples, e.g., when detonated.

At 1208, the analysis module 228 can locate the second malware sample 1108 associated with a second task tree 1210 matching the first task tree 1204. The plurality of task trees 1206 can include the second task tree 1210. Examples are discussed herein, e.g., with reference to with reference to operation 414, FIG. 5, and Table 1. For example, the analysis module 228 can locate a second malware sample 1108 for which a string representation of first task tree 1204 is within a predetermined distance, e.g., a Hamming or Levenshtein distance, of a string representation of the corresponding second task tree 1210. Additionally or alternatively, the analysis module 228 can compare task-tree hashes for equality, or look up the second malware sample 1108 in a datastore (e.g., corpus 1102) keyed by first task tree 1204 (e.g., represented as a hash, a directed acyclic graph, or another representation). In some examples, operation 1208 includes operations 1214 and 1218.

In some examples, corpus 1102 comprises task-tree hash values 1212 ("fuzzy hash" values) associated with the malware samples in the corpus 1102. Task-tree hash values 1212 can include the results of computing cryptographic (e.g., SHA-256) or other hashes described herein. Some of these examples include operations 1214 and 1218. Examples are discussed herein, e.g., with reference to FIG. 5 and Tables 1-3.

At 1214, the analysis module 228 can determine a first hash value 1216 (which can represent a first behavior indicator 1114) based at least in part on the first task tree 1204. Examples are discussed herein, e.g., with reference to operation 414, FIG. 5, and Tables 1-3. For example, the analysis module 228 can determine a string representation of the first task tree 1204. Some example techniques for doing so are described herein with reference to FIG. 5, Table 3, and operations 1220-1228. The analysis module 228 can then compute a cryptographic or other hash of the string representation to determine first hash value 1216.

In some examples, the first hash value 1216 can be determined by hashing or otherwise processing other data in addition to or instead of information from first task tree 1204. For example, the analysis module 228 can determine the first hash value 1216 further based at least in part on at least one of: a file type of the first malware sample; a file size of the first malware sample; or a first event record representing network traffic initiated by the first malware sample during detonation. Examples are discussed herein, e.g., with reference to FIG. 5 and Tables 2-3.

For example, the "fingerprint format" in Table 3 shows a way of combining with invocation string(s) representing a task tree an indication of an input filetype (e.g., an output from PEiD or other filetype described herein), an indication of a file size (in the example of Table 3, rounded to the nearest MB to increase the difficulty of obfuscating malware by padding it), and a binary indication of whether network traffic was observed during detonation (operation 1010). Any of these can be used individually, or other values can be used. The semicolon delimiters shown in Table 3, row 1, are not limiting; other delimiters can be used.

At 1218, the analysis module 228 can locate, in the corpus, the second malware sample 1108 having the associated task-tree hash value equal to the first hash value 1216. For example, the analysis module 228 can search a database (e.g., SQL, NoSQL, or filesystem), trie, associative array, or other data structure using the task-tree hash value as the key, and retrieve from the data structure an indication of the second malware sample 1108. In some examples, multiple second malware samples are associated with a particular task-tree hash value. In some of these examples, operation 1218 selects one of those second malware samples; in others of these examples, operation 1218 selects more than one (e.g., all) of those second malware samples. Examples are discussed herein, e.g., with reference to operation 414, operation 510, and Table 3. Example task-tree hashes are shown in Table 3 for the 862dab example and the ltr642 example.

Some examples of operations 1214 and 1218 can include the use of multiple hashes. For example, operation 1214 can include computing an ssdeep hash, an imphash, and a fuzzy hash (e.g., per Table 3), and operation 1218 can include locating the second malware sample 1108 having an ssdeep-hash match with first malware sample 1002, an imphash match with first malware sample 1002, or a fuzzy-hash match with first malware sample 1002.

In some examples, operation 1214 of determining the first hash value 1216 can include operations 1220-1228. These operations can permit locating similar malware samples without false misses due to differences in context data 128 between samples from different machines or different configurations.

At 1220, the analysis module 228 can determine at least two invocation strings 1222. Each invocation string 1222 can represent an invocation of a respective one of the one or more first tasks in the first task tree 1204. Examples are discussed herein, e.g., with reference to FIG. 5 and Tables 1-3. For example, operations A-N described herein with reference to FIG. 5 can be applied to command lines indicated in first event records 1012 as having been executed during detonation (operation 1010) to determine the invocation strings 1222.

At 1224, the analysis module 228 can determine a hash-input string 1226 comprising the at least two invocation strings 1222. Examples are discussed herein, e.g., with reference to FIG. 5 and Tables 2-3. For example, the analysis module 228 can assemble the hash-input string 1226 according to the fingerprint format shown in Table 3, row 1, or according to another format.

At 1228, the analysis module 228 can determine the first hash value 1216 as a hash, e.g., a cryptographic or other hash, of the hash-input string 1226. Examples are discussed herein, e.g., with reference to FIG. 5 and Table 3. For example, the hashes shown in Table 3 are SHA-256 hashes of the Examples of hashes usable at operation 1228 are described herein with reference to FIGS. 1, 3, 4, and 5.

FIG. 13 is a dataflow diagram illustrating example techniques 1300 for analyzing malware samples, and related data items. In some examples, a computing device 102 includes control unit(s) (e.g., processing unit(s) 210) configured to perform operations described below. In some examples, at least: operation 1220 can include operation 1302; or operation 1010 can be followed by operation 1308.

At 1302, the analysis module 228 can determine at least one invocation string 1304 of the at least two invocation strings 1222 based at least in part on a corresponding command line 1306. For example, the command line 1306 can be included in a first event record 1012. Operation 1302 can include replacing a pattern (e.g., expressed as a regex or fixed string) occurring in the command line with a corresponding marker string. Examples are discussed herein, e.g., items C, D, G-K, or M. Additionally or alternatively, operation 1302 can include removing characters (e.g., characters in a predetermined set of characters, or characters in tokens satisfying predetermined removal criteria) from the command line. Examples are discussed herein, e.g., items F or L. Additionally or alternatively, operation 1302 can include splitting arguments out of the command line. Examples are discussed herein, e.g., item E. Additionally or alternatively, operation 1302 can include sorting the arguments. Examples are discussed herein, e.g., item N.

At 1308, the analysis module 228 can locate a third malware sample 1310 having at least one byte sequence or hash value in common with the first malware sample. For example, the analysis module 228 can use static-similarity techniques. Examples are discussed herein, e.g., with reference to FIG. 3 (detection rules), operations 510 and 710. This can permit using static-similarity techniques in addition to behavioral-similarity techniques to locate related malware samples.

FIG. 14 is a dataflow diagram illustrating an example technique 1400 for analyzing a malware sample, and related data items. In some examples, a computing device 102 includes control unit(s) (e.g., processing unit(s) 210) configured to perform operations described below. Some examples include operations 1402 and 1410. Some examples include operations 1402-1416.

At 1402, the detonation module 234 can detonate a first malware sample 1404 (which can represent sample 118, 126, or 1002, or file 606) based at least in part on context data 1406 associated with the first malware sample 1404 to provide one or more first event records 1408 representing events (e.g., events in set 412) and detected during detonation of the first malware sample 1404. For example, the events can be events performed or triggered by the first malware sample, or other events. Examples are discussed herein, e.g., with reference to operations 406, 506, 706, or 1010.

At 1410, the analysis module 228 can locate a second malware sample 1412 (which can represent sample(s) in set 416, or sample 714, 1108, or 1310) in a corpus 1414 (which can represent corpus 418, 712, or 1102) based at least in part on the one or more first event records. Examples are discussed herein, e.g., with reference to operations 414, 510, 710, 1106, and 1308, and FIGS. 11-13.

At 1416, the detonation module 234 can detonate the second malware sample 1412 based at least in part on the context data 1406 to provide one or more second event records 1418 representing events detected during detonation of the second malware sample 1412. In some examples, operation 1402. For example, the first malware sample 1404 and the second malware sample 1412 can be detonated in a common synthetic context. Additionally or alternatively, samples 1404 and 1412 can be detonated in respective, different contexts. This can permit, e.g., testing second malware sample 1412 in contexts that have already been affected by first malware sample 1404 as well as in contexts that have not been so affected. Additionally or alternatively, a sample 1404, 1412 can be detonated multiple times in respective, different contexts.

Figure 15:
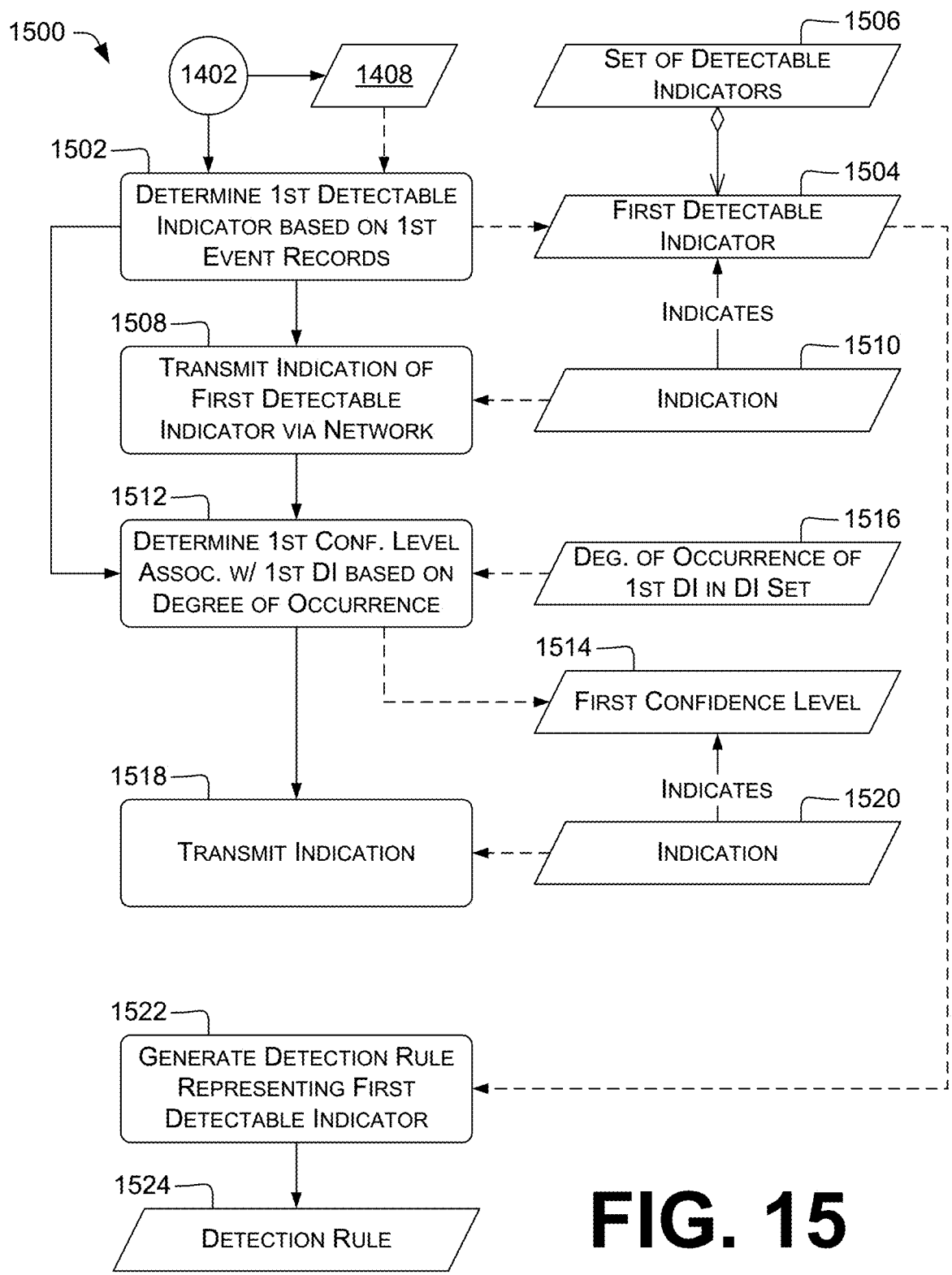
FIG. 15 illustrates example techniques for responding to detection of malware or location of similar malware.

FIG. 15 is a dataflow diagram illustrating example techniques 1500 for responding to detection of malware or location of similar malware, and related data items. In some examples, a computing device 102 includes control unit(s) (e.g., processing unit(s) 210) configured to perform operations described below. In some examples, operation 1402 is followed by operation 1502.

At 1502, the analysis module 228 can determine a first DI 1504 (e.g., an IOC) of a set 1506 of DIs based at least in part on the first event records 1408. Examples are discussed herein, e.g., with reference to Tables 4-12. For example, the analysis module 228 can determine that one of the listed detection rule(s) is satisfied by first event record(s) 1408, and can select from the stored data drawn, e.g., from Tables 4-12, the first DI 1504 corresponding to the satisfied detection rule(s). Additionally or alternatively, the analysis module 228 can compute data required to determine whether one of the detection rule(s) listed in Tables 4-12 (e.g., Table 8 or Table 11) is satisfied, and can select from the tables the first DI 1504 corresponding to that one of the detection rule(s). Set 1506 can include at least one DI listed in Tables 4-12, in some examples. Additionally or alternatively, the analysis module 228 can determine a representation (e.g., a hash) of a task tree as discussed herein with reference to Tables 1-3 or FIGS. 11-13 (see, e.g., Table 8). In some examples, operation 1502 is followed by operation 1508 or operation 1512.

At 1508, the communications module 224 can transmit an indication 1510 of the first DI 1504 via a network 110. Indication 1510 can include a copy of or reference to detection rule set(s) associated with the first DI 1504. For example, the reference can include a URI, GUID, or other unique identifier of first DI 1504. In some examples, operation 1508 can include transmitting indication 1510 to a computing device 104 or other monitored computing device, a firewall or other network function 134, or another network destination.

In some examples, operation 1508 includes transmitting indication 1510 via an API, e.g., as an outgoing push transmission or as a response to an incoming pull transmission. In some examples, the API is provided or operated by, or is otherwise associated with, a security service. In some examples, the API is provided or operated by, or is otherwise associated with, a computing device 104 or network function 134, or a management server communicatively connected with a computing device 104 or network function 134.

Some examples include operations 1512, 1518, and 1522. Other examples include only one of, or fewer than all of, operations 1512, 1518, and 1522.

At 1512, the analysis module 228 can determine a first confidence level ("CL") 1514 associated with the first DI 1504 based at least in part on a degree 1516 of occurrence of the first DI 1504 in the set 1506 of DIs. For example, first confidence level 1514 can indicate an extent to which malware is associated with first DI 1504, or vice versa. Additionally or alternatively, in some examples in which first malware sample 1404 is to be tested to determine whether it is actually malicious, first confidence level 1514 can indicate an extent to which the first malware sample 1404 is likely to in fact be malware. Degree 1516 can indicate, e.g., a rate, count, level, probability, or other measure of occurrence.

In some examples, set 1506 is associated with a population of samples. In some examples, degree 1516 indicates at least: how many dirty samples in the population of samples are associated with (e.g., exhibited) the first DI 1504; what percentage of the samples in the population are associated with the first DI 1504; how many samples in the population of samples are both associated with the first DI 1504 and considered dirty; or what percentage of the samples in the population of samples are both associated with the first DI 1504 and considered dirty.

Additionally or alternatively, e.g., for a first DI 1504 associated with a detection rule indicating the presence of particular data (e.g., a particular hash value), degree 1516 can indicate how many, or what percentage of a group of, malware-detection engines classify the particular data as associated with malware. Additionally or alternatively, degree 1516 can indicate how often first DI 1504 was detected during detonation (operation 1402). Examples include how often the first malware sample 1404 attempt to write to protected memory, encrypt files, or perform other potentially malicious actions, and how many dirty network hosts or domain names the first malware sample 1404 attempted to communicate with during detonation.

At 1518, the communications module 224 can transmit an indication 1520 of the first confidence level 1514 via the network 110 in association with the indication 1510 of the first DI 1504. Examples are discussed herein, e.g., with reference to operation 1508.

At 1522, the communications module 224 can generate a detection rule 1524, e.g., a YARA or Suricata rule. Detection rule 1524 can represent the first DI 1504 (or DIs 1604 or 1608). In some examples in which operation 1502 includes determining hash(es) or other data used in a detection rule set, operation 1522 can include encoding that data into the form of a detection rule to provide detection rule 1524. In an example in which the first malware sample 1404 includes multiple IP addresses (see Table 8), operation 1522 can include encoding those IP addresses into the "strings" section of a YARA rule, and providing a "condition" section of the YARA rule indicating that at least a predetermined number N of the strings must match. The YARA rule can be or be a part of the detection rule 1524.

Figure 16:
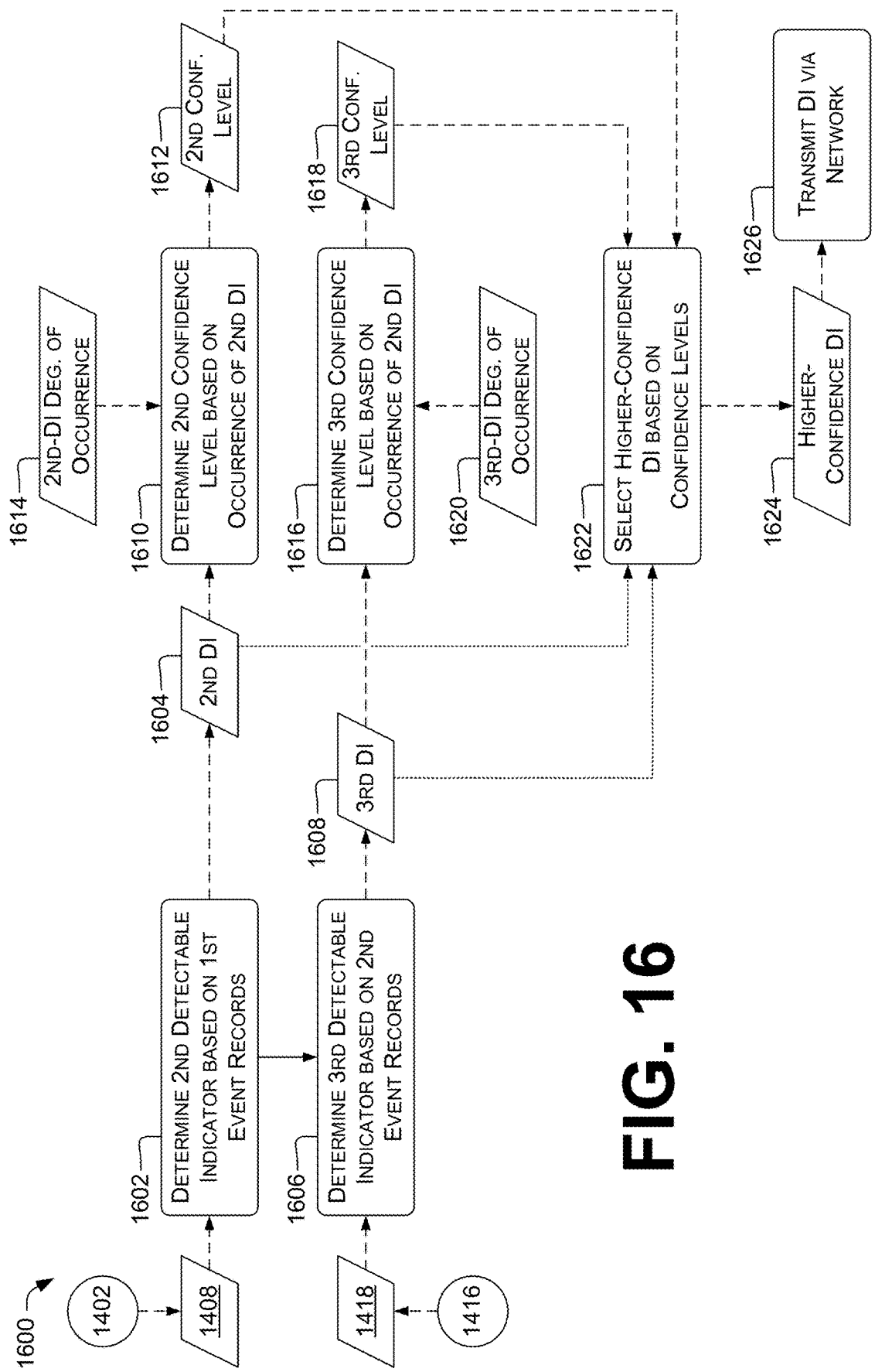
FIG. 16 illustrates example techniques for processing detectable indicators.

FIG. 16 is a dataflow diagram illustrating example techniques 1600 for processing DIs, and related data items. In some examples, a computing device 102 includes control unit(s) (e.g., processing unit(s) 210) configured to perform operations described below. In some examples, at least: operation 1402 is followed by operation 1602; or operation 1416 is followed by operation 1606. Note that the use of the terms "second" and "third" in the discussion of operations 1602-1626 does not require that total of at least two or three, respectively, items be determined. "Second" and "third" are used here solely to distinguish this discussion from the discussion of operations 1502-1518.

At 1602, the analysis module 228 can determine a second DI 1604 of a set of DIs (e.g., set 1506 or a different set) based at least in part on the first event records 1408. Examples are discussed herein, e.g., with reference to operation 1502.

At 1606, the analysis module 228 can determine a third DI 1608 of a set of DIs (e.g., set 1506 or a different set) based at least in part on the one or more second event records 1418. Examples are discussed herein, e.g., with reference to operation 1502.

Some examples include determining a DI and transmitting it via a network. Some examples include generating multiple DIs and transmitting each via a network. For example, operations 1502 and 1508 can be performed multiple times for respective, different DIs. Additionally or alternatively, operation 1602 can be followed by transmission of second DI 1604 as discussed herein with reference to operation 1508, or operation 1606 can be followed by transmission of third DI 1608 as discussed herein with reference to operation 1508. Some examples include determining multiple DIs and transmitting fewer than all of the DIs. FIG. 16 shows a nonlimiting example of determining two DIs 1604, 1608 and transmitting one.

At 1610, the analysis module 228 can determine a second confidence level 1612 associated with the second DI 1604 based at least in part on a degree 1614 (which can represent degree 1516) of occurrence of the second DI 1604 in the set of DIs. Examples are discussed herein, e.g., with reference to FIG. 5 and operation 1512.

At 1616, the analysis module 228 can determine a third confidence level 1618 associated with the third DI 1608 based at least in part on a degree 1620 (which can represent degree 1516) of occurrence of the third DI 1608 in the set of DIs. Examples are discussed herein, e.g., with reference to FIG. 5 and operation 1512.

At 1622, the analysis module 228 can select, based at least in part on the second confidence level 1612 and the third confidence level 1618, either the second DI 1604 or the third DI 1608 as a higher-confidence DI 1624. For example, the analysis module 228 can select the DI 1604, 1608 associated with the higher, or higher-magnitude, respective confidence level 1612, 1618.

At 1626, the communications module 224 can transmit the higher-confidence DI 1624 via network 110. Examples are discussed herein, e.g., with reference to operation 1508.

Some examples determine confidence levels 1514, 1612, 1618 based at least in part on factors additional to or instead of degrees 1516, 1614, 1620 of occurrence. In some of these examples, techniques 1600 can be used in addition to or instead of techniques 1500. Some examples include determining first and second DIs, represented in FIG. 16 by second DI 1604 and third DI 1608. The analysis module 228 then determines the respective confidence levels 1612, 1618 based at least in part on respective behavior indicators associated with the first event records. Examples of determining behavior indicators are described herein with reference to FIG. 4, operation 510, Tables 4-12. For example, behavior indicators associated with samples not known to be dirty can be associated with lower confidence levels, and behavior indicators associated with samples known to be dirty can be associated with higher confidence levels. In some examples, the respective behavior indicators include the DIs 1604, 1608.

Figure 17:
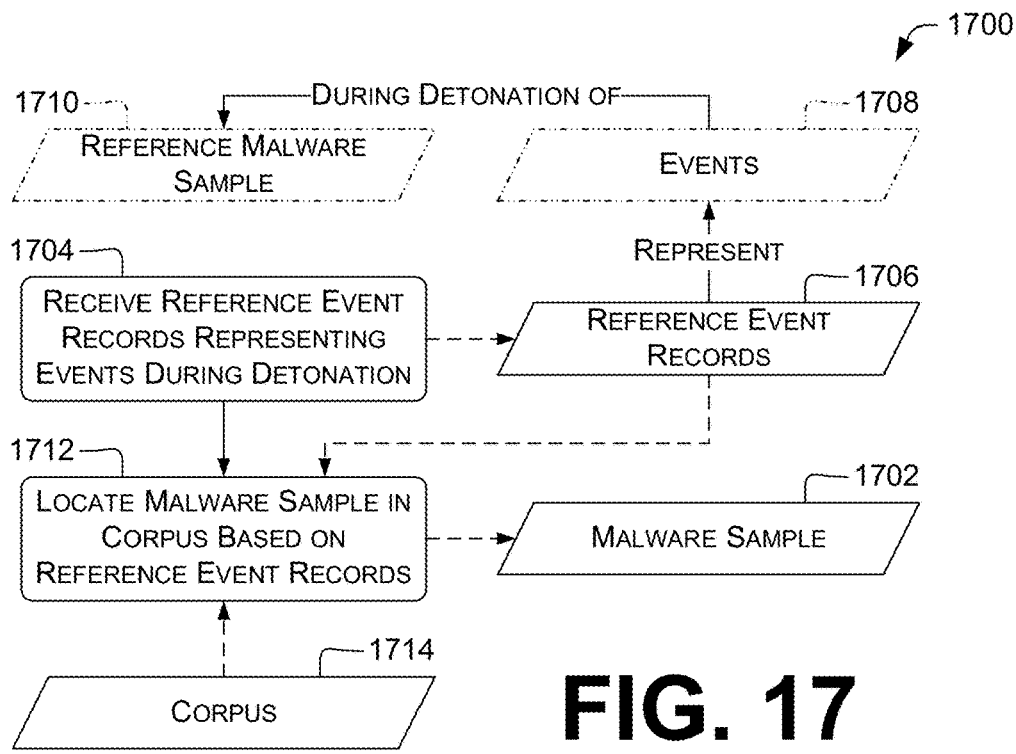
FIG. 17 illustrates an example technique for locating a malware sample.

FIG. 17 is a dataflow diagram illustrating an example technique 1700 performed by a computing device for locating a malware sample 1702, and related data items. In some examples, a computing device 102 includes control unit(s) (e.g., processing unit(s) 210) configured to perform operations described below.

At 1704, the communications module 224 can receive one or more reference event records 1706 representing events 1708 (which can represent events 408, and are shown in phantom) detected during a detonation of a reference malware sample 1710 (which can represent sample 118, 126; shown in phantom). The detonation can be a detonation performed based at least in part on context data 128 associated with the reference malware sample 1710. Operation 1704 can include, e.g., receiving the reference event records 1706 via an API or other inter-process or network interface; reading the reference event records 1706 from a datastore; or otherwise arranging the reference event records 1706 with respect to a control unit so that the control unit can perform operation 1712. Examples of receiving are discussed herein, e.g., with reference to FIG. 1, operations 306/308, and operation 502.

At 1712, the analysis module 228 can locate the malware sample 1702 in a corpus 1714 based at least in part on the one or more reference event records 1706. Examples are discussed herein, e.g., with reference to operations 414, 510, 710, 1012, or 1410, or FIGS. 11-13.

Figure 18:
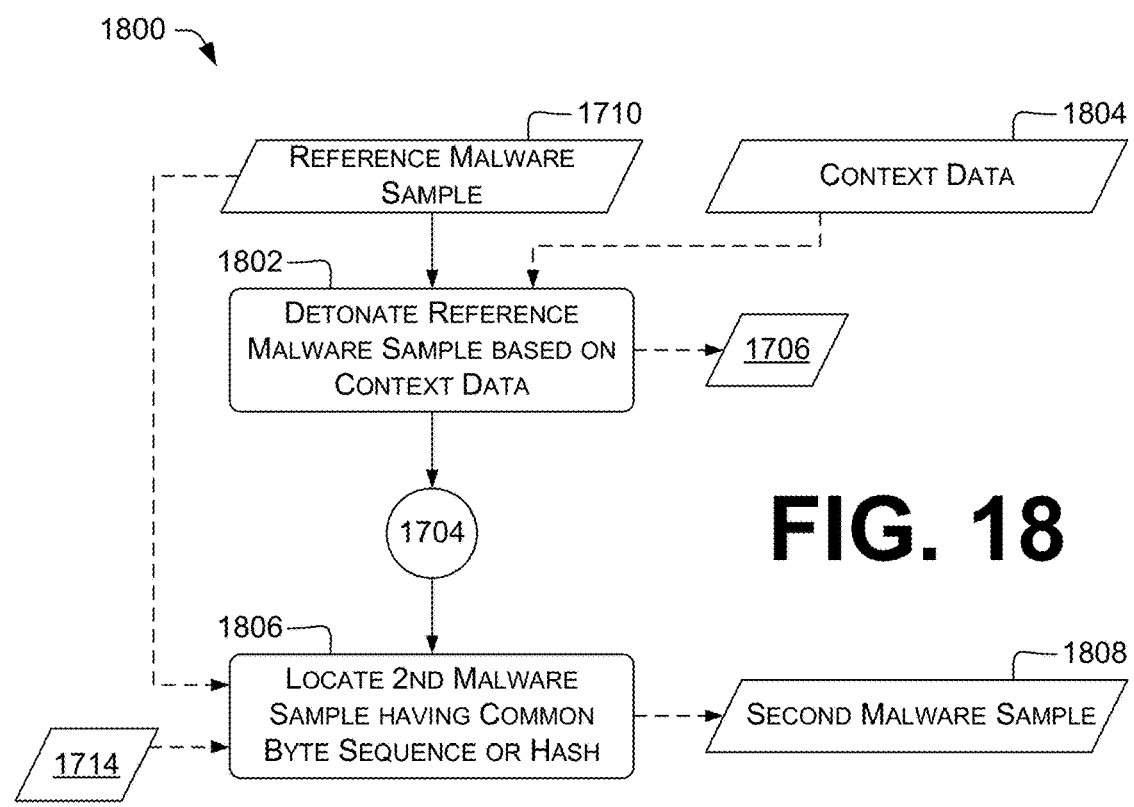
FIG. 18 illustrates example techniques for locating malware samples.

FIG. 18 is a dataflow diagram illustrating example techniques 1800 for locating malware samples, and related data items. In some examples, a computing device 102 includes control unit(s) (e.g., processing unit(s) 210) configured to perform operations described below. In some examples, at least: operation 1802 precedes operation 1704; at least one of operations 1704, 1712, or 1802 precedes operation 1806; or operation 1806 is mutually independent of each of operations 1704, 1712, and 1802.

At 1802, the detonation module 234 can detonate the reference malware sample 1710 based at least in part on context data 1804 (which can represent context data 128) to provide the reference event records 1706. Examples are discussed herein, e.g., with reference to operations 406, 506, 706, 1010, 1402, or 1416.

In some examples using operation 1802, operation 1802 can include storing the reference event records 1706 to memory (e.g., CRM 214), and operation 1704 can include reading the reference event records 1706 from the memory. Additionally or alternatively, operation 1802 can include providing the reference event records 1706 via a communications interface 216 or bus 218, and operation 1704 can include receiving the reference event records 1706 therefrom. Operation 1802 can be followed by operation 1704, which can in turn be followed by operation 1806.

At 1806, the analysis module 228 can locate a second malware sample 1808, e.g., in corpus 1714. Second malware sample 1808 can have at least one byte sequence or hash value in common with the reference malware sample 1710. Examples are discussed herein, e.g., with reference to operations 510, 710, or 1308. Operation 1806 can permit using static similarity techniques described herein to reduce the probability of a false miss.

Figure 19:
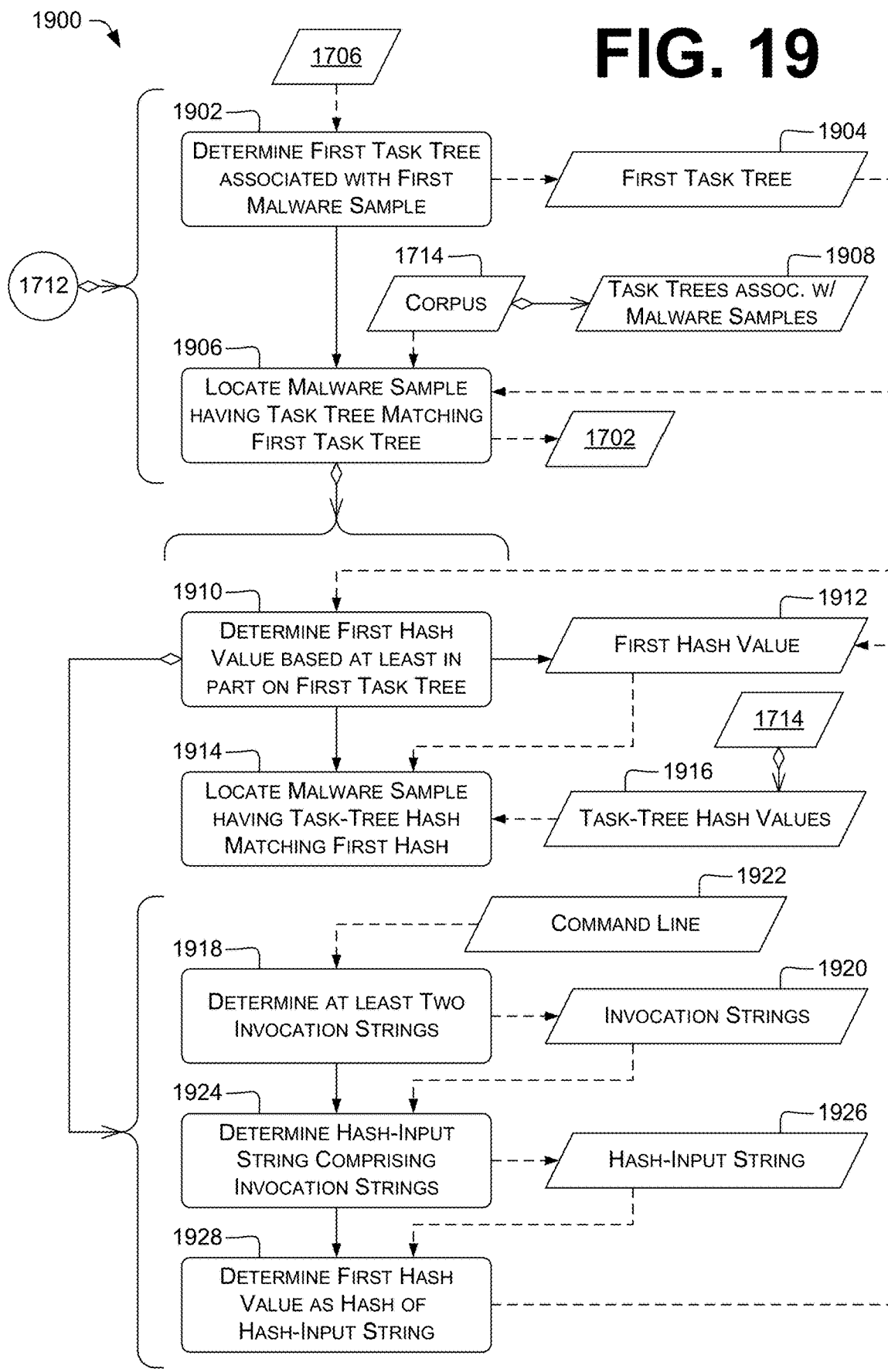
FIG. 19 illustrates example techniques for locating related malware samples.

FIG. 19 is a dataflow diagram illustrating example techniques 1900 for locating related malware samples, and related data items. In some examples, a computing device 102 includes control unit(s) (e.g., processing unit(s) 210) configured to perform operations described below. In some examples, at least: operation 1704 can be followed by operation 1902; or operation 1712 can include operations 1902 and 1906.

At 1902, the analysis module 228 can determine, based at least in part on at least one of the reference event records 1706, a first task tree 1904 (which can represent first task tree 1204) associated with the reference malware sample 1710. The first task tree 1904 can indicate one or more first tasks. Examples are discussed herein, e.g., with reference to operation 1202.

At 1906, the analysis module 228 can locate the malware sample 1702 associated with a second task tree matching the first task tree. For example, corpus 1714 can include task trees 1908 (which can represent task trees 1206) associated with respective malware samples. The analysis module 228 can select, as the malware sample 1702, a malware sample associated with the second task tree of task trees 1908 that matches first task tree 1904. Examples are discussed herein, e.g., with reference to operation 1208. Examples are discussed herein, e.g., with reference to operation 1208. In some examples, operation 1906 includes operations 1910 and 1914.

At 1910, the analysis module 228 can determine a first hash value 1912 (which can represent first hash value 1216) based at least in part on the first task tree 1904 (e.g., based on only the first task tree 1904, or also based on additional information). Examples are discussed herein, e.g., with reference to operation 1214 and Table 3.

In some examples, the analysis module 228 can determine the first hash value 1912 further based at least in part on at least: a file type of the reference malware sample 1710; a file size of the reference malware sample 1710; or a first event record representing network traffic initiated by the reference malware sample 1710 during detonation. Examples are discussed herein, e.g., with reference to operation 1214 and Table 3.

At 1914, the analysis module 228 can locate, in the corpus 1714, the malware sample 1702 having the associated task-tree hash value equal to the first hash value 1912. Corpus 1714 can include task-tree hash values 1916 associated with the malware samples in corpus 1714, and operation 1914 can include comparing first hash value 1912 with hash values 1916, or searching for first hash value 1912 among hash values 1916. Examples are discussed herein, e.g., with reference to operation 1218.

At 1918, the analysis module 228 can determine at least two invocation strings 1920 (which can represent invocation strings 1222). Each invocation string 1920 can represent an invocation of a respective one of the one or more first tasks. Examples are discussed herein, e.g., with reference to operation 1220.

In some examples, operation 1918 can include determining at least one of the invocation strings 1920 based at least in part on a corresponding command line 1922. Command line 1922 can be included in a reference event record 1706, in some examples. Operation 1918 can include: replacing a pattern (e.g., a regex or fixed string) occurring in the command line with a corresponding marker string; removing characters in a predetermined set of characters from the command line; splitting arguments out of the command line; or sorting the arguments. Examples are discussed herein, e.g., with reference to operation 1302.

At 1924, the analysis module 228 can determine a hash-input string 1926 (which can represent hash-input string 1226) comprising the invocation strings 1920. Examples are discussed herein, e.g., with reference to operation 1224. In some examples, operation 1924 can include determining the hash-input string 1926 comprising a filetype string representing a file type of the reference malware sample 1710. Examples are discussed herein, e.g., with reference to operation 1214 and Table 3.

At 1928, the analysis module 228 can determine the first hash value 1912 as a hash of the hash-input string 1926. Examples are discussed herein, e.g., with reference to operation 1228.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

- A: A system, comprising a security agent running at a first computing device and a security service running at a second computing device, wherein: the security agent is configured to: block an attempt to execute a file; determine context data associated with the attempt; and transmit the context data and an indication of the file to the security service; and the security service is configured to: determine a synthetic context based on the context data; detonate the file in the synthetic context to provide detonation data; and locate, in a corpus, malware sample(s) that are similar to the file based on the detonation data.
- B: The system according to paragraph A, wherein the security service is further configured to: determine one or more detectable indicators (DIs), e.g., indicators of compromise (IOCs), based at least in part on at least the file or the malware sample(s); and transmit the one or more DIs, e.g., IOCs, to the first computing device.
- C: The system according to paragraph A or B, further comprising a security device, wherein: the security service is further configured to: determine one or more DIs, e.g., indicators of compromise (IOCs), based at least in part on at least the file or the malware sample(s); and transmit the one or more DIs, e.g., IOCs, to the security device; and the security device is further configured to block programs that exhibit at least some of the one or more DIs, e.g. IOCs.
- D: A method of analyzing a first malware sample, the method comprising: determining a synthetic context based at least in part on context data associated with the first malware sample; and detonating the first malware sample in the synthetic context to provide one or more first event records representing events performed by the first malware sample and detected during detonation.
- E: The method according to paragraph D, further comprising receiving the malware sample and the context data via a network.
- F: The method according to paragraph D or E, wherein: the malware sample comprises processor-executable instructions; and the detonation comprises executing the processor-executable instructions.
- G: The method according to any of paragraphs D-F, wherein: the malware sample is a document file having a file type; and the detonation comprises executing processor-executable instructions of a launcher application associated with the file type.
- H: The method according to any of paragraphs D-G, further comprising: locating a second malware sample, in a corpus of malware samples based on at least: the first malware sample; or at least one of the first event records.
- I: The method according to paragraph H, wherein: the corpus of malware samples comprises second event records associated with malware samples in the corpus of malware samples; and the locating comprises determining the second malware sample associated with one or more second event records similar to the one or more first event records.
- J: The method according to paragraph I, further comprising: determining one or more first behavior indicators based at least in part on the first event records; determining respective sets of second behavior indicators for the malware samples in the corpus of malware samples based at least in part on the event records associated with those malware samples; and determining the second malware sample based on the first behavior indicators occurring in the set of behavior indicators associated with the second malware sample.
- K: The method according to paragraph J, further comprising determining the set of first behavior indicators so that the set of first behavior indicators does not match a set of behavior indicators associated with a third sample, wherein the third sample is not known to be malware.
- L: The method according to any of paragraphs H-K, wherein the locating comprises locating the second malware sample having at least one byte sequence or hash value in common with the first malware sample.
- M: The method according to any of paragraphs H-L, further comprising: determining, based at least in part on at least one of the first event records, a first task tree associated with the first malware sample, the first task tree indicating one or more first tasks; locating the second malware sample associated with a second task tree matching the first task tree.
- N: The method according to paragraph M, wherein: the corpus of malware samples comprises task-tree hash values associated with malware samples in the corpus of malware samples; and the method further comprises: determining a first hash value based at least in part on the first task tree; and locating, in the corpus of malware samples, the second malware sample having the associated task-tree hash value equal to the first hash value.
- O: The method according to paragraph N, further comprising: determining the first hash value further based at least in part on at least: a file type of the first malware sample; a file size of the first malware sample; or a first event record representing network traffic initiated by the malware sample during detonation.

P: The method according to paragraph O, further comprising determining the first hash value at least partly by: determining a plurality of invocation strings, each representing an invocation of a respective one of the one or more first tasks; determining a hash-input string comprising the plurality of invocation strings; and determining the first hash value as a hash of the hash-input string.

Q: The method according to paragraph P, further comprising determining the hash-input string comprising a filetype string representing a file type of the first sample.

R: The method according to paragraph P or Q, further comprising determining at least one invocation string of the plurality of invocation strings based at least in part on a corresponding command line by at least: replacing a pattern occurring in the command line with a corresponding marker string; removing characters in a predetermined set of characters from the command line; splitting arguments out of the command line; or sorting the arguments.

S: The method according to any of paragraphs N-R, further comprising locating a third malware sample having at least one byte sequence or hash value in common with the first malware sample.

T: A method of analyzing a first malware sample, the method comprising: detonating the first malware sample to provide one or more first event records representing events performed by the first malware sample and detected during detonation; determining a first detectable indicator of a set of detectable indicators based at least in part on the first event records; and determining a first confidence level associated with the first detectable indicator based at least in part on a degree of occurrence of the first detectable indicator in a corpus of malware samples.

U: The method according to paragraph T, further comprising: locating a second malware sample in the corpus based at least in part on the one or more first event records; determining a second detectable indicator of the set of detectable indicators based at least in part on one or more stored second event records associated with the second malware sample; and determining a second confidence level associated with the second detectable indicator based at least in part on a degree of occurrence of the second detectable indicator in a corpus of malware samples.

V: The method according to paragraph U, further comprising transmitting an indication of the first detectable indicator, the second detectable indicator, the first confidence level, and the second confidence level via a network.

W: The method according to paragraph U or V, further comprising: selecting, based at least in part on the first and second confidence levels, either the first detectable indicator or the second detectable indicator as a higher-confidence detectable indicator; and transmitting the higher-confidence detectable indicator via a network.

X: The method according to any of paragraphs T-W, further comprising generating a detection rule representing the first detectable indicator.

Y: A method of analyzing a first malware sample, the method comprising: detonating the first malware sample to provide one or more first event records representing events performed by the first malware sample and detected during detonation; determining a first detectable indicator of a set of detectable indicators based at least in part on the first event records; and locating a second malware sample in the corpus based at least in part on the one or more first event records; determining a second detectable indicator of the set of detectable indicators based at least in part on one or more stored second event records associated with the second malware sample; and determining a first confidence level associated with the first detectable indicator based at least in part on a degree of occurrence of the first detectable indicator in the set of detectable indicators.

Z: The method according to paragraph Y, further comprising: determining a second confidence level associated with the second detectable indicator based at least in part on a degree of occurrence of the second detectable indicator in the set of detectable indicators.

AA: The method according to paragraph Z, further comprising transmitting an indication of the first detectable indicator, the second detectable indicator, the first confidence level, and the second confidence level via a network.

AB: The method according to paragraph Z or AA, further comprising: selecting, based at least in part on the first and second confidence levels, either the first detectable indicator or the second detectable indicator as a higher-confidence detectable indicator; and transmitting the higher-confidence detectable indicator via a network.

AC: The method according to any of paragraphs Y-AB, further comprising generating a detection rule representing the first detectable indicator.

AD: A method comprising, at a computing device: detecting a malware sample; blocking execution, or at least one operation, of the malware sample; and transmitting the malware sample and associated context information via a network.

AE: The method according to paragraph AD, further comprising, after the transmitting: receiving, via the network, a detectable indicator; and storing the detectable indicator in a detection rule set to be used for future malware detection.

AF. A system comprising a first computing device running a security agent and a second computing device running a security service, wherein: the security agent is configured to: determine context data associated with a file present at the first computing device; and transmit the context data and an indication of the file to the security service; and the security service is configured to: determine a synthetic context based on the context data; detonate the file in the synthetic context to provide detonation data; and locate, in a corpus of malware samples, a malware sample that is similar to the file based on the detonation data.

AG. The system according to paragraph AF, wherein the security agent is configured to at least: carry out first operations to: block an attempt to execute the file; and determine the context data comprising at least some data associated with the attempt; or carry out second operations to: block an operation of the file during execution of the file, wherein the file comprises processor-executable instructions to carry out the operation of the file; and determine the context data comprising at least some data associated with the operation of the file.

AH. The system according to paragraph AF or AG, wherein the security service is further configured to: determine one or more first detectable indicators, DIs, based at least in part on at least the file or the malware sample; and transmit the one or more first DIs to the first computing device.

AI. The system according to any of paragraphs AF-AH, further comprising a security device, wherein: the security service is further configured to: determine one or more second DIs based at least in part on at least the file or the malware sample; and transmit the one or more second DIs to the security device; and the security device is further configured to block a program that exhibits at least one of the one or more second DIs.

AJ. The system according to any of paragraphs AF-AI, wherein the security service is further configured to detonate the malware sample in the synthetic context.

AK: The system according to any of paragraphs AF-AJ, the security service further configured to locate, in the corpus of malware samples, a second malware sample having at least one byte sequence or hash value in common with the file.

AL. A method of analyzing a first malware sample, the method comprising: determining a synthetic context based at least in part on context data associated with the first malware sample; and detonating the first malware sample in the synthetic context to provide one or more first event records representing events performed by the first malware sample and detected during detonation.

AM. The method according to paragraph AL, wherein: the corpus comprises malware samples and second event records associated with the malware samples; and the method further comprises locating a second malware sample in a corpus at least partly by selecting from the malware samples the second malware sample associated with one or more second event records that satisfy a predetermined similarity criterion with respect to the one or more first event records.

AN. The method according to paragraph AM, further comprising: determining a first behavior indicator based at least in part on the first event records; determining, for individual malware samples in the corpus, respective second behavior indicators based at least in part on the second event records associated with the individual malware samples; and selecting from the malware samples the second malware sample having the respective second behavior indicator matching the first behavior indicator.

AO. The method according to paragraph AN, further comprising determining the first behavior indicator so that the first behavior indicator is not associated with a third sample, wherein the third sample is not known to be malware.

AP. The method according to any of paragraphs AM-AO, further comprising: determining, based at least in part on at least one of the first event records, a first task tree associated with the first malware sample, the first task tree indicating one or more first tasks; locating the second malware sample associated with a second task tree matching the first task tree, wherein the corpus comprises a plurality of task trees associated with the malware samples and the plurality of task trees comprises the second task tree.

AQ. The method according to paragraph AP, wherein: the corpus comprises task-tree hash values associated with the malware samples; and the method further comprises: determining a first hash value based at least in part on the first task tree; and locating, in the corpus, the second malware sample having the associated task-tree hash value equal to the first hash value.

AR. The method according to paragraph AQ, further comprising: determining the first hash value further based at least in part on at least: a file type of the first malware sample; a file size of the first malware sample; or a first event record representing network traffic initiated by the first malware sample during detonation.

AS. The method according to paragraph AQ or AR, further comprising determining the first hash value at least partly by: determining at least two invocation strings, each representing an invocation of a respective one of the one or more first tasks; determining a hash-input string comprising the at least two invocation strings; and determining the first hash value as a hash of the hash-input string.

AT: The method according to paragraph AS, further comprising determining the hash-input string comprising a filetype string representing a file type of the first malware sample.

AU. The method according to paragraph AS or AT, further comprising determining at least one invocation string of the at least two invocation strings based at least in part on a corresponding command line by at least: replacing a pattern occurring in the command line with a corresponding marker string; removing characters in a predetermined set of characters from the command line; splitting arguments out of the command line; or sorting the arguments.

AV. The method according to any of paragraphs AL-AU, further comprising locating a third malware sample having at least one byte sequence or hash value in common with the first malware sample.

AW: The method according to any of paragraphs AL-AV, further comprising receiving the first malware sample and the context data via a network.

AX: The method according to any of paragraphs AL-AW, wherein: the first malware sample comprises processor-executable instructions; and the detonation comprises executing the processor-executable instructions.

AY: The method according to any of paragraphs AL-AX, wherein: the first malware sample comprises a document file having a file type; and the detonation comprises executing processor-executable instructions of a launcher application associated with the file type.

AZ: The method according to any of paragraphs AL-AY, further comprising: locating a second malware sample in a corpus based at least in part on at least: the first malware sample; or at least one of the first event records.

BA: The method according to any of paragraphs AN-AZ, further comprising: determining a first detectable indicator of a set of detectable indicators based at least in part on the first event records; determining a first confidence level associated with the first detectable indicator based at least in part on a first behavior indicator associated with the first event records; determining a second detectable indicator of a set of detectable indicators based at least in part on the one or more first event records; determining a second confidence level associated with the second detectable indicator based at least in part on a second behavior indicator associated with the first event records; selecting, based at least in part on the first and second confidence levels, either the first detectable indicator or the second detectable indicator as a higher-confidence detectable indicator; and transmitting the higher-confidence detectable indicator via a network.

BB: The method according to any of paragraphs AL-BA, further comprising the operations of at least one of paragraphs BD or BE.

BC. A method of analyzing malware, the method comprising: detonating a first malware sample based at least in part on context data associated with the first malware sample to provide one or more first event records representing events and detected during detonation of the first malware sample; locating a second malware sample in a corpus based at least in part on the one or more first event records; and detonating the second malware sample based at least in part on the context data to provide one or more second event records representing events detected during detonation of the second malware sample.

BD. The method according to paragraph BC, further comprising: determining a first detectable indicator of a set of detectable indicators based at least in part on the first event records; and transmitting an indication of the first detectable indicator via a network.

BE. The method according to paragraph BD, further comprising: determining a first confidence level associated with the first detectable indicator based at least in part on a degree of occurrence of the first detectable indicator in the set of detectable indicators; and transmitting an indication of the first confidence level via the network in association with the indication of the first detectable indicator.

BF. The method according to any of paragraphs BC-BE, further comprising: determining a second detectable indicator of a set of detectable indicators based at least in part on the first event records; determining a third detectable indicator of a set of detectable indicators based at least in part on the one or more second event records; determining a second confidence level associated with the second detectable indicator based at least in part on a degree of occurrence of the second detectable indicator in the set of detectable indicators; determining a third confidence level associated with the third detectable indicator based at least in part on a degree of occurrence of the third detectable indicator in the set of detectable indicators; selecting, based at least in part on the second and third confidence levels, either the second detectable indicator or the third detectable indicator as a higher-confidence detectable indicator; and transmitting the higher-confidence detectable indicator via a network.

BG: The method according to paragraph BF, further comprising transmitting indication(s) of the first detectable indicator, the second detectable indicator, the first confidence level, and the second confidence level via a network.

BH. The method according to any of paragraphs BC-BG, further comprising generating a detection rule representing the first detectable indicator.

BI. A method of locating a malware sample, the method comprising: receiving one or more reference event records representing events detected during a detonation of a reference malware sample, the detonation based at least in part on context data associated with the reference malware sample; and locating the malware sample in a corpus based at least in part on the one or more reference event records.

BJ. The method according to paragraph BI, further comprising: determining, based at least in part on at least one of the reference event records, a first task tree associated with the reference malware sample, the first task tree indicating one or more first tasks; locating the malware sample associated with a second task tree matching the first task tree.

BK. The method according to paragraph BJ, wherein: the corpus comprises malware samples and task-tree hash values associated with the malware samples; and the method further comprises: determining a first hash value based at least in part on the first task tree; and locating, in the corpus, the malware sample having the associated task-tree hash value equal to the first hash value.

BL. The method according to paragraph BK, further comprising: determining the first hash value further based at least in part on at least: a file type of the reference malware sample; a file size of the reference malware sample; or a first event record representing network traffic initiated by the reference malware sample during detonation.

BM. The method according to paragraph BK or BL, further comprising determining the first hash value at least partly by: determining at least two invocation strings, each invocation string representing an invocation of a respective one of the one or more first tasks; determining a hash-input string comprising the invocation strings; and determining the first hash value as a hash of the hash-input string.

BN. The method according to paragraph BM, further comprising determining the hash-input string comprising a filetype string representing a file type of the reference malware sample.

BO. The method according to paragraph BM or BN, further comprising determining at least one invocation string of the invocation strings based at least in part on a corresponding command line by at least: replacing a pattern occurring in the command line with a corresponding marker string; removing characters in a predetermined set of characters from the command line; splitting arguments out of the command line; or sorting the arguments.

BP. The method according to any of paragraphs BI-BO, further comprising locating a second malware sample having at least one byte sequence or hash value in common with the reference malware sample.

BQ. The method according to any of paragraphs BI-BP, further comprising detonating the reference malware sample based at least in part on the context data to provide the reference event records.

BR: A computer-readable medium, e.g., a computer storage medium, having thereon computer-executable instructions, the computer-executable instructions upon execution configuring a computer to perform operations as any of paragraphs A-C, D-S, T-X, Y-AC, AD-AE, AF-AA, AL-BB, BC-BH, or BI-BQ recites.

BS: A device comprising: a processor; and a computer-readable medium, e.g., a computer storage medium, having thereon computer-executable instructions, the computer-executable instructions upon execution by the processor configuring the device to perform operations as any of paragraphs A-C, D-S, T-X, Y-AC, AD-AE, AF-AA, AL-BB, BC-BH, or BI-BQ recites.

BT: A system comprising: means for processing; and means for storing having thereon computer-executable instructions, the computer-executable instructions including means to configure the system to carry out a method as any of paragraphs A-C, D-S, T-X, Y-AC, AD-AE, AF-AA, AL-BB, BC-BH, or BI-BQ recites.

BU: A method comprising: performing operations as any of paragraphs A-C, D-S, T-X, Y-AC, AD-AE, AF-AA, AL-BB, BC-BH, or BI-BQ recites.

BV: As any of paragraphs BR-BU, further comprising determining similarity between two samples (or locating similar samples) at least partly by searching an inverted index.

BW: At least one feature from each group in a set of groups, the set of groups comprising at least two of the following groups of paragraphs: paragraphs A-C, paragraphs D-S, paragraphs T-X, paragraphs Y-AC, paragraphs AD-AE, paragraphs AF-AA, paragraphs AL-BB, paragraphs BC-BH, and paragraphs BI-BQ.

CONCLUSION

Various techniques described herein can permit analyzing files (e.g., malware samples), locating related files, or providing security-relevant information based on the related files. Some examples permit terminating, quarantining, or otherwise remediating malware or mitigating its effects. Some examples permit detecting related malware. Some examples are described with reference to malware detection, but techniques described herein are not limited to security-relevant event streams. For example, techniques used herein can be used to handle events associated with system performance, troubleshooting, data distribution, or other technologies.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the technology. For example, computing devices 102, 104, 106, or 200, network 110, network function 134, processing unit 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example processes or devices herein are illustrated in individual operations and logical flows thereof, and are summarized with reference to those operations. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated operation can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer OS 220. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing device(s) 102, 104, 106, or 200, such as one or more internal or external CPUs or GPUs, or one or more pieces of hardware logic such as FPGAs, DSPs, or other types of accelerators.

What is claimed is:

1. A computing device comprising:
   a processor; and
   a non-transitory computer-readable memory storing instructions that, when executed by the processor, cause the processor to:
      receive context data associated with a file presented on a security device;
      determine, based on the context data, a synthetic context associated with the file;
      determine, by detonating the file in the synthetic context, first detonation data, wherein the first detonation data includes first event records representing first events detected during detonating the file;
      determine, based on the first event records, a set of detectable indicators associated with the file, the set of detectable indicators including a first detectable indicator;
      determine a first confidence level of the first detectable indicator, the first confidence level indicating a degree of occurrence of the first detectable indicator in the set of the detectable indicators; and
      transmit the first detectable indicator and the first confidence level to the security device, causing the security device to take an action on a program that exhibits the first detectable indicator.

2. The computing device of claim 1, wherein the instructions, when executed by the processor, cause the processor further to:
   transmit the first confidence level to the security device, allowing the security device to determine the action based at least in part on the first detectable indicator and the first confidence level.

3. The computing device of claim 1, wherein the context data is determined by the security device based on at least one of:
   an attempt to execute the file on the security device, or
   an execution of the file on the security device.

4. The computing device of claim 1, wherein the instructions, when executed by the processor, cause the processor further to:
   locate, in a corpus of malware samples and based on the first detonation data, a first malware sample that is similar to the file.

5. The computing device of claim 4, wherein
   the first detonation data includes the first event records representing the first events detected during detonating the file in the synthetic context,
   the corpus of malware samples includes second event records associated with the malware samples, and
   the instructions, when executed by the processor, cause the processor further to:
      locate, in the corpus of malware samples, the first malware sample based at least in part on the first event records and the second event records.

6. The computing device of claim 4, wherein the corpus of malware samples includes a plurality of hash values associated with the malware samples, and the instructions, when executed by the processor, cause the processor further to:
   determine a first hash value associated with the file; and
   locate, in the corpus of malware samples, the first malware sample having a hash value being equal to the first hash value.

7. The computing device of claim 4, wherein the instructions, when executed by the processor, cause the processor further to:
   determine, based on at least one of the file or the first malware sample, a second detectable indicator; and
   transmit the second detectable indicator to the security device, causing the security device to block a second program that exhibits the second detectable indicator.

8. A computer-implemented method, comprising:
   determining a synthetic context associated with a first malware sample;
   determining, by detonating the first malware sample in the synthetic context, a first event record;
   determining, based at least in part on the first event record, a first task tree associated with the first malware sample;
   determining, based on second event records associated with a corpus of malware samples, a plurality of second task trees associated with the corpus of malware samples; and
   locating, from the corpus of malware samples, a second malware sample having a corresponding second task tree matching the first task tree.

9. The computer-implemented method of claim 8, wherein the corpus of malware samples includes a plurality of hash values associated with the corpus of malware samples, and the method further comprises:
   determining, based on the first task tree, a first hash value; and
   locating, in the corpus of malware samples, the second malware sample having a corresponding hash value being equal to the first hash value.

10. The computer-implemented method of claim 9, wherein the first hash value is determined based on at least one of:
- a type of the first malware sample,
- a size of the first malware sample, or
- the first event record representing network traffic generated by detonating the first malware sample in the synthetic context.

11. The computer-implemented method of claim 9, wherein the first task tree includes one or more first tasks, and the method further comprises:
- determining two invocation strings, each representing an invocation of a respective one of the one or more first tasks;
- determining, based on the two invocation strings, a hash-input string; and
- determining the first hash value as a hash of the hash-input string.

12. The computer-implemented method of claim 11, wherein determining two invocation strings comprises at least one of:
- replacing a pattern occurring in a command line with a corresponding marker string;
- removing characters in a predetermined set of characters from the command line;
- splitting arguments out of the command line; or
- sorting the arguments.

13. The computer-implemented method of claim 11, further comprising:
- locating, in the corpus of malware samples, the second malware sample having at least one byte sequence or a hash value in common with the first malware sample.

14. A computer-implemented method, comprising:
- detonating a first malware sample based at least in part on context data associated with the first malware sample;
- obtaining one or more first event records representing first events detected during detonating the first malware sample;
- determining, based on the one or more first event records, a first detectable indicator of a set of detectable indicators associated with the first malware sample;
- determining, a first confidence level associated with the first detectable indicator, the first confidence level indicating a degree of occurrence of the first detectable indicator in the set of the detectable indicators; and
- transmitting, to a computing device and via a network, the first detectable indicator and the first confidence level, causing the computing device to block a program that exhibits the first detectable indicator based on the first confidence level.

15. The computer-implemented method of claim 14, further comprising:
- locating, in a corpus of malware samples and based on the one or more first event records, a second malware sample;
- detonating the second malware sample based at least in part on context data associated with the second malware sample; and
- obtaining one or more second event records representing second events detected during detonating the second malware sample.

16. The computer-implemented method of claim 15, the corpus of malware samples includes a plurality of hash values associated with the malware samples, and the method further comprises:
- determining a first hash value associated with the first malware sample; and
- locating, in the corpus of malware samples, the second malware sample having a corresponding hash value being equal to the first hash value.

17. The computer-implemented method of claim 15, further comprising:
- determining, based on the one or more first event records, a second detectable indicator of the set of detectable indicator;
- determining, a second confidence level associated with the second detectable indicator, the second confidence level indicating a degree of occurrence of the second detectable indicator in the set of the detectable indicators;
- determining, based on the one or more second event records, a third detectable indicator of the set of detectable indicator;
- determining, a third confidence level associated with the third detectable indicator, the third confidence level indicating a degree of occurrence of the third detectable indicator in the set of the detectable indicators; and
- transmitting, to the computing device and via the network, one of the second detectable indicator and the third detectable indicator having a higher confidence level.

18. The computer-implemented method of claim 14, further comprising:
- generating a detection rule representing the first detectable indicator.

19. The computer-implemented method of claim 18, further comprising:
- determining a first hash value associated with the first malware sample;
- encoding the first hash value to generate encoded first hash value; and
- including the encoded first hash value in the detection rule.

* * * * *